US011138823B2

United States Patent
Ueno et al.

(10) Patent No.: US 11,138,823 B2
(45) Date of Patent: Oct. 5, 2021

(54) CONTROL DEVICE, CONTROL METHOD OF CONTROL DEVICE, AND COMMUNICATION DEVICE

(71) Applicant: SHARP KABUSHIKI KAISHA, Sakai (JP)

(72) Inventors: Masafumi Ueno, Sakai (JP); Naoki Shiobara, Sakai (JP); Masaaki Moriya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 121 days.

(21) Appl. No.: 16/605,480

(22) PCT Filed: Apr. 16, 2018

(86) PCT No.: PCT/JP2018/015708
§ 371 (c)(1),
(2) Date: Oct. 15, 2019

(87) PCT Pub. No.: WO2018/198858
PCT Pub. Date: Nov. 1, 2018

(65) Prior Publication Data

US 2021/0125450 A1 Apr. 29, 2021

(30) Foreign Application Priority Data

Apr. 25, 2017 (JP) ............................ JP2017-086483

(51) Int. Cl.
*G07F 7/08* (2006.01)
*G06F 3/044* (2006.01)
*G06F 3/0484* (2013.01)

(52) U.S. Cl.
CPC .............. *G07F 7/088* (2013.01); *G06F 3/044* (2013.01); *G06F 3/04842* (2013.01); *G07F 7/0826* (2013.01); *G07F 7/0893* (2013.01)

(58) Field of Classification Search
CPC ...... G07F 7/088; G07F 7/0826; G07F 7/0893; G06F 3/04842; G06F 3/044
(Continued)

(56) References Cited

U.S. PATENT DOCUMENTS 6,345,762 B1 * 2/2002 Mori ......................... G07F 7/00 235/381
9,860,224 B2 * 1/2018 Gupta ..................... G06F 21/83
(Continued)

FOREIGN PATENT DOCUMENTS

JP H11-066398 A 3/1999
JP 3746880 B2 * 2/2006
(Continued)

OTHER PUBLICATIONS

Sugita, Yasuhiro, et al. "[Papers] Integrated Transparent NFC Antennas on Touch Displays." ITE Transactions on Media Technology and Applications, vol. 6, No. 4, 2018, pp. 280-285. Crossref, doi:10.3169/mta.6.280. (Year: 2018).*

*Primary Examiner* — Stephen S Hong
*Assistant Examiner* — Broderick C Anderson
(74) *Attorney, Agent, or Firm* — ScienBiziP, P.C.

(57) ABSTRACT

An information processing device includes a display control unit that, when at least one NFC antenna has performed close-range wireless communication, effects a display of a communication prompter image that indicates the position of an NFC antenna which is different from the at least one NFC antenna and that prompts for close-range wireless communication with the different NFC antenna.

15 Claims, 23 Drawing Sheets

(a)
(b)

(58) Field of Classification Search
USPC .......................................................... 705/16
See application file for complete search history.

(56) References Cited

U.S. PATENT DOCUMENTS

| | | | | |
|---|---|---|---|---|
| 10,133,889 | B2 * | 11/2018 | Cletheroe | G06K 7/10356 |
| 2004/0050855 | A1 * | 3/2004 | Jurgenson | G07F 11/54 221/80 |
| 2008/0290107 | A1 * | 11/2008 | Lock | G07F 11/44 221/7 |
| 2009/0299901 | A1 * | 12/2009 | Garcia | G06Q 40/02 705/43 |
| 2010/0282835 | A1 * | 11/2010 | Wakamoto | G06K 7/10346 235/375 |
| 2016/0004894 | A1 * | 1/2016 | Tanikawa | G06K 19/07773 340/10.51 |
| 2019/0036208 | A1 * | 1/2019 | Yamagishi | G06K 19/0723 |

FOREIGN PATENT DOCUMENTS

| | | | |
|---|---|---|---|
| JP | 2016-177814 | A | 10/2016 |
| WO | 2009/028203 | A1 | 3/2009 |

* cited by examiner

100
NFC SYSTEM
1
INFORMATION PROCESSING DEVICE
2
NFC DISPLAY
10
CONTROL UNIT
21
NFC COMMUNICATION UNIT
11
NFC COMMUNICATION CONTROL UNIT
3
NFC TERMINAL
22
NFC ANTENNA
15
ANTENNA DRIVING UNIT
24
NFC CONTROLLER
12
PROCESS EXECUTION UNIT
13
DISPLAY CONTROL UNIT
23
DISPLAY UNIT
14
STORAGE UNIT 100
22a
2
21(90, 23)
22b (a)
100
2
31
TOUCH HERE TO CHOOSE
21 (90, 23)
22c
3
(b)
100
2
31
TOUCH HERE TO CHOOSE
TOUCH HERE TO BUY
22d
32
21 (90, 23)
3

FIG. 6
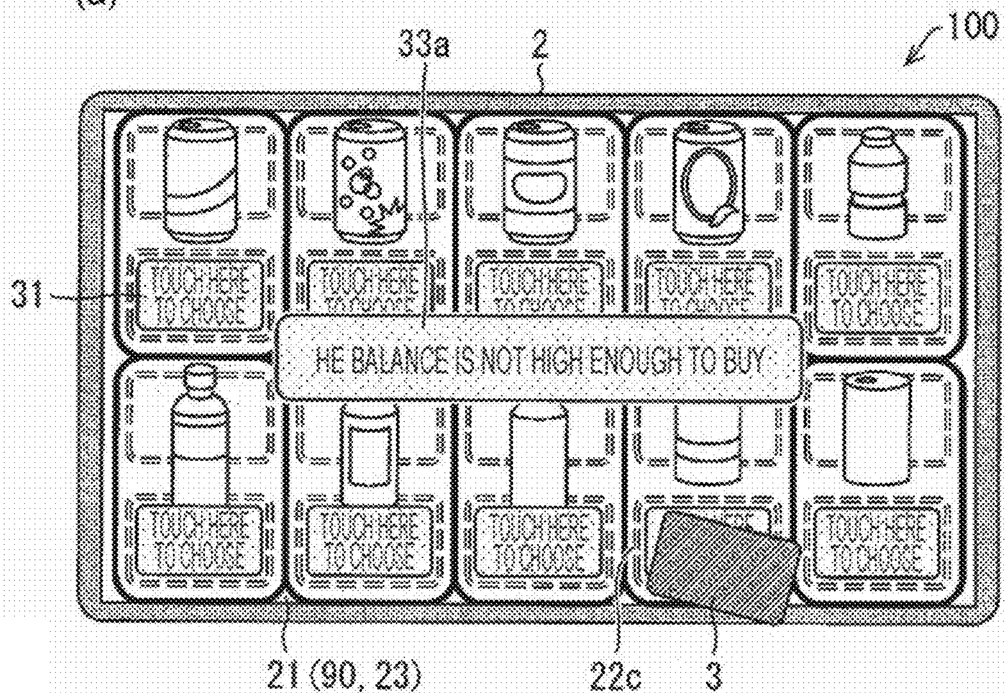
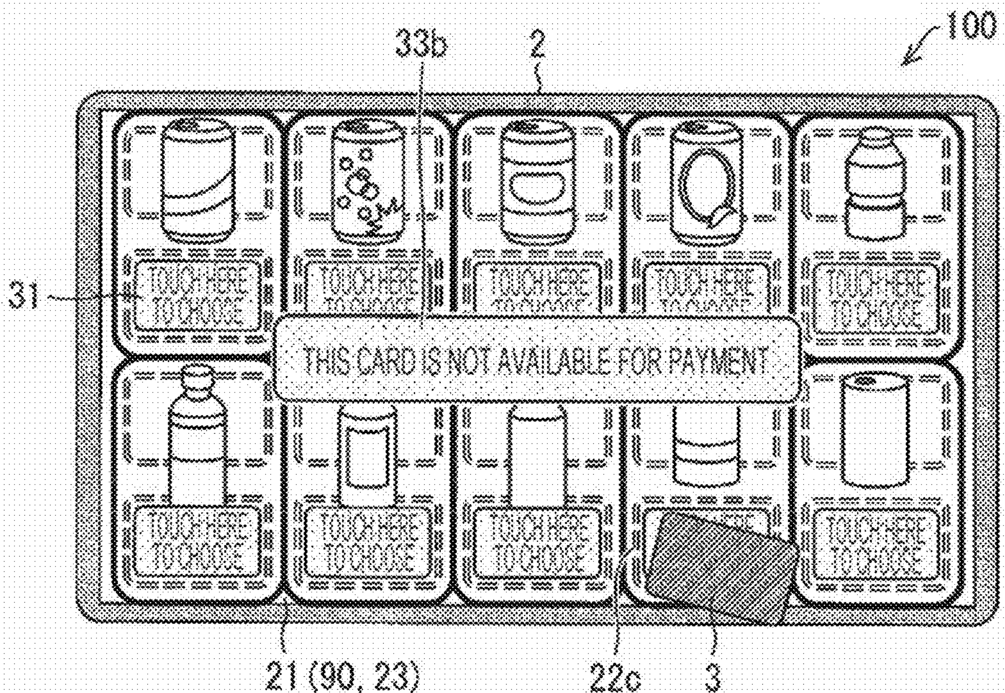

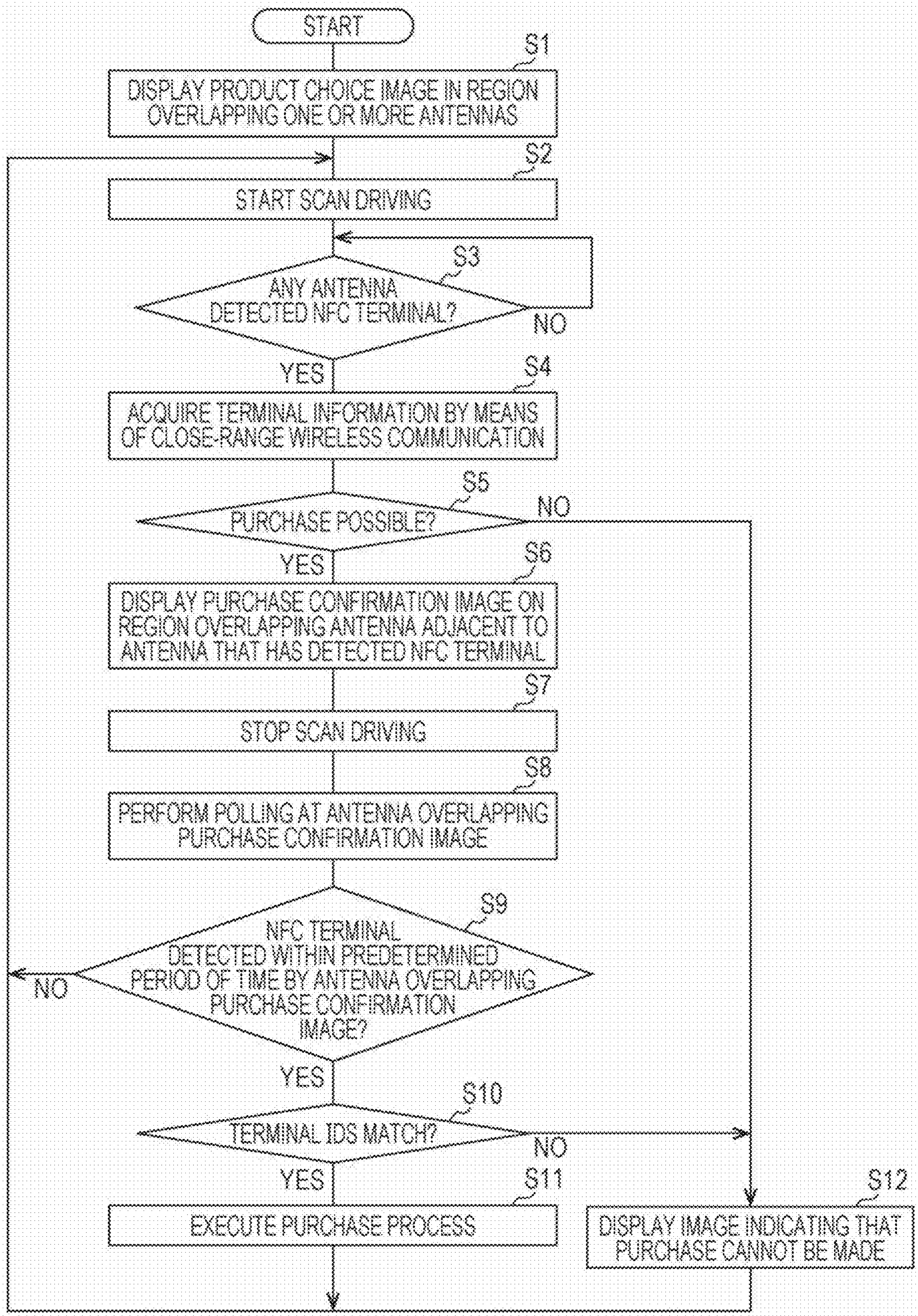
FIG. 8
START
S1
DISPLAY PRODUCT CHOICE IMAGE IN REGION OVERLAPPING ONE OR MORE ANTENNAS
S2
START SCAN DRIVING
S3
ANY ANTENNA DETECTED NFC TERMINAL?
NO
YES
S4
ACQUIRE TERMINAL INFORMATION BY MEANS OF CLOSE-RANGE WIRELESS COMMUNICATION
S5
PURCHASE POSSIBLE?
NO
YES
S6
DISPLAY PURCHASE CONFIRMATION IMAGE ON REGION OVERLAPPING ANTENNA ADJACENT TO ANTENNA THAT HAS DETECTED NFC TERMINAL
S7
STOP SCAN DRIVING
S8
PERFORM POLLING AT ANTENNA OVERLAPPING PURCHASE CONFIRMATION IMAGE
S9
NFC TERMINAL DETECTED WITHIN PREDETERMINED PERIOD OF TIME BY ANTENNA OVERLAPPING PURCHASE CONFIRMATION IMAGE?
NO
YES
S10
TERMINAL IDS MATCH?
NO
YES
S11
EXECUTE PURCHASE PROCESS
S12
DISPLAY IMAGE INDICATING THAT PURCHASE CANNOT BE MADE (a)
100
2
31
TOUCH HERE TO CHOOSE
CANCEL
TOUCH HERE TO BUY
22d
32
21 (90, 23)
22e
32a
3
(b)
100
2
31
TOUCH HERE TO CHOOSE
32b
CANCEL
BUY ONE
BUY TWO
22f
32c
BUY THREE
22b
32d
21 (90, 23)
22e
32a
3

FIG. 11
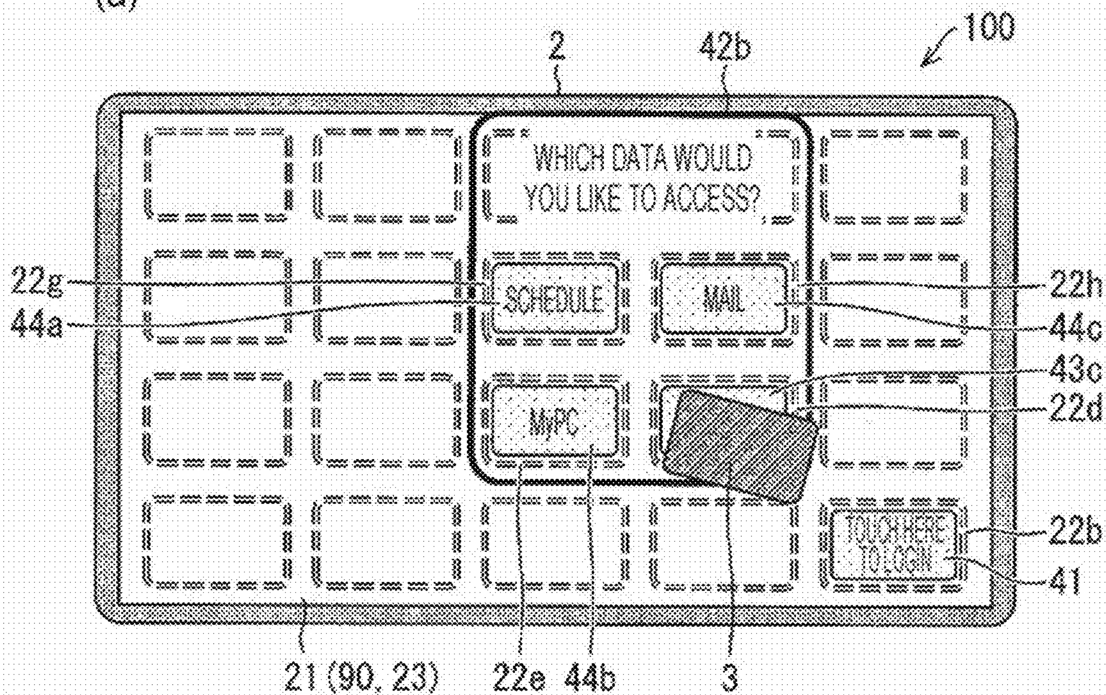
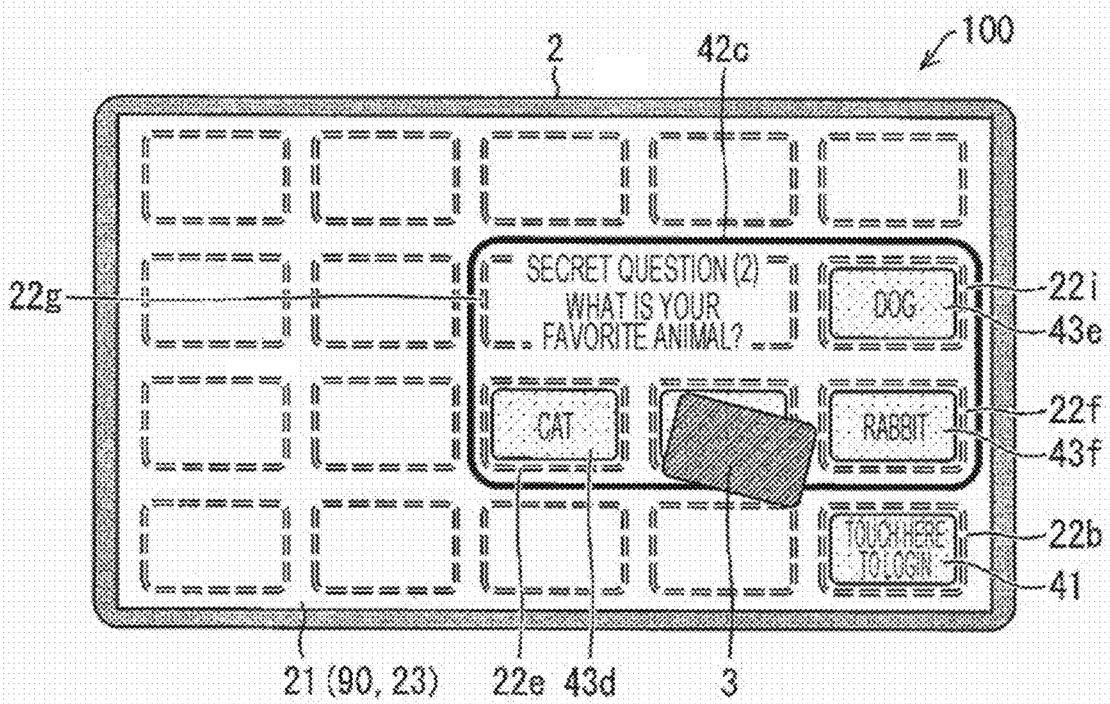

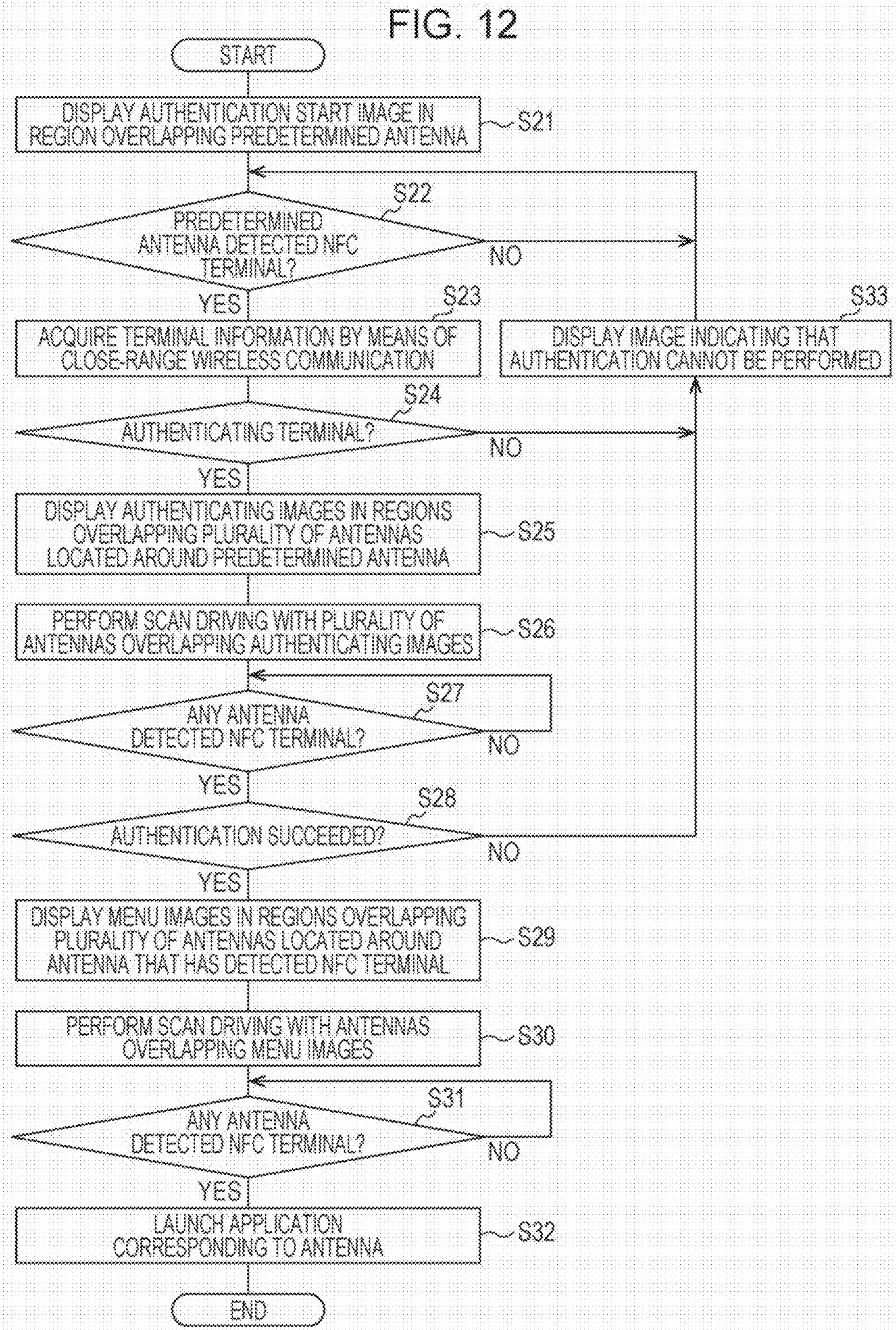
FIG. 12
START
DISPLAY AUTHENTICATION START IMAGE IN REGION OVERLAPPING PREDETERMINED ANTENNA
S21
PREDETERMINED ANTENNA DETECTED NFC TERMINAL?
S22
NO
YES
ACQUIRE TERMINAL INFORMATION BY MEANS OF CLOSE-RANGE WIRELESS COMMUNICATION
S23
DISPLAY IMAGE INDICATING THAT AUTHENTICATION CANNOT BE PERFORMED
S33
AUTHENTICATING TERMINAL?
S24
NO
YES
DISPLAY AUTHENTICATING IMAGES IN REGIONS OVERLAPPING PLURALITY OF ANTENNAS LOCATED AROUND PREDETERMINED ANTENNA
S25
PERFORM SCAN DRIVING WITH PLURALITY OF ANTENNAS OVERLAPPING AUTHENTICATING IMAGES
S26
ANY ANTENNA DETECTED NFC TERMINAL?
S27
NO
YES
AUTHENTICATION SUCCEEDED?
S28
NO
YES
DISPLAY MENU IMAGES IN REGIONS OVERLAPPING PLURALITY OF ANTENNAS LOCATED AROUND ANTENNA THAT HAS DETECTED NFC TERMINAL
S29
PERFORM SCAN DRIVING WITH ANTENNAS OVERLAPPING MENU IMAGES
S30
ANY ANTENNA DETECTED NFC TERMINAL?
S31
NO
YES
LAUNCH APPLICATION CORRESPONDING TO ANTENNA
S32
END FIG. 13
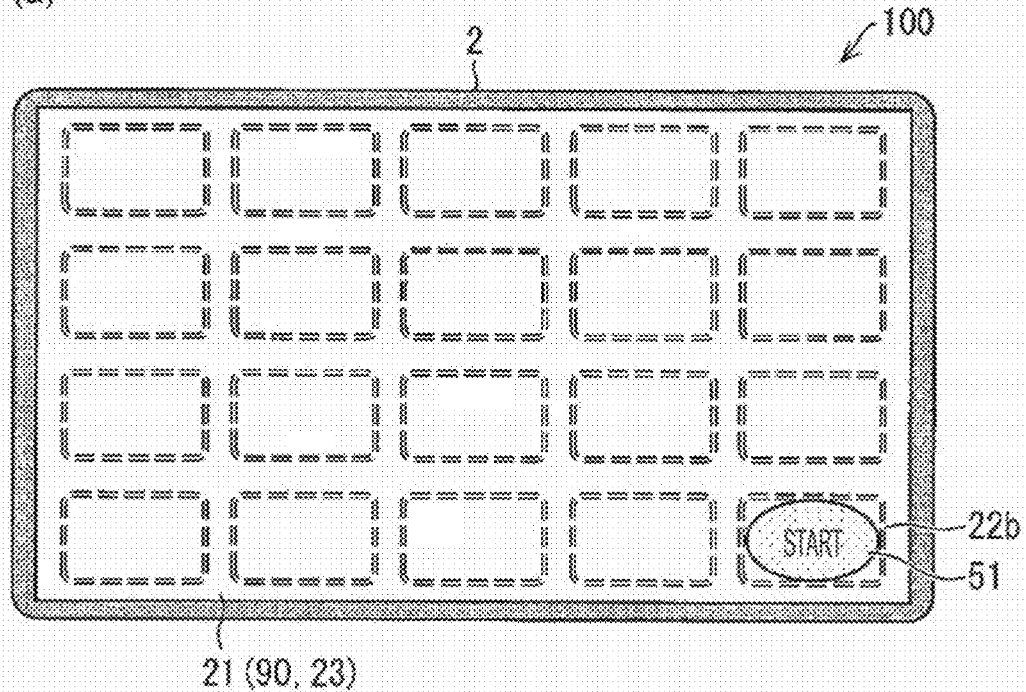
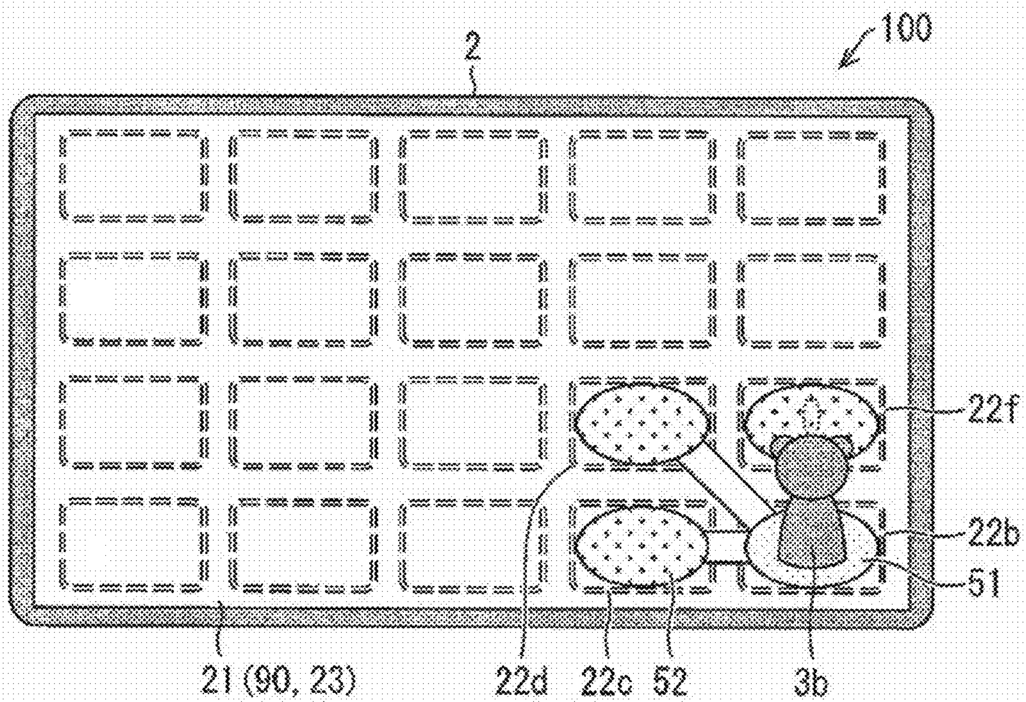

FIG. 14
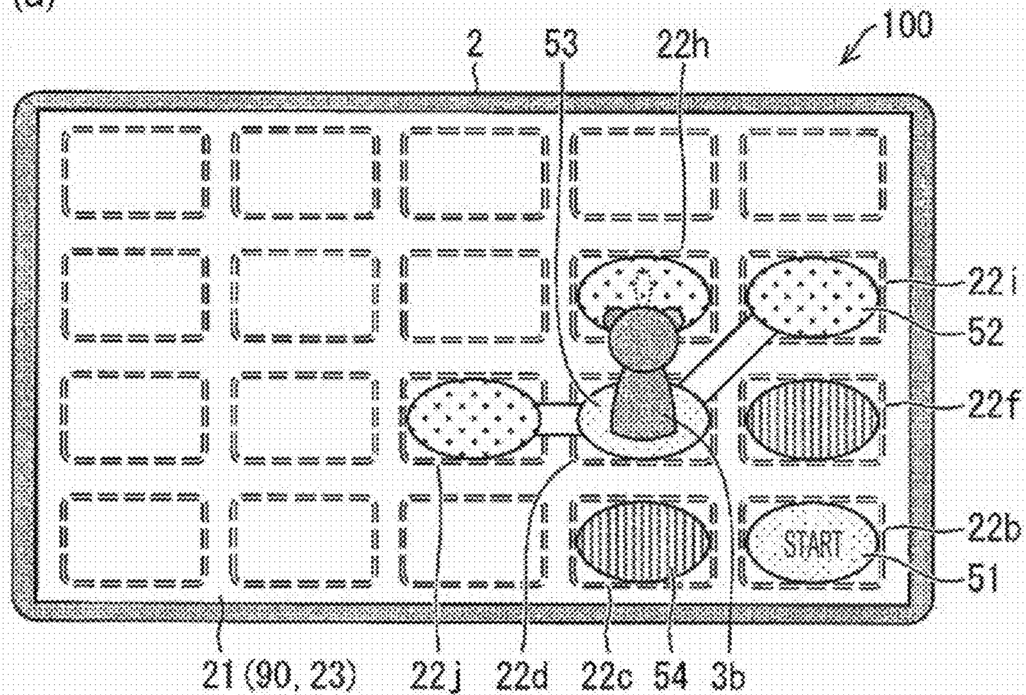
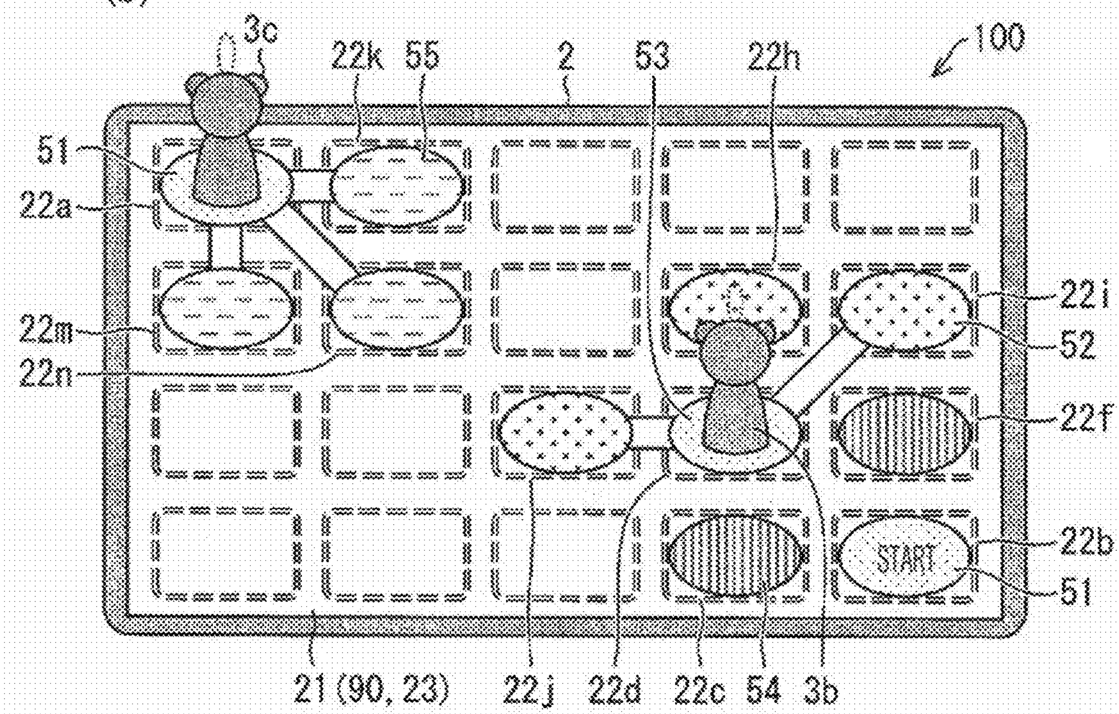

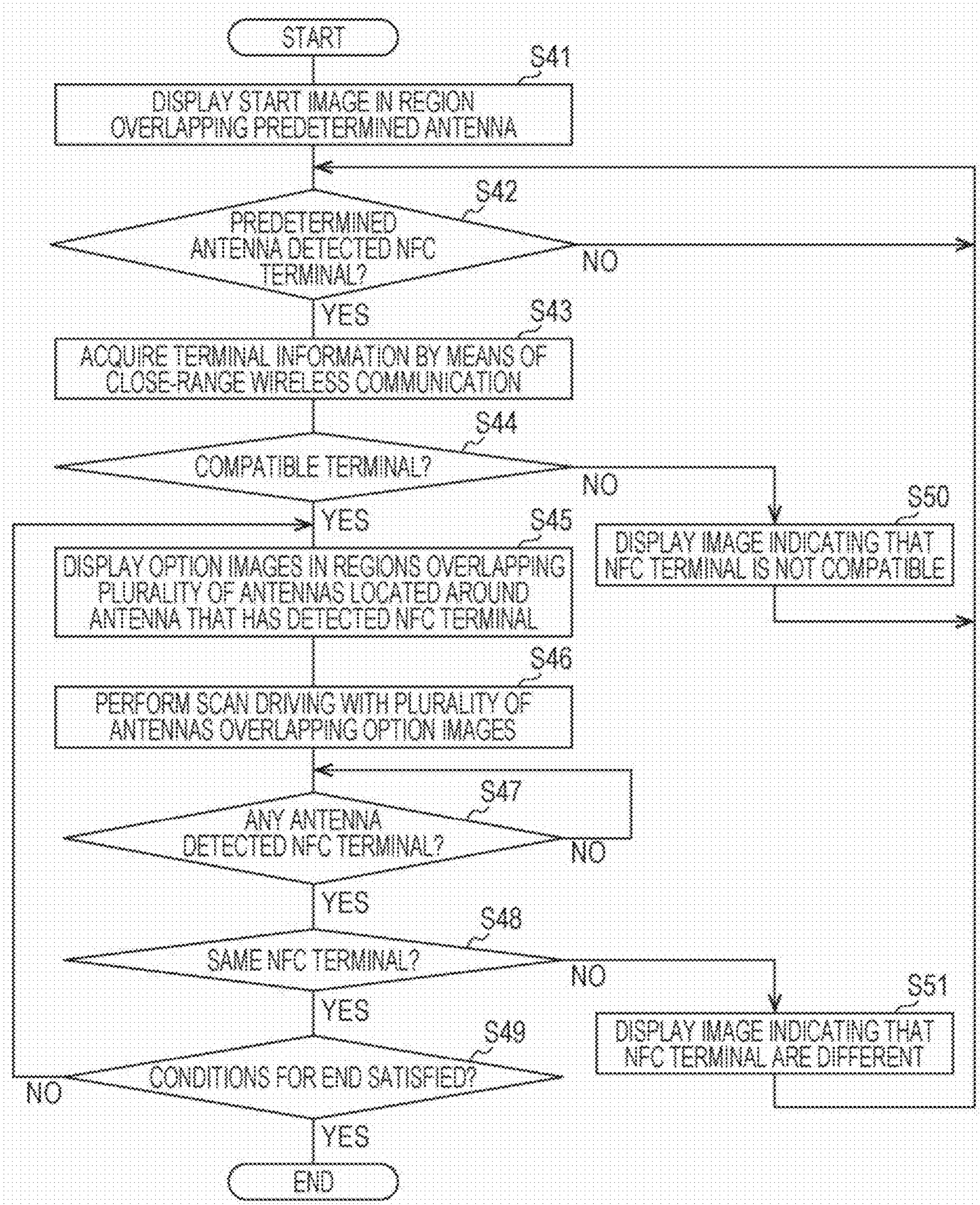
FIG. 15
START
S41
DISPLAY START IMAGE IN REGION OVERLAPPING PREDETERMINED ANTENNA
S42
PREDETERMINED ANTENNA DETECTED NFC TERMINAL?
NO
YES
S43
ACQUIRE TERMINAL INFORMATION BY MEANS OF CLOSE-RANGE WIRELESS COMMUNICATION
S44
COMPATIBLE TERMINAL?
NO
YES
S45
DISPLAY OPTION IMAGES IN REGIONS OVERLAPPING PLURALITY OF ANTENNAS LOCATED AROUND ANTENNA THAT HAS DETECTED NFC TERMINAL
S50
DISPLAY IMAGE INDICATING THAT NFC TERMINAL IS NOT COMPATIBLE
S46
PERFORM SCAN DRIVING WITH PLURALITY OF ANTENNAS OVERLAPPING OPTION IMAGES
S47
ANY ANTENNA DETECTED NFC TERMINAL?
NO
YES
S48
SAME NFC TERMINAL?
NO
YES
S51
DISPLAY IMAGE INDICATING THAT NFC TERMINAL ARE DIFFERENT
S49
CONDITIONS FOR END SATISFIED?
NO
YES
END (a)
100a
2a
21(90, 23)
61
(22A)
(b)
62a
(22B)
62b
(22C)
62c
(22D)
100a
2a
A
B
C
21(90, 23)
3
61
(22A)
(c)
100b
2b
21(90, 23)
63
(22E)
(d)
64a
(22F)
64b
(22G)
100b
2b
A
B
C
D
21(90, 23)
64c
(22H)
64d
(22I)
3
63
(22E)
(e)
100c
2c
21(90, 23)
65
(22J)
(f)
66b
(22M)
66a
(22K)
100c
2c
A
B
C
21(90, 23)
66c
(22N)
65
(22J)
3

(a)
100d
2d
22P
21(90, 23)
67
(b)
100d
2d
22Q
22P
22R
A
B
21(90, 23)
68a
67
3
68b
(c)
100e
2e
22S
21(90, 23)
69
(d)
100e
2e
22T
22S
70c
22U
C
A
B
21(90, 23)
70a
69
3
70b

FIG. 20
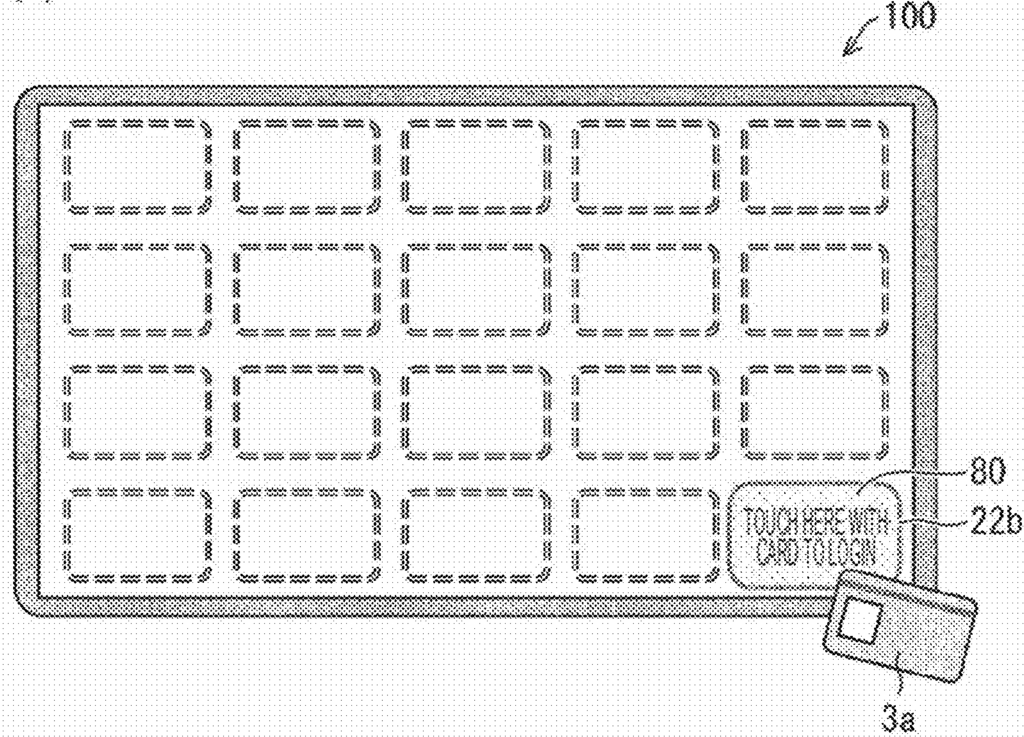
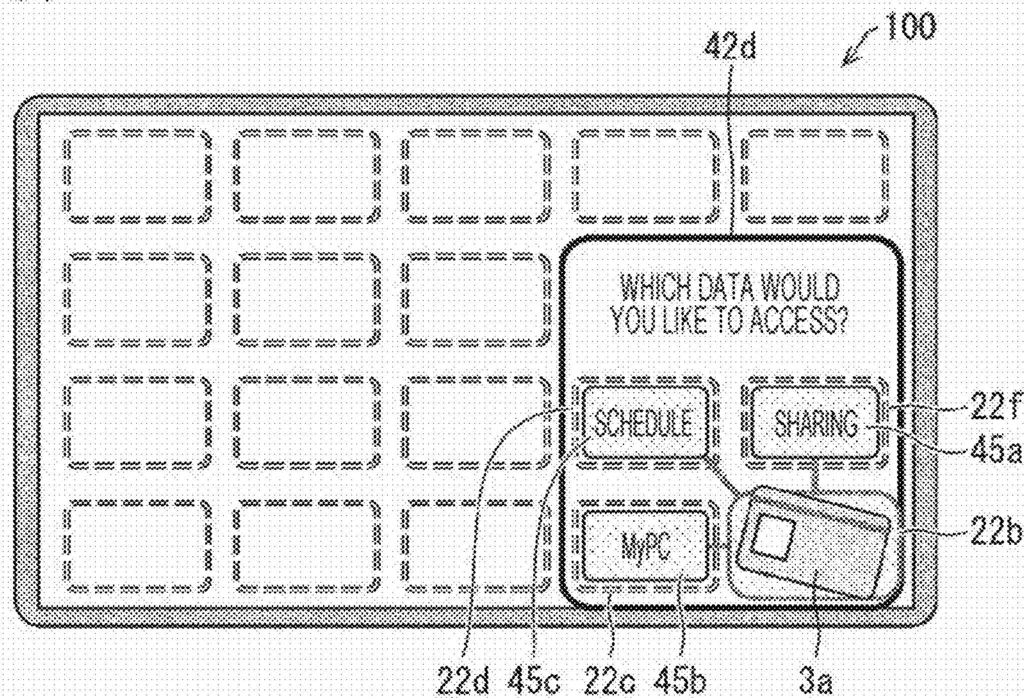

FIG. 21
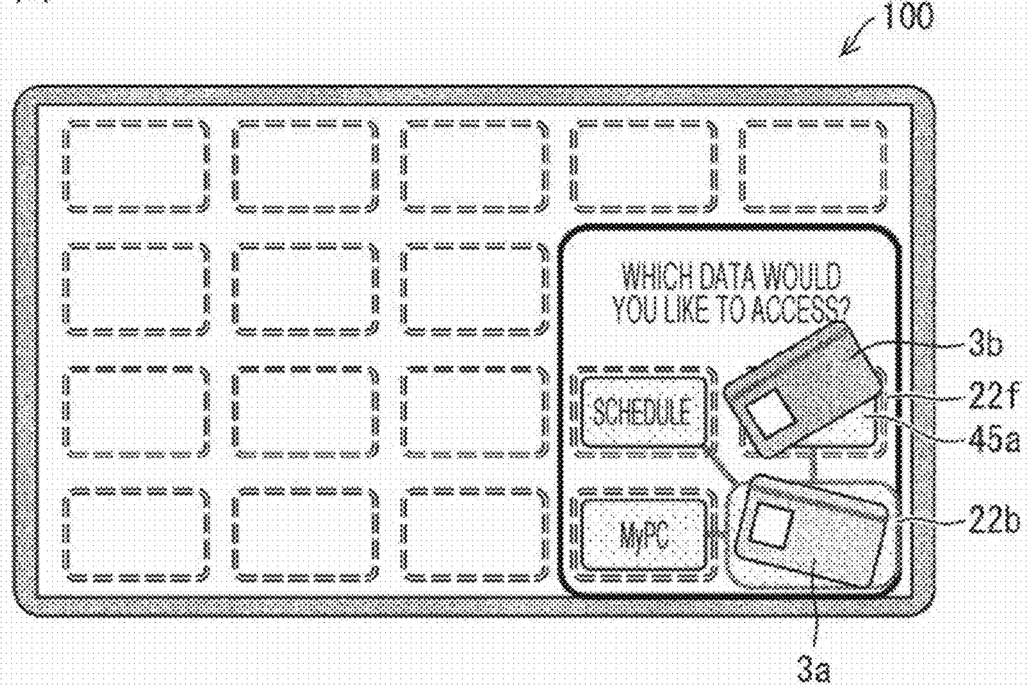
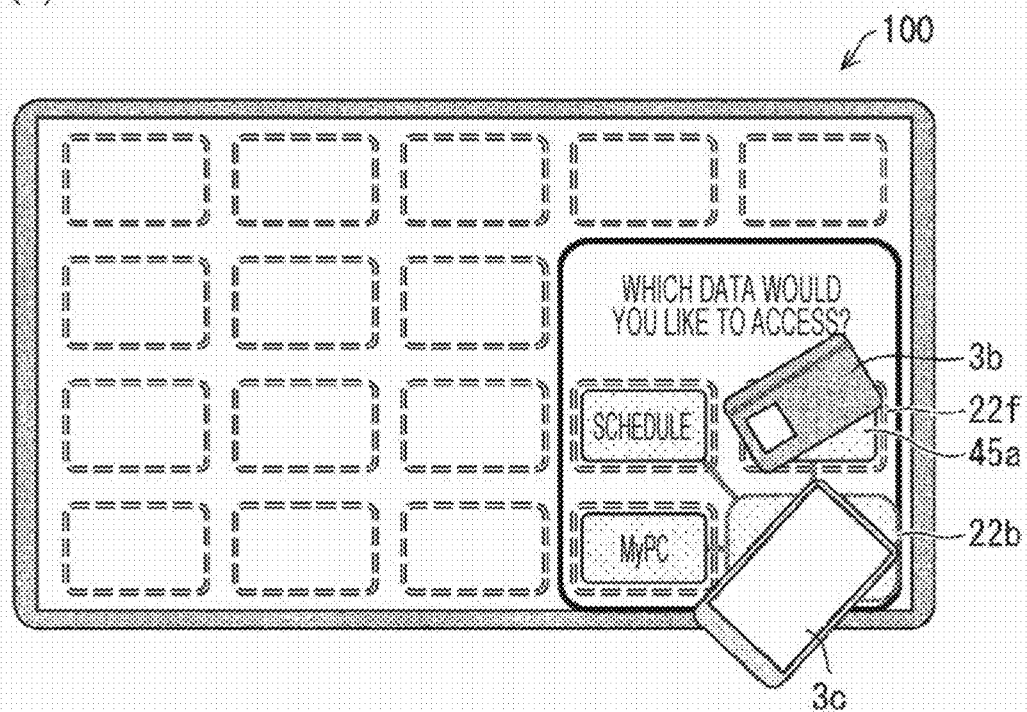

FIG. 22
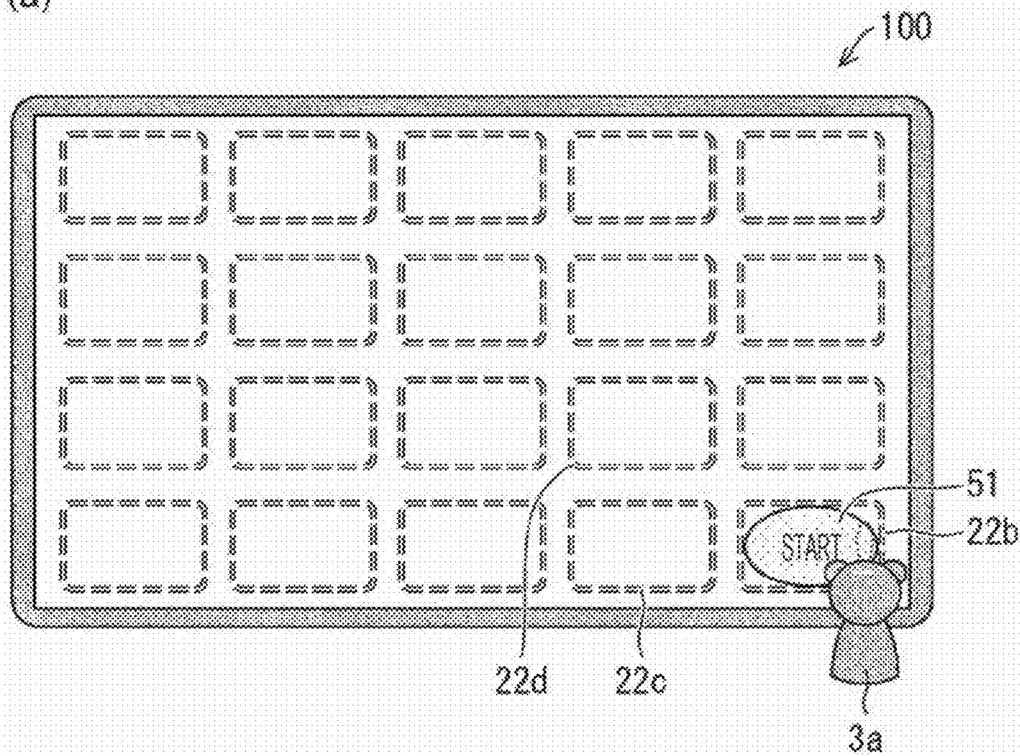
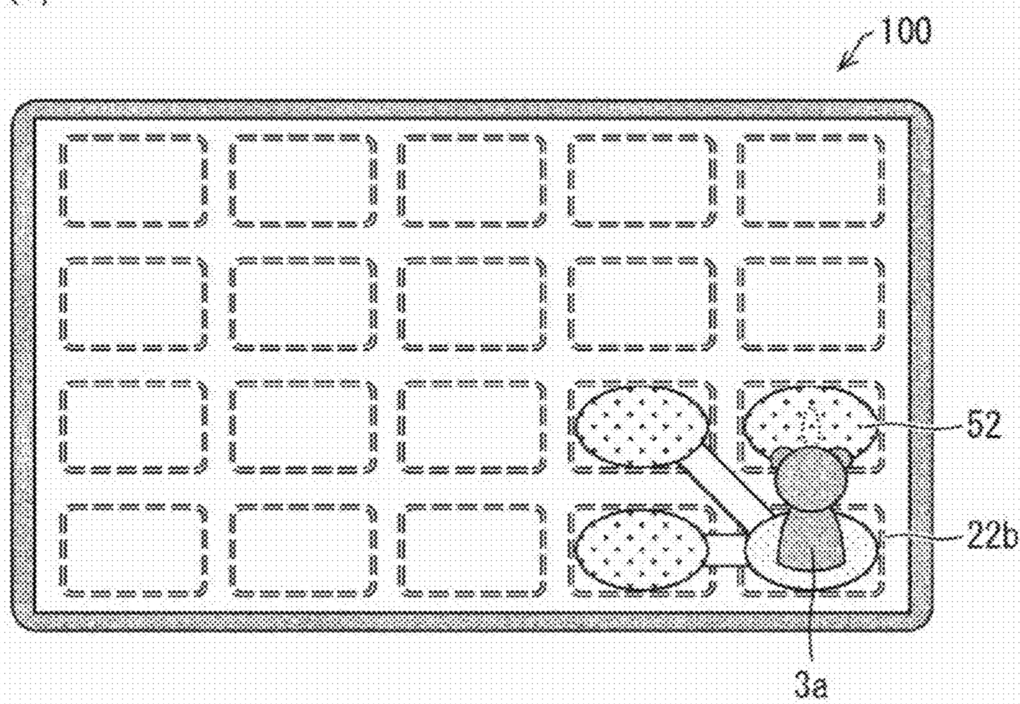

FIG. 23
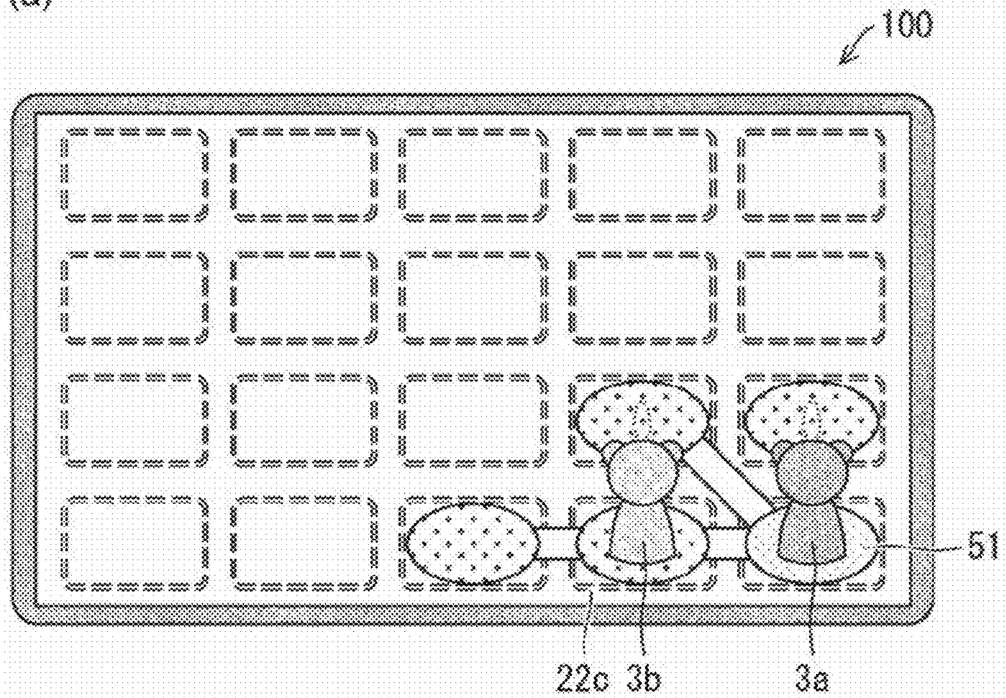
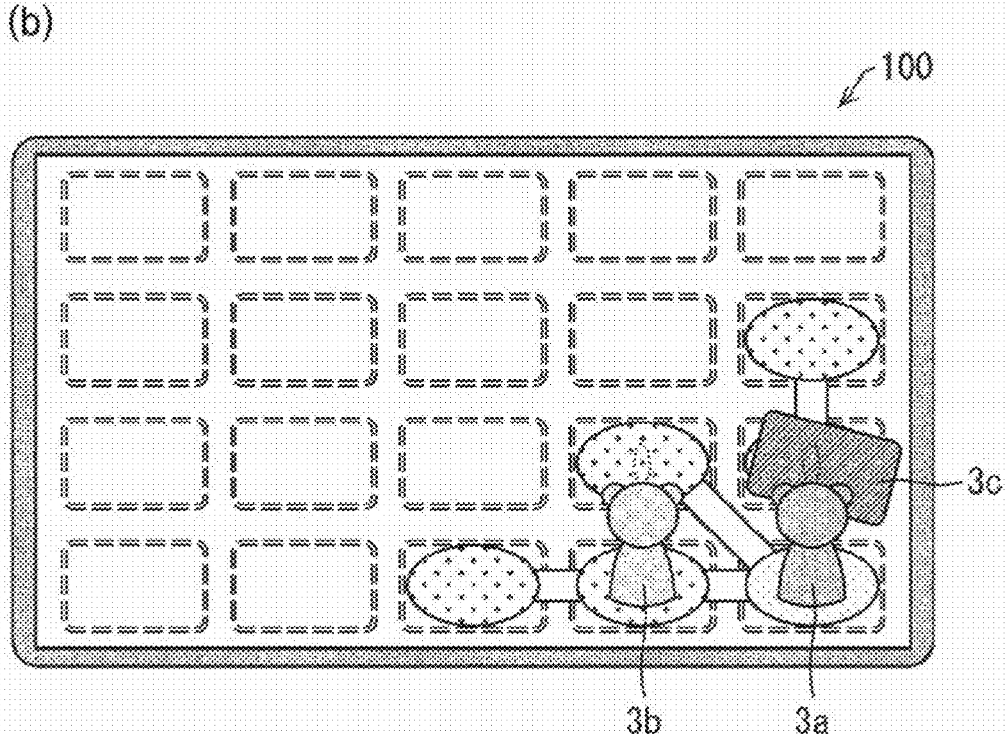

FIG. 24
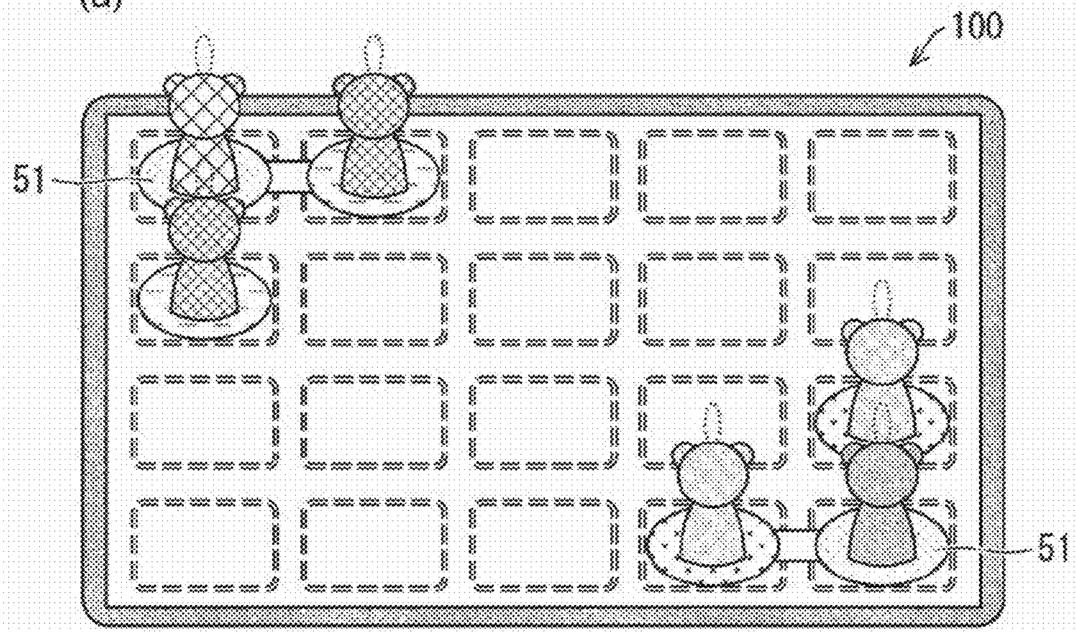
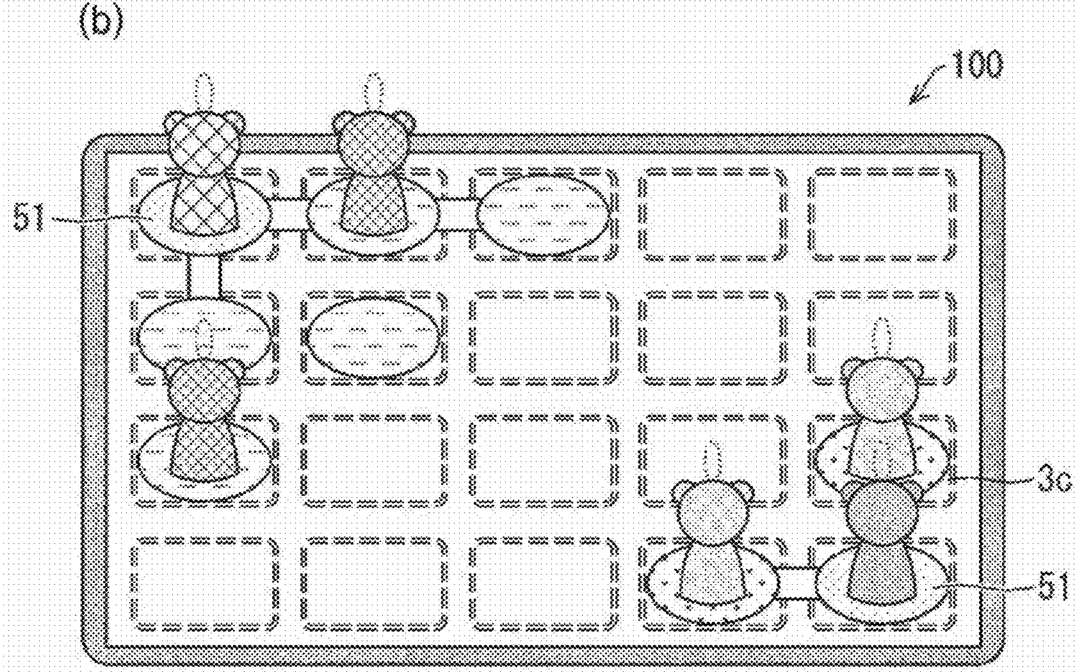

FIG. 25
(a)
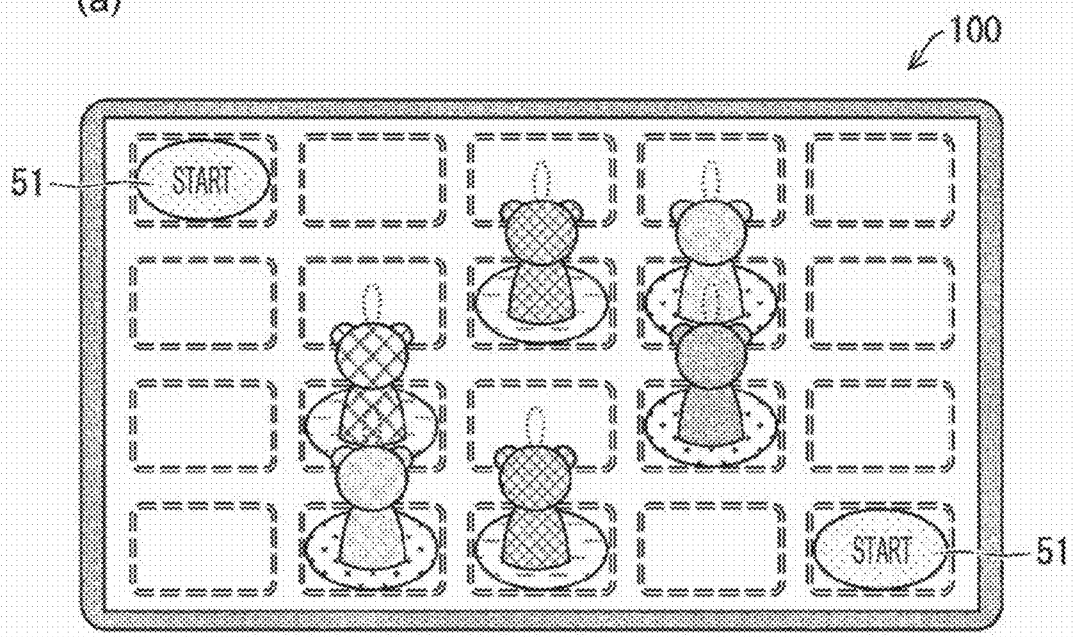
(b)
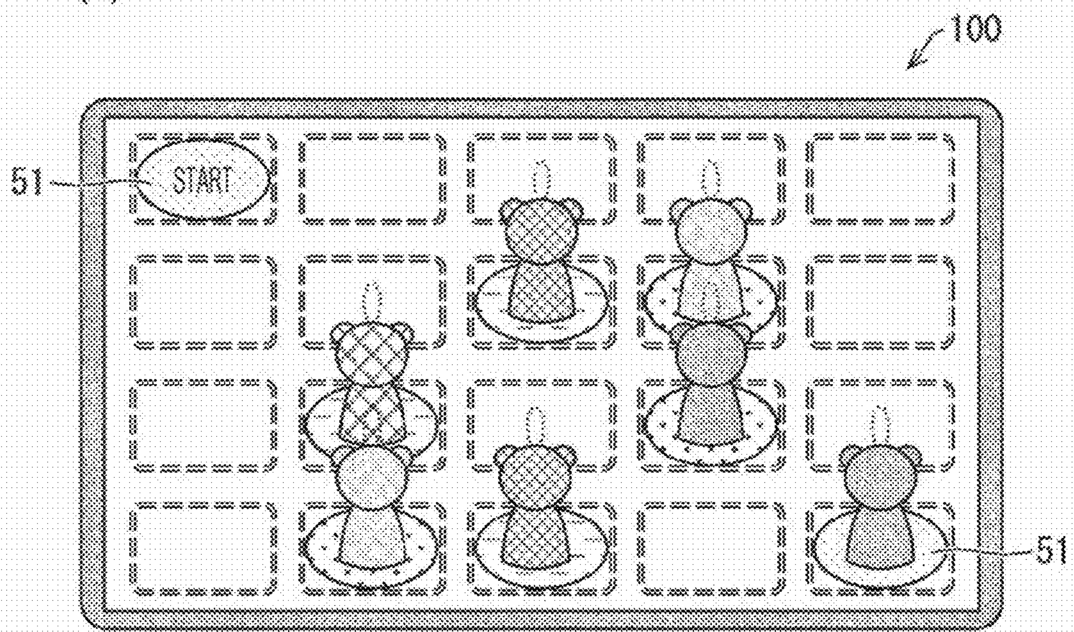

CONTROL DEVICE, CONTROL METHOD OF CONTROL DEVICE, AND COMMUNICATION DEVICE

TECHNICAL FIELD

The present disclosure relates, for example, to a control device for controlling a communication device including a display unit and an antenna unit including a plurality of antennas that perform close-range wireless communication with an information communication terminal.

BACKGROUND ART

In the field of communication devices that perform close-range wireless communication with information communication terminals, a communication device including a plurality of antennas for performing close-range wireless communication has recently been under development.

Including the plurality of antennas makes it possible to apply the communication device to a variety of services. For example, different pieces of information can be transmitted to an information communication terminal through each separate antenna, or payments for different products can be made through each separate antenna. Further, PTL 1 describes playing a game such as chess or shogi through multiple rounds of close-range wireless communication involving the use of a plurality of communication units.

CITATION LIST

Patent Literature

PTL 1: Japanese Unexamined Patent Application Publication No. 2016-177814 (published on Oct. 6, 2016)

SUMMARY OF INVENTION

Technical Problem

Meanwhile, in a case where a payment process is performed through multiple rounds of close-range wireless communication, it is necessary that a user be able to smoothly perform multiple rounds of close-range wireless communication. However, the conventional art does not disclose such a technical idea.

An aspect of the present disclosure was made in view of the foregoing problems, and has as an object to achieve, for example, a control device for controlling a communication device while allowing a user to smoothly execute multiple rounds of close-range wireless communication involving the use of different antennas.

Solution to Problem

In order to solve the foregoing problem, a control device according to an aspect of the present disclosure is a control device for controlling a communication device including a display unit and an antenna unit including a plurality of antennas that perform close-range wireless communication with an information communication terminal, the control device including a display control unit that, when at least one antenna of the antenna unit has performed close-range wireless communication with the information communication terminal, effects a display of a communication prompter image that prompts for close-range wireless communication with an antenna that is different from the antenna that has performed the close-range wireless communication.

Further, in order to solve the foregoing problems, a method for controlling a controlling device according to an aspect of the present disclosure is a method for controlling a controlling device for controlling a communication device including a display unit and an antenna unit including a plurality of antennas that perform close-range wireless communication with an information communication terminal, the method including: a communication control step of causing at least one antenna of the antenna unit to perform close-range wireless communication with the information communication terminal; and a display control step of effecting a display of a communication prompter image that prompts for close-range wireless communication with an antenna that is different from the antenna that has performed the close-range wireless communication in the communication control step.

Advantageous Effects of Invention

An aspect of the present disclosure brings about an effect of allowing a user to smoothly execute multiple rounds of close-range wireless communication involving the use of different antennas.

BRIEF DESCRIPTION OF DRAWINGS

FIG. 6 is a diagram showing an example of an image that is displayed on the NFC display shown in FIG. 1.

FIG. 8 is a flow chart showing an example of the flow of a payment process that is executed by the information processing device shown in FIG. 1.

FIG. 11 is a diagram showing an example of a screen that is displayed on the NFC display according to Embodiment 2.

FIG. 12 is a flow chart showing an example of the flow of a user authentication process that is executed by an information processing device according to Embodiment 2.

FIG. 13 is a diagram showing an example of a screen that is displayed on an NFC display according to Embodiment 3.

FIG. 14 is a diagram showing an example of a screen that is displayed on the NFC display according to Embodiment 3.

FIG. 15 is a flow chart showing an example of the flow of an option display process that is executed by an information processing device according to Embodiment 3.

FIG. 20 is a diagram showing an example of a screen that is displayed on an NFC display according to Modification 2 of Embodiment 2.

FIG. 21 is a diagram showing an example of a screen that is displayed on the NFC display according to Modification 2 of Embodiment 2.

FIG. 22 is a diagram showing an example of a screen that is displayed on an NFC display according to a modification of Embodiment 3.

FIG. 23 is a diagram showing an example of a screen that is displayed on the NFC display according to the modification of Embodiment 3.

FIG. 24 is a diagram showing an example of a screen that is displayed on the NFC display according to the modification of Embodiment 3.

FIG. 25 is a diagram showing an example of a screen that is displayed on the NFC display according to the modification of Embodiment 3.

DESCRIPTION OF EMBODIMENTS

Each of the following embodiments describes an example of data processing involving the use of close-range wireless communication. The term "close-range wireless communication" refers to short-range wireless communication in general. Close-range wireless communication includes communication involving the use of an RFID (radio frequency identification) technology. Examples of RFID technologies include non-contact IC cards, non-contact IC tags, and the like. Each of the following embodiments is described by illustrating NFC (near field communication) as an example of close-range wireless communication.

Embodiment 1

Embodiment 1 of the present disclosure is described in detail below with reference to FIGS. 1 to 9.

(Brief Overview of NFC System 100)

Figure 1:
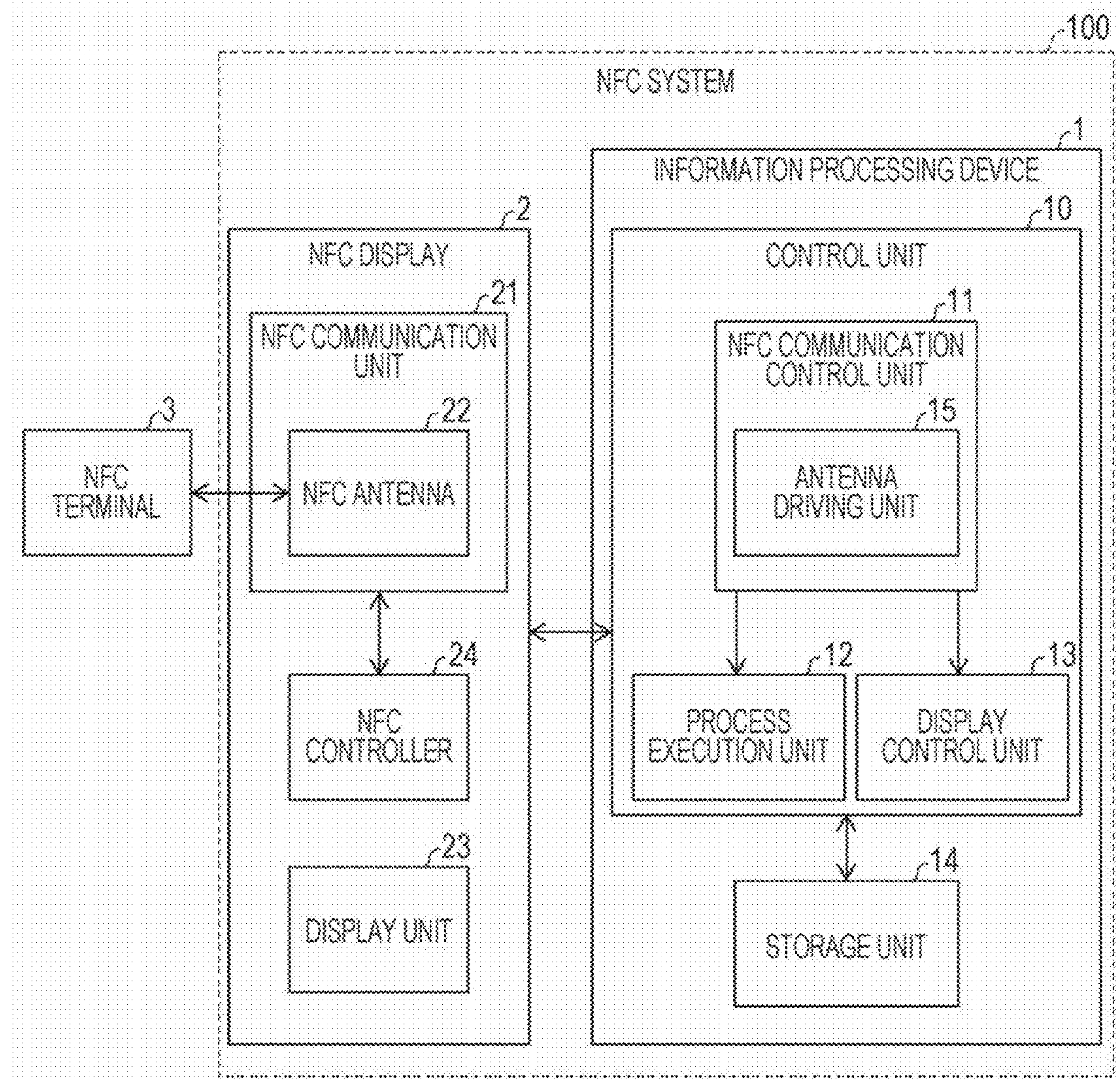
FIG. 1 is a functional block diagram showing an example of a configuration of the main components of an information processing device 1 and an NFC display 2 of an NFC system according to Embodiment 1 of the present disclosure.

First, a brief overview of an NFC system 100 is provided with reference to FIG. 1. FIG. 1 is a functional block diagram showing an example of a configuration of the main components of an information processing device 1 (control device) and an NFC display 2 (communication device) of the NFC system 100.

The NFC system 100 performs close-range wireless communication with an NFC terminal 3 (information communication terminal) shown in FIG. 1, and executes a process according to a result of the communication. As illustrated, the NFC system 100 includes the information processing device 1 and the NFC display 2. The information processing device 1 and the NFC display 2 may be separate entities that are communicably connected to each other by cable or radio or may be integrated with each other.

The NFC terminal 3 is an information processing terminal that is capable of, by performing close-range wireless communication with the NFC system 100, causing the NFC system 100 to execute at least one process. The NFC terminal 3 transmits terminal information stored therein to the NFC system 100 by means of close-range wireless communication, and the NFC system 100 executes a process in accordance with the terminal information. Examples of the terminal information include, but are not limited to, a terminal ID for identifying the NFC terminal 3, terminal data that is unique information possessed by the NFC terminal 3, and the like. In addition, the terminal information may include a user ID for identifying a user who uses the NFC terminal 3, a mail address used by the user, and the like. The user ID may be an ID for identifying the user in an application, a service, or the like that is available through the NFC terminal 3. Further, in a case where the NFC terminal 3 is a terminal including an electronic money function, the terminal information may include information indicating an electronic money balance.

The NFC terminal 3 is not limited to any particular type, provided it is an information processing terminal that is capable of close-range wireless communication with the NFC system 100. Examples of the NFC terminal 3 include an object (such as a card or a figure) with an NFC tag attached thereto, a portable terminal having an NFC communication function (also referred to as "NFC-equipped mobile terminal"), and the like.

(Configuration of Main Components of NFC Display 2)

Figure 2:
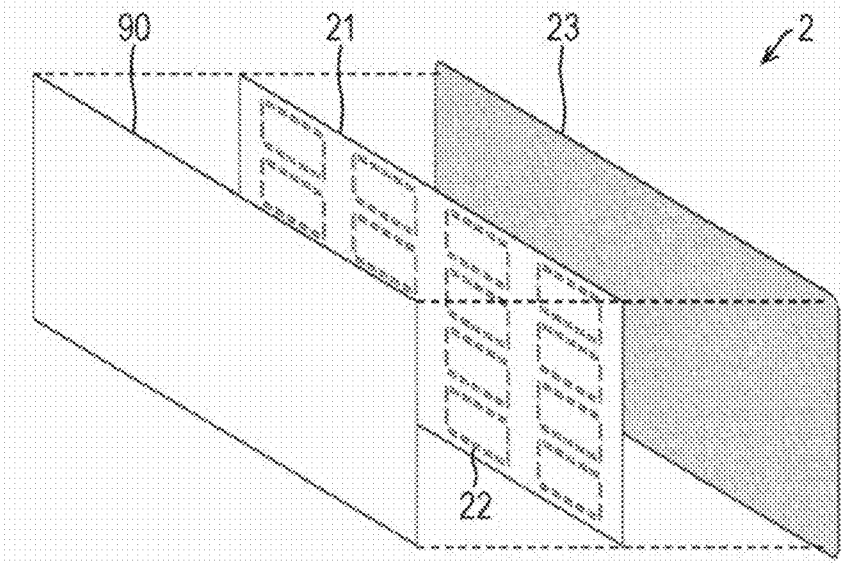
FIG. 2 is a diagram showing a specific configuration of the NFC display shown FIG. 1.
Figure 3:
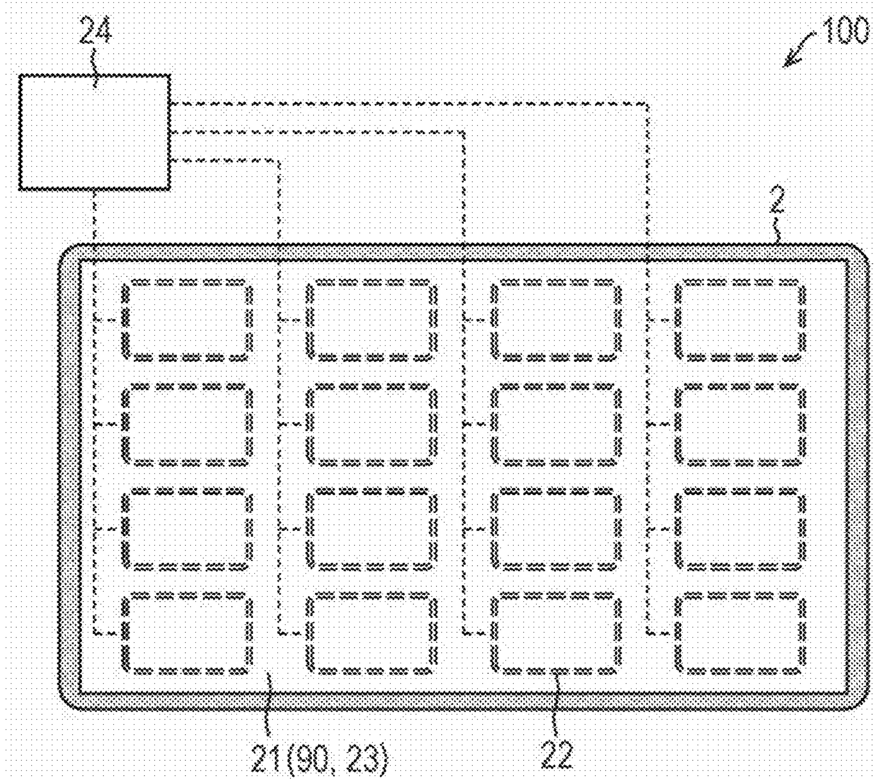
FIG. 3 is a diagram showing an example of wiring in the NFC display shown in FIG. 1.
Figure 4:
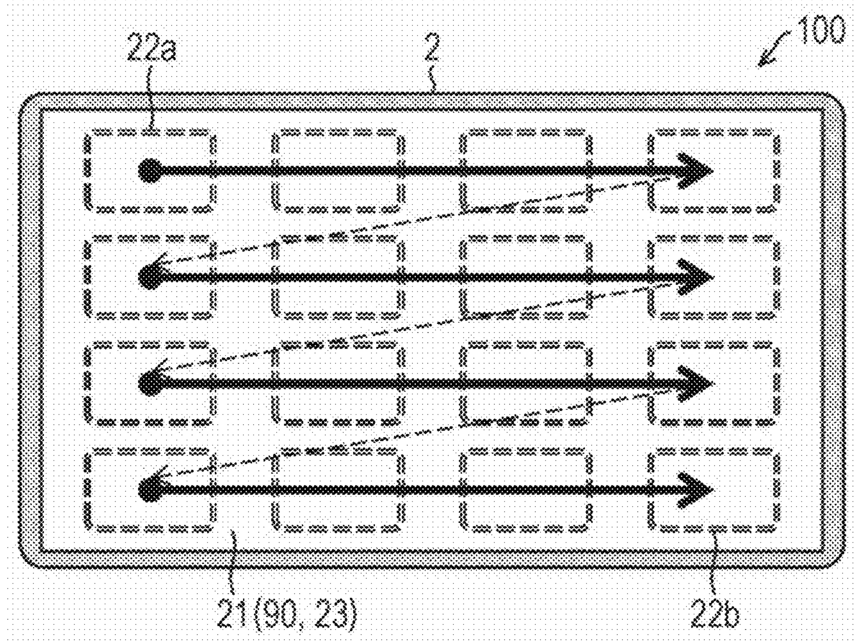
FIG. 4 is a diagram showing an example of scan driving that is executed by the NFC display shown in FIG. 1.

Next, a configuration of the main components of the NFC display 2 is described with reference to FIGS. 1 to 4. FIG. 2 is a diagram showing a specific configuration of the NFC display 2. FIG. 3 is a diagram showing an example of wiring in the NFC display 2. FIG. 4 is a diagram showing an example of scan driving that is executed by the NFC display 2.

The NFC display 2 is a display including a function of performing close-range wireless communication with the NFC terminal 3. As shown in FIG. 1, the NFC display 2 includes an NFC communication unit 21 (antenna unit), a display unit 23, and an NFC controller 24.

The NFC communication unit 21 is a communication device for performing close-range wireless communication with the NFC terminal 3. Specifically, the NFC communication unit 21 is an antenna module including an NFC antenna 22 (antenna). The NFC antenna 22 is a transparent antenna having a function of detecting the NFC terminal 3 and performing close-range wireless communication with the NFC terminal 3. The NFC antenna 22 is configured to be able to detect the NFC terminal 3 or perform close-range wireless communication with the NFC terminal 3 even when the NFC terminal 3 is located at a certain distance (e.g. approximately 2 cm to 4 cm) from the NFC display 2. This is intended to improve the sensitivity and speed of response to the approach of the NFC terminal 3. The term "approach" as used herein encompasses contact of the NFC terminal 3 with the NFC display 2.

According to the present embodiment, the NFC terminal 3 and the NFC antenna 22 perform two types of close-range wireless communication. Specifically, the NFC terminal 3 and the NFC antenna 22 perform close-range wireless communication for the NFC antenna 22 to detect the NFC terminal 3 and close-range wireless communication for the execution of a process by the NFC system 100. The former type of close-range wireless communication is hereinafter referred to as "polling", and the latter type of close-range wireless communication is hereinafter referred to as "data transmission".

Polling is close-range wireless communication for determining, for each NFC antenna 22, whether the NFC terminal 3 is approaching the NFC antenna 22. The NFC antenna 22 outputs a detection signal for detecting the NFC terminal 3 and, in a case where the NFC terminal 3 is approaching the NFC antenna 22, acquires a reply signal from the NFC terminal 3. Although the description assumes that the reply signal contains the terminal ID for identifying the NFC terminal 3, the reply signal may contain other information (such as a terminal type).

Data transmission is close-range wireless communication by which data for the NFC system 100 to perform various types of process or data based on various types of process performed are transmitted and received between the NFC terminal 3 and the NFC antenna 22. Taking a payment process as an example of the various types of process, the NFC antenna 22 acquires, from the NFC terminal 3, information needed for the payment. Examples of the information needed for the payment include, but are not limited to, an electronic money balance and information regarding a credit card registered by the user (such as a card number and the year and month of validity). Further, taking a user authentication process (also referred to as "login process") as an example of the various types of process, the NFC antenna 22 acquires, from the NFC terminal 3, information needed for the authentication. Examples of the information needed for the authentication include, but are not limited to, a user ID and a password that the user set in advance in an application or service performing the authentication process. The password may be a string of alphanumeric characters or a string of characters indicating an answer to a question chosen by the user.

The display unit 23 is a display device that displays an image. Examples of the display unit 23 include, but are not limited to, an LCD (liquid crystal display). Further, the display unit 23 may include a backlight.

An example configuration of various types of device in the NFC display 2 is described here with reference to FIG. 2. According to the present embodiment, the NFC display 2 includes the display unit 23, the NFC communication unit 21 stacked on the display unit 23, and a cover glass 90 (not illustrated in FIG. 1) stacked on the NFC communication unit 21. That is, the NFC display 2 is configured such that the NFC communication unit 21 is sandwiched between the cover glass 90 and the display unit 23.

As shown in FIG. 2, the NFC communication unit 21 includes a plurality of the NFC antennas 22. In the example shown in FIG. 2, the number of NFC antennas 22 is twelve, and the NFC antennas 22 are arranged in a 3×4 matrix. Note, however, that this example is not intended to impose any limitation on the number and arrangement of NFC antennas 22. Another example of the number and arrangement of NFC antennas 22 will be described in Embodiment 4 below.

Further, while, in the example shown in FIG. 2, the NFC communication unit 21 and the display unit 23 are devices having substantially the same area, the NFC communication unit 21 and the display unit 23 may be different in area from each other. For example, the NFC communication unit 21 may be smaller in area than the display unit 23. In the case of this example, only some region of the NFC display 2 serves as a region capable of close-range wireless communication.

Further, while, in the example shown in FIG. 2, the display unit 23 is stacked on the NFC communication unit 21 (i.e. the NFC antennas 22), the display unit 23 does not need to be stacked on the NFC communication unit 21.

The NFC controller 24 controls how the NFC antennas 22 operate. Specifically, the NFC controller 24 controls driving of the NFC antennas 22 in accordance with control signals from the information processing device 1. According to the present embodiment, as shown in FIG. 3, the NFC controller 24 is connected to each NFC antenna 22 by cable. This allows the NFC controller 24 to bring each NFC antenna 22 into a driven state or a non-driven state. The term "driven state" refers to a state where close-range wireless communication with the NFC terminal 3 is executable. Further, the term "non-driven state" refers to a state where close-range wireless communication with the NFC terminal 3 is inexecutable. Further, the NFC controller 24 may be connected to the NFC antennas 22 by radio.

More specifically, in executing polling, the NFC controller 24 outputs, through an NFC antenna 22 that is in a driven state, a detection signal for detecting the NFC terminal 3. In a case where the NFC terminal 3 is approaching the NFC antenna 22, the NFC terminal 3 receives the detection signal and outputs a reply signal. By receiving this reply signal via the NFC antenna 22, the NFC controller 24 detects the NFC terminal 3.

According to the present embodiment, in order to detect the NFC terminal 3, the NFC controller 24 performs scan driving by which to change in a predetermined order from driving one NFC antenna 22 to driving another NFC antenna 22. That is, the NFC controller 24 performs polling (outputs a detection signal) by sequentially driving the NFC antennas 22. This causes only one NFC antenna 22 to be driven at a time. This allows the NFC display 2 to reduce power consumption and prevent adjacent NFC antennas 22 from interfering with each other.

The NFC controller 24 acquires, from the information processing device 1, a control signal containing driving order information by which antenna IDs for identifying the NFC antennas 22 and the order in which they are driven are associated with each other and cycle information indicating a polling cycle. In accordance with the control signal, the NFC controller 24 starts scan driving of the NFC antennas 22. For example, the NFC controller 24 may perform scanning driving from an NFC antenna 22*a* to an NFC antenna 22*b* in an order indicated by arrows in FIG. 4. According to the present embodiment, after having driven each of the NFC antennas 22 once in a predetermined order, the NFC controller 24 repeats the driving of the NFC antennas 22 in the predetermined order. That is, in the example shown in FIG. 4, after having driven the NFC antenna 22*b*, the NFC controller 24 drives the NFC antenna 22*a* to again perform the scan driving in the order indicated by the arrows.

Further, the NFC controller 24 stops the scan driving upon acquiring, from the information processing device 1, a control signal containing an antenna ID indicating a particular NFC antenna 22 and an instruction to execute polling. Then, the NFC controller 24 starts polling at the NFC antenna 22 indicated by the antenna ID contained in the control signal.

Further, in a case where the NFC controller 24 has detected the NFC terminal 3 with any of the NFC antennas 22 (i.e. in a case where the NFC controller 24 has received a reply signal), the NFC controller 24 notifies the information processing device 1 to that effect. The notification contains a terminal ID contained in the reply signal and an antenna ID indicating the NFC antenna 22 that has detected the NFC terminal 3.

(Brief Overview of Information Processing Device 1 and Configuration of Main Components of Information Processing Device 1)

Figure 5:
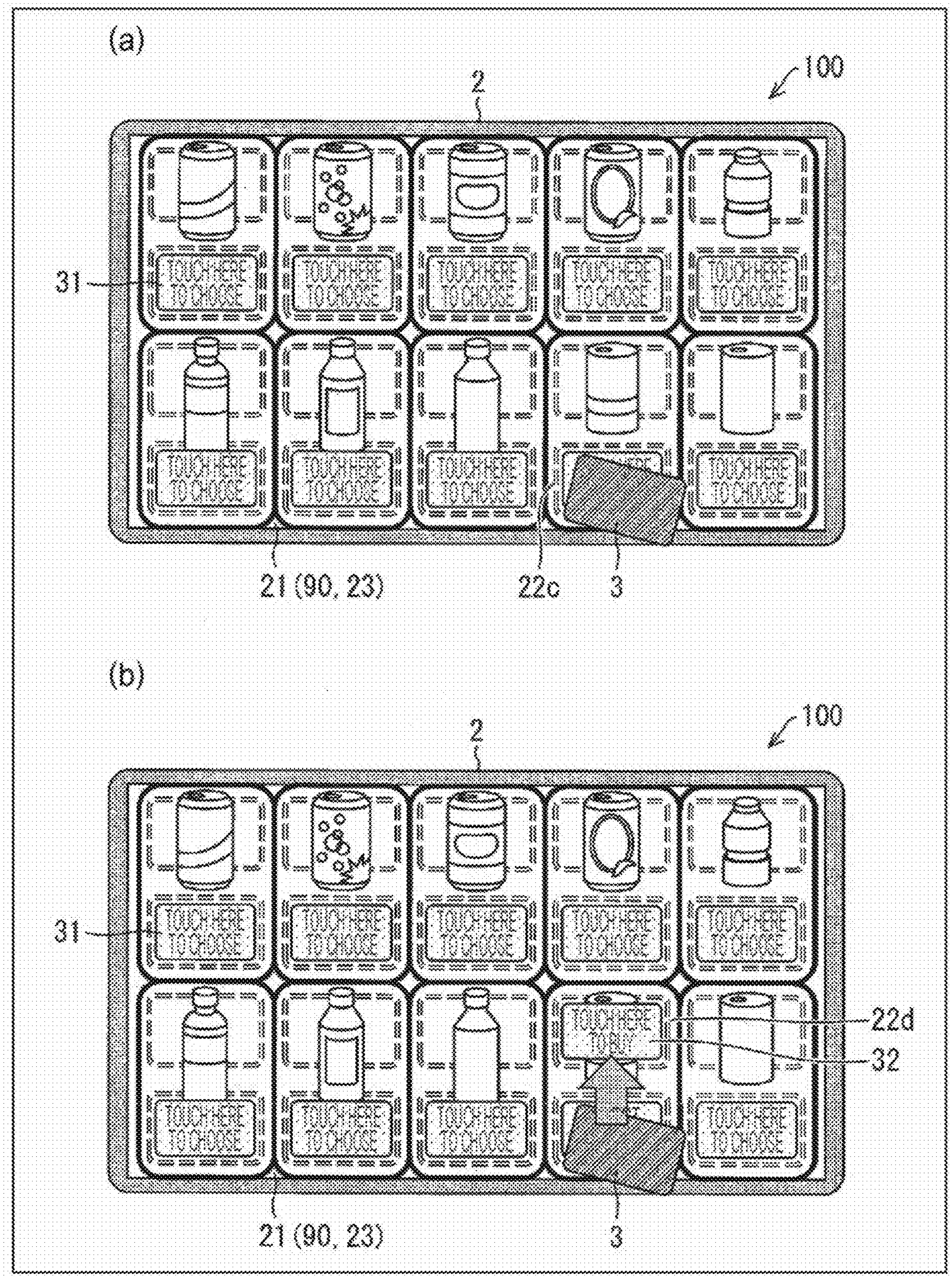
FIG. 5 is a diagram showing an example of a screen that is displayed on the NFC display shown in FIG. 1.

Next, with reference to FIGS. 1 and 5, a brief overview of the information processing device 1 is provided, and the configuration of the main components of the information processing device 1 is described. FIG. 5 is a diagram showing an example of a screen that is displayed on the NFC display 2 according to the present embodiment. FIG. 5 shows a screen that is displayed in a case where the NFC system 100 is a beverage vender. That is, in the illustrated example, the NFC system 100 provides the user with a beverage on the basis of close-range wireless communication with the NFC terminal 3 and processes a payment for the beverage. For this purpose, the NFC system 100 is communicably connected to a beverage vending machine or is integrated with a beverage vending machine. This example illustrates an example in which the NFC terminal 3 is a card including an electronic money function. That is, in providing the beverage, the NFC system 100 deducts the price of the beverage from the electronic money balance in the NFC terminal 3.

When activated, the information processing device 1 displays a screen containing images of beverages and product choice images 31 that prompt for close-range wireless communication with the respective NFC antennas 22, as shown in (a) of FIG. 5. The product choice images 31 are images that prompt the user to move the NFC terminal 3 nearer to the display position of the image of the beverage that the user would like. Further, the product choice images 31 need only indicate the positions of the respective NFC antennas 22. For example, the product choice images 31 may indicate the positions of the NFC antennas 22 by being displayed in regions overlapping the NFC antennas 22 as illustrated. Alternatively, the product choice images 31 may be displayed in regions not overlapping the NFC antennas 22. In this case, however, it is preferable that the product choice images 31 contain text or the like indicating the positions of the NFC antennas 22.

Assume here that as shown in (a) of FIG. 5, the user has moved the NFC terminal 3 nearer to an NFC antenna 22*c*. This causes close-range wireless communication to be performed between the NFC terminal 3 and the NFC antenna 22*c*. However, the information processing device 1 does not perform a payment process or provide a beverage immediately. As shown in (b) of FIG. 5, the information processing device 1, based on the execution of close-range wireless communication, effect a display of a purchase confirmation image 32 (communication prompter image) in a region overlapping an NFC antenna 22 that is different from the NFC antenna 22*c*. In the illustrated example, the information processing device 1 effects a display of the purchase confirmation image 32 in a region overlapping an NFC antenna 22*d* that is adjacent to the NFC antenna 22*c*. The purchase confirmation image 32 is an image that prompts for another round of close-range wireless communication in the position it has been displayed. When the user moves the NFC terminal 3 nearer to the NFC antenna 22*d* and close-range wireless communication is performed between the NFC terminal 3 and the NFC antenna 22*d*, the information processing device 1 performs a payment process and provides a beverage.

This prevents the information processing device 1 from performing a payment process immediately even if the user unintendedly moves the NFC terminal 3 nearer to an NFC antenna 22 and close-range wireless communication is performed. This allows the information processing device 1 to prevent the user from incurring a loss by unintendedly performing close-range wireless communication.

It should be noted that the purchase confirmation image 32 is not always displayed in a region overlapping an NFC antenna 22 that is adjacent to an NFC antenna 22 at which close-range wireless communication has been performed. In other words, an NFC antenna 22 that is adjacent to an NFC antenna at which close-range wireless communication has been performed is not the only NFC antenna 22 that performs another round of close-range wireless communication. For example, the purchase confirmation image 32 may be displayed in a region that is not adjacent to an NFC antenna 22 at which close-range wireless communication has been performed and that overlaps an NFC antenna 22 located around the NFC antenna 22.

Further, the purchase confirmation image 32 needs only indicate the position of each NFC antenna 22. The purchase confirmation image 32 may indicate the position of an NFC antenna 22 by being displayed in a region overlapping the NFC antenna 22 as illustrated. Alternatively, the purchase confirmation image 32 may be displayed in a region not overlapping the NFC antenna 22. In this case, however, it is preferable that the purchase confirmation image 32 contain text or the like indicating the position of the NFC antenna 22.

The following describes the configuration of the main components of the information processing device 1. As shown in FIG. 1, the information processing device 1 includes a control unit 10 and a storage unit 14. The control unit 10 exercises overall control of the components of the information processing device 1. The storage unit 14 has stored therein various types of data that the information processing device 1 uses. The control unit 10 includes an NFC communication control unit 11, a process execution unit 12, and a display control unit 13. For example, the storage unit 14 has stored therein an OS (operating system), various types of application, an GUI (graphical user interface), and the like. The information processing device 1 may be configured to be communicably connected to an external storage device (not illustrated) in addition to or instead of including the storage unit 14.

The NFC communication control unit 11 controls close-range wireless communication performed by an NFC antenna 22. Specifically, the NFC communication control unit 11 includes an antenna driving unit 15. The antenna driving unit 15 transmits a control signal to the NFC controller 24 and thereby causes the NFC controller 24 to execute scan driving.

Further, upon receiving notification from the NFC controller 24 to the effect that the NFC terminal 3 has been detected, the NFC communication control unit 11 outputs the notification to the process execution unit 12. Further, when the NFC communication control unit 11 acquires, from the process execution unit 12, an instruction to execute data transmission, the antenna driving unit 15 transmits a control signal to the NFC controller 24 in accordance with the instruction to cause the NFC controller 24 to perform data transmission through an NFC antenna 22 indicated by an antenna ID contained in the notification. In a case where the data transmission is the transmission of data from the NFC system 100 to the NFC terminal 3, the NFC communication control unit 11 acquires data from the process execution unit 12 and transmits the data to the NFC controller 24. This causes the data to be transmitted to the NFC terminal 3 via the NFC antenna 22. Further, in a case where the data transmission is the transmission of data from the NFC terminal 3, the NFC communication control unit 11 receives data from the NFC controller 24 and outputs the data to the process execution unit 12.

Further, when the NFC communication control unit 11 acquires, from the process execution unit 12, a polling instruction to perform polling at a particular NFC antenna 22, the antenna driving unit 15 transmits a control signal to the NFC controller 24 in accordance with the instruction and stops the scan driving. Furthermore, in addition to stopping the scan driving, the antenna driving unit 15 causes polling to be performed at the NFC antenna 22 indicated by the antenna ID contained in the notification.

The process execution unit 12 causes the NFC display 2 to perform data transmission and executes a predetermined process on the basis of the data transmission. Specifically, upon acquiring notification from the NFC communication control unit 11 to the effect that the NFC terminal 3 has been detected, the process execution unit 12 performs a process according to an antenna ID contained in the notification.

A process that is executed by the process execution unit 12 is specifically described here by taking as an example a case (see FIG. 5) where the NFC system 100 is a beverage vendor. Upon acquiring notification containing an antenna ID indicating an NFC antenna 22 (e.g. the NFC antenna 22*c*) overlapping a region in which a production choice image 31 has been displayed, the process execution unit 12 generates an instruction to execute data transmission. Specifically, the process execution unit 12 generates an instruction for acquiring the terminal information of the NFC terminal 3 by means of data transmission and outputs the instruction to the NFC communication control unit 11. Further, the process execution unit 12 stores, in the storage unit 14, a terminal ID and an antenna ID that are contained in the notification thus acquired.

Upon acquiring the terminal information of the NFC terminal 3 from the NFC communication unit 11, the process execution unit 12 determines whether a payment process is possible. Specifically, the process execution unit 12 determines, with reference to information contained in the terminal information and indicating the type of the NFC terminal 3, whether the NFC terminal 3 is a paying terminal. In a case where the process execution unit 12 has determined that the NFC terminal 3 is not a paying terminal, the process execution unit 12 outputs, to the display control unit 13, a display instruction to display an image for notifying the user to that effect.

On the other hand, in a case where the process execution unit 12 has determined that the NFC terminal 3 is a paying terminal, the process execution unit 12 compares information contained in the terminal information and indicating the electronic money balance with information contained in the terminal information indicating the price of the beverage identified from the antenna ID. Then, the process execution unit 12 further determines whether a payment is possible. In other words, the process execution unit 12 determines whether the electronic money balance is equal to or higher than the price of the beverage. In a case where the process execution unit 12 has determined that the payment is impossible, the process execution unit 12 outputs, to the display control unit 13, a display instruction to display an image for notifying the user to that effect.

On the other hand, in a case where the process execution unit 12 has determined that the payment is possible, the process execution unit 12 outputs, to the display control unit 13, a display instruction to display a purchase confirmation image 32. Furthermore, in addition to outputting the display instruction, the process execution unit 12 instructs the NFC communication control unit 11 to perform polling at an NFC antenna 22 (in the example shown in FIG. 5, the NFC antenna 22*d*) overlapping a region in which the purchase confirmation image 32 is displayed. The instruction contains an antenna ID indicating the NFC antenna 22 overlapping the region in which the purchase confirmation image 32 is displayed. This causes the NFC controller 24 to perform polling only at the NFC antenna 22 overlapping the region in which the purchase confirmation image 32 is displayed.

It is preferable that polling at the NFC antenna 22 overlapping the region in which the purchase confirmation image 32 is displayed be ended in a case where the NFC terminal 3 cannot be detected. For example, in a case where the NFC antenna 22 cannot detect the NFC terminal 3 even when a predetermined period of time elapses, the NFC controller 24 may end polling. In the case of this example, the NFC controller 24 controls a timer (not illustrated) to measure time having elapsed since the start of polling. Then, in a case where the NFC terminal 3 cannot be detected by the time the predetermined period of time elapses, polling is ended, and the NFC communication control unit 11 is notified to that effect. Upon acquiring the notification, the antenna driving unit 15 of the NFC communication control unit 11 transmits a control signal to the NFC controller 24 to cause the NFC controller 24 to resume the scan driving. Further, the NFC communication control unit 11 gives the notification to the process execution unit 12. With this, the process execution unit 12 to end the process. Specifically, the process execution unit 12 instructs the display control unit 13 to hide the purchase confirmation image 32.

Although the present embodiment describes this example, a trigger for the end of polling at the NFC antenna 22 overlapping the region in which the purchase confirmation image 32 is displayed is not limited to the passage of the predetermined period of time without detection of the NFC terminal 3. Another example of the trigger for the end of polling will be described later.

On the other hand, when the NFC controller 24 detects the NFC terminal 3 with the NFC antenna 22 overlapping the region in which the purchase confirmation image 32 is displayed, notification is transmitted to the process execution unit 12 via the NFC communication unit 11 to that effect. The process execution unit 12 determines whether the terminal ID contained in the notification thus acquired and the terminal ID stored in the storage unit 14 match. In a case where the process execution unit 12 has determined that they do not match, the process execution unit 12 outputs, to the display control unit 13, a display instruction to display an image for notifying the user to that effect.

On the other hand, in a case where the process execution unit 12 has determined that the two terminal IDs match, the process execution unit 12 provides a beverage and performs a payment process. Specifically, the process execution unit 12 controls the vending machine so that the vending machine ejects the beverage identified from the antenna ID stored in the storage unit 14. Further, the process execution unit 12 instructs the NFC communication control unit 11 to execute data transmission for the payment process. By means of data transmission based on the instruction, the NFC controller 24 deducts the price of the beverage from the electronic money balance of the NFC terminal 3. The instruction from the process execution unit 12 may contain information indicating an electronic money balance from which the price of the beverage has been deducted. In this case, by means of data transmission, the NFC controller 24 overwrites the electronic money balance of the NFC terminal 3 with the electronic money balance from which the price of the beverage has been deducted.

The display control unit 13 causes the display unit 23 to display an image. Specifically, upon activation of the information processing device 1, the display control unit 13 causes the display unit 23 to display a screen containing images of beverages and product choice images 31 (see (a) of FIG. 5). As described above, the display control unit 13 effects a display of the product choice images 31 in regions on the display unit 23 overlapping the NFC antennas 22.

Further, in accordance with an instruction from the process execution unit 12, the display control unit 13 causes the display unit 23 to display a purchase confirmation image 32 (see (b) of FIG. 5). As mentioned above, the display control unit 13 effects a display of the purchase confirmation image 32 in a region overlapping an NFC antenna 22 that is adjacent to the NFC antenna 22 that has detected the NFC terminal 3.

Figure 7:
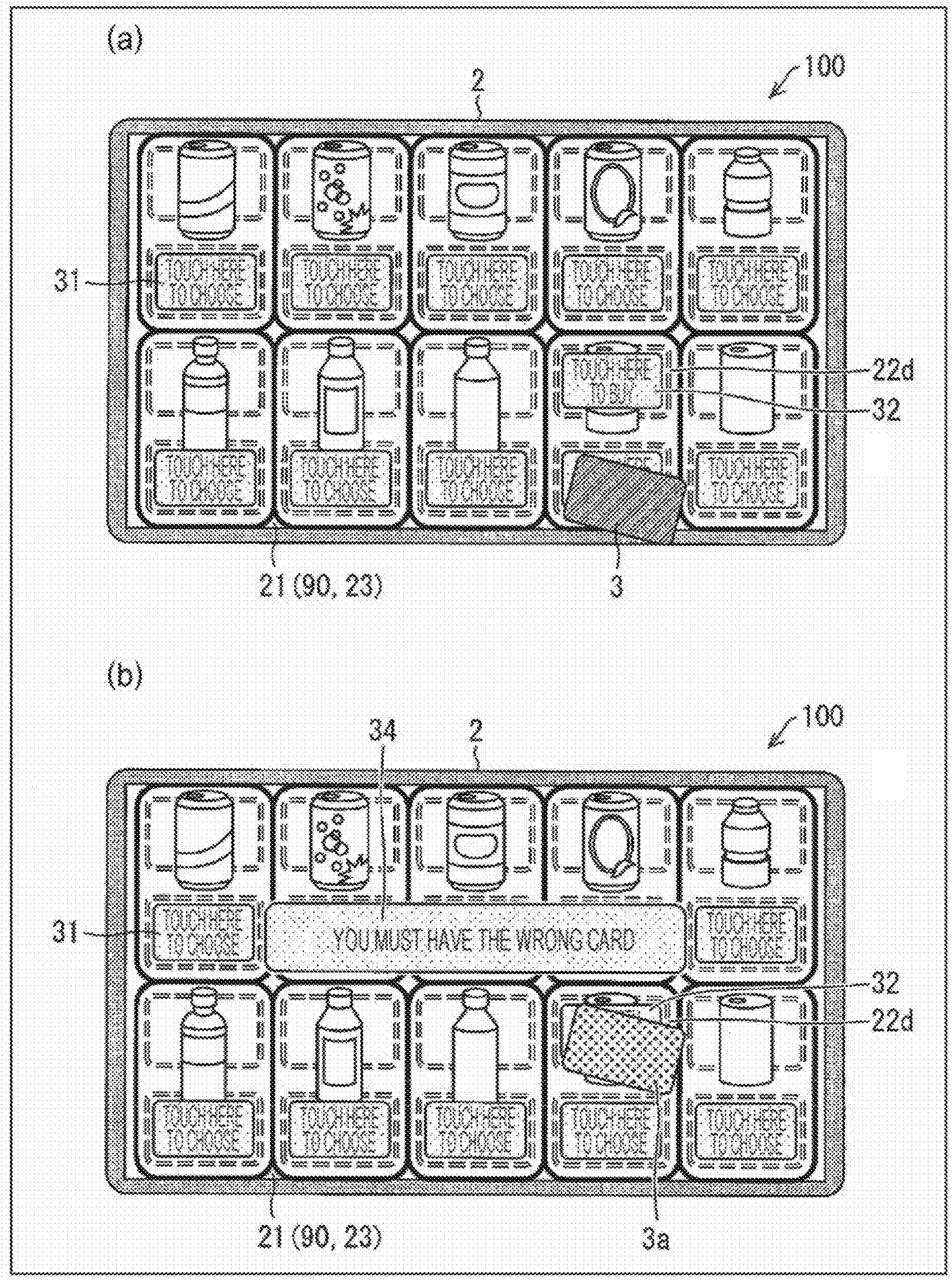
FIG. 7 is a diagram showing an example of an image that is displayed on the NFC display shown in FIG. 1.

Further, in accordance with an instruction from the process execution unit 12, the display control unit 13 causes the display unit 23 to display an image other than the purchase confirmation image 32. This is described in detail with reference to FIGS. 6 and 7. FIGS. 6 and 7 are diagrams showing examples of images that are displayed on the display unit 23.

Upon acquiring, from the process execution unit 12, a display instruction to display an image for notifying the user that the payment is impossible because the electronic money balance is less than the price of the beverage, the display control unit 13 causes the display unit 23 to display an image 33*a* shown in (a) of FIG. 6. The image 33*a* contains the text "THE BALANCE IS NOT HIGH ENOUGH TO BUY", so that the user can recognize, simply by looking at the image 33*a*, that the electronic money balance is not high enough for the purchase.

Further, upon acquiring, from the process execution unit 12, a display instruction to display an image for notifying the user that the NFC terminal 3 is not a paying terminal, the display control unit 13 causes the display unit 23 to display an image 33*b* shown in (b) of FIG. 6. The image 33*b* contains the text "THIS CARD IS NOT AVAILABLE FOR PAYMENT", so that the user can recognize, simply by looking at the image 33*b*, that he/she has brought the NFC terminal 3, which is not a paying terminal, into proximity.

Further, detection of the NFC terminal 3 by an NFC antenna 22 overlapping a region in which a product choice image 31 has been displayed causes a purchase confirmation image 32 to be displayed as shown in (a) of FIG. 7. A case is described where after this, an NFC terminal 3*a* that is different from the NFC terminal 3 is moved nearer to the NFC antenna 22*d* overlapping the region in which the purchase confirmation image 32 has been displayed, as shown in (b) of FIG. 7. In this case, the process execution unit 12 outputs, to the display control unit 13, a display instruction to display an image for notifying the user that the terminal IDs do not match. Upon acquiring the instruction, the display control unit 13 causes the display unit 23 to display an image 34 shown in (b) of FIG. 7. The image 34 contains the text "YOU MUST HAVE THE WRONG CARD", so that the user can recognize, simply by looking at the image 34, that he/she has brought, into proximity, an NFC terminal that is different from the NFC terminal 3 used in the previous close-range wireless communication.

The shapes, sizes, display positions, text contents of the images 33*a*, 33*b*, and 34 shown in FIGS. 6 and 7 are just examples, and these illustrated examples are not intended to impose any limitation on images that are displayed in accordance with instructions from the process execution unit 12. Further, the display control unit 13 may generate images and cause the display unit 23 to display the images or may read out images from the storage unit 14 and cause the display unit 23 to display the images.

(Flow of Payment Process)

Next, the flow of a payment process that is executed by the NFC system 100 is described with reference to FIG. 8. FIG. 8 is a flow chart showing an example of the flow of the payment process.

First, upon activation of the information processing device 1 and the NFC display 2, the display control unit 13 effects a display of a product choice image(s) 31 in a region(s) on the display unit 23 overlapping one or more NFC antennas 22 (step S1, the word "step" being hereinafter sometimes omitted). Further, the antenna driving unit 15 of the NFC communication control unit 11 transmits a control signal to the NFC controller 24 to cause the NFC controller 24 to start scan driving (S2).

Upon starting the scan driving, the NFC controller 24 is brought into a state of waiting for the NFC terminal 3 to be detected (S3). Upon detection of the NFC terminal 3 by any of the NFC antennas 22 (YES in S3), the NFC controller 24 outputs, to the process execution unit 12 via the NFC communication control unit 11, notification containing an antenna ID indicating the NFC antenna 22 that has detected the NFC terminal 3 and a terminal ID acquired from the NFC terminal 3. The process execution unit 12 stores, in the storage unit 14, the antenna ID and terminal ID thus acquired and transmits, to the NFC controller 24 via the NFC communication control unit 11, an instruction to execute data transmission.

Then, the NFC controller 24 acquires terminal information from the NFC terminal 3 by means of close-range wireless communication (data transmission) (S4). The NFC controller 24 outputs the terminal information thus acquired to the process execution unit 12 via the NFC communication control unit 11.

Then, the process execution unit 12 determines, on the basis of the terminal information thus acquired, whether the purchase of a beverage is possible (S5). Specifically, the process execution unit 12 determines whether the NFC terminal 3 is a paying terminal and, in a case where the NFC terminal 3 is a paying terminal, determines whether the electronic money balance is equal to or higher than the price of the beverage. In a case where the process execution unit 12 has determined that the purchase cannot be made (NO in S5), the process execution unit 12 outputs, to the display control unit 13, a display instruction to display an image for notifying the user to that effect. In accordance with the instruction, the display control unit 13 causes the display unit 23 to display an image indicating that the purchase cannot be made (S12). Then, the payment process returns to step S2. Examples of the "image indicating that the purchase cannot be made" here include the images 33*a* and 33*b* shown in FIG. 6.

On the other hand, in a case where the process execution unit 12 has determined that the purchase is possible (YES in S5), the process execution unit 12 outputs, to the display control unit 13, a display instruction to display a purchase confirmation image 32 and outputs, to the NFC communication control unit 11, a polling instruction to perform polling at an NFC antenna 22 overlapping a region in which the purchase confirmation image 32 is displayed. In accordance with the display instruction, the display control unit 13 effects a display of the purchase confirmation image 32 in a region overlapping an NFC antenna 22 that is adjacent to the NFC antenna 22 that has detected the NFC terminal 3 (S6).

Further, the antenna driving unit 15 of the NFC communication control unit 11 transmits a control signal to the NFC controller 24 in accordance with the polling instruction. The NFC controller 24 stops the scan driving in accordance with the control signal (S7) and performs polling at the NFC antenna 22 overlapping the region in which the purchase confirmation image 32 has been displayed (S8). Further, the NFC controller 24 controls the timer to measure time and determines whether the NFC terminal 3 has been detected within a predetermined period of time by the NFC antenna 22 overlapping the region in which the purchase confirmation image 32 has been displayed (S9). In a case where the NFC controller 24 has determined that the NFC terminal 3 was not detected within the predetermined period of time (NO in S9), the payment process returns to step S2.

On the other hand, in a case where the NFC controller 24 has determined that the NFC terminal 3 has been detected within the predetermined period of time (YES in S9), the NFC controller 24 outputs notification containing an antenna ID and a terminal ID to the process execution unit 12 via the NFC communication control unit 11. The process execution unit 12 determines whether the terminal ID thus acquired and the terminal ID stored in the storage unit 14 match (S10). In a case where the process execution unit 12 has determined that the two terminal IDs do not match (NO in S10), the process execution unit 12 outputs, to the display control unit 13, a display instruction to display an image for notifying the user to that effect. In accordance with the instruction, the display control unit 13 causes the display unit 23 to display an image indicating that the purchase cannot be made (S12). Then, the payment process returns to step S2. Examples of the "image indicating that the purchase cannot be made" here include the image 34 shown in FIG. 7.

On the other hand, in a case where the process execution unit 12 has determined that the two terminal IDs match (YES in S10), the process execution unit 12 executes a purchase process (S11). Specifically, the process execution unit 12 controls the vending machine so that the vending machine ejects the beverage identified from the antenna ID stored in the storage unit 14. Further, the process execution unit 12 instructs the NFC communication control unit 11 to execute data transmission for the payment process. By means of data transmission based on the instruction, the NFC controller 24 deducts the price of the beverage from the electronic money balance of the NFC terminal 3. Upon completion of the purchase process, the payment process returns to step S2. The payment process shown in FIG. 8 ends when the information processing device 1 is powered off.

(Modification of Embodiment 1)

Figure 9:
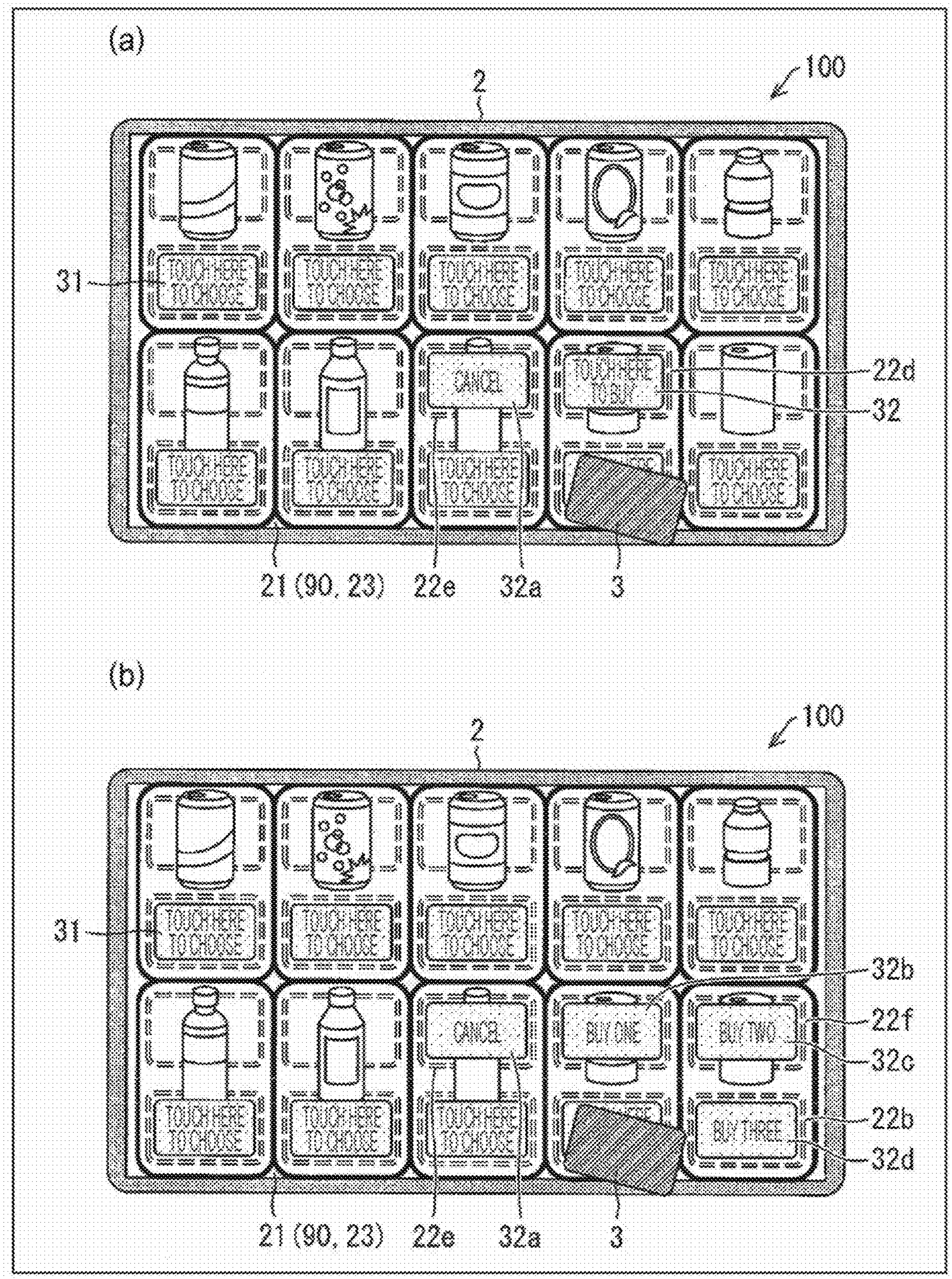
FIG. 9 is a screen diagram showing a modification of the NFC system shown in FIG. 1.

Next, a modification of Embodiment 1 is described with reference to FIG. 9. FIG. 9 is a screen diagram showing the modification of Embodiment 1.

First, another example of a trigger for the end of polling at an NFC antenna 22 overlapping a region in which a purchase confirmation image 32 is displayed is described with reference to (a) of FIG. 9. According to the present modification, the display control unit 13 causes, in accordance with an instruction from the process execution unit 12, the display unit 23 to display a cancel image 32*a* that prompts for close-range wireless communication for cancelling the choice of a beverage. In the illustrated example, the cancel image 32*a* is displayed in a region overlapping an NFC antenna 22*e* located around the NFC antenna 22 that has executed close-range wireless communication with the NFC terminal 3.

According to the present embodiment, when the purchase confirmation screen 32 and the cancel image 32*a* have been displayed, the NFC controller 24 starts polling at NFC antennas 22 overlapping these images. In the illustrated example, in which the NFC antennas 22 overlapping the two images are adjacent to each other, it is preferable that the NFC controller 24 perform scan driving by which to alternately bring these two NFC antennas 22 into a driven state. In a case where the two NFC antennas 22 respectively overlapping the two images are located away from each other, the NFC controller 24 may simultaneously bring these two NFC antennas 22 into a driven state.

According to the present modification, upon acquiring notification containing an antenna ID indicating the NFC antenna 22*e*, the process execution unit 12 outputs, to the NFC communication control unit 11, an instruction to end the polling. In accordance with the instruction, the antenna driving unit 15 of the NFC communication control unit 11 transmits a control signal to the NFC controller 24 and ends the scan driving by which to alternately bring the two NFC antennas 22 into a driven state. Furthermore, in addition to ending the scan driving, the antenna driving unit 15 resumes the scan driving by which to bring all of the NFC antennas 22 into a driven state in sequence. Further, the process execution unit 12 instructs the display control unit 13 to hide the purchase confirmation image 32 and the cancel image 32*a*.

Then, a variation of the purchase confirmation image 32 is described with reference to (b) of FIG. 9. As shown in (b) of FIG. 9, a plurality of the purchase confirmation images 32 may be displayed. In the illustrated example, purchase confirmation images 32*b*, 32*c*, and 32*d* (communication prompter images) that prompt the user to choose the number of beverages that he/she purchases are displayed in regions overlapping the NFC antennas 22*d*, 22*f*, and 22*b*, respectively.

Depending on whether which NFC antenna 22 is indicated by an antenna ID contained in notification indicating that the NFC terminal 3 has been detected, the process execution unit 12 specifies the number of beverages to be ejected from the vending machine and the price of beverages to be deducted from the electronic money balance. Then, the process execution unit 12 causes the number of beverages thus specified to be ejected from the vending machine and deducts the price thus specified from the electronic money balance of the NFC terminal 3.

In the case of this example, the price of beverages varies according to the number of beverages that the user purchases. Therefore, upon acquiring notification indicating that the NFC terminal 3 has been detected by the NFC antenna 22 overlapping the region in which the purchase confirmation image 32 has been displayed, the process execution unit 12 determines whether the beverage can be purchased (specifically, whether the electronic money balance is equal to or higher than the price of the beverage).

Further, Embodiment 1 has described a configuration in which when the NFC terminal 3 has been detected by an NFC antenna 22 overlapping a region in which a product choice image 31 has been displayed, the NFC controller 24 performs data transmission between the NFC terminal 3 and the NFC antenna 22. On the other hand, the NFC controller 24 may also perform data transmission when the NFC terminal 3 has been detected by an NFC antenna 22 overlapping a region in which a purchase confirmation image 32 has been displayed. In this case, no terminal information is transmitted to the NFC system 100 unless the user moves the NFC terminal 3 nearer to the NFC antenna 22 overlapping the region in which the purchase confirmation image 32 has been displayed. Therefore, the NFC system 100 can prevent unintended transmission of terminal information.

Further, although Embodiment 1 has described a configuration in which the purchase of a beverage is completed by the user moving the NFC terminal 3 nearer to two NFC antennas 22, the number of NFC antennas 22 to which the NFC terminal 3 is moved nearer until completion of the purchase of a beverage is not limited to two. Specifically, the number needs only be more than one and may for example be three. In the case of this example, when close-range wireless communication is performed with an NFC antenna 22 overlapping a region in which a product choice image 31 has been displayed, the display control unit 13 may effect, in regions overlapping a plurality of NFC antennas 22 located around the NFC antenna 22, a display of a plurality of images for choosing the number of beverages to be purchased. Then, after close-range wireless communication has been performed with an NFC antenna 22 overlapping a region in which any of the images has been displayed and the number of beverages has been determined, the display control unit 13 may effect a display of a purchase confirmation image 32 in a region overlapping an NFC antenna 22 that is adjacent to the NFC antenna 22.

(Effects Brought About by Information Processing Device 1 According to Embodiment 1)

As described above, an information processing device 1 according to the present embodiment controls an NFC display 2 including a display unit 23 and an NFC communication unit 21 including a plurality of NFC antennas 22 that perform close-range wireless communication with an NFC terminal 3. Further, the information processing device 1 includes a display control unit 13 that, when at least one NFC antenna 22 of the NFC communication unit 21 has performed close-range wireless communication with the NFC terminal 3, effects a display of a purchase confirmation image 32 that prompts for close-range wireless communication with an NFC antenna 22 that is different from the NFC antenna 22 that has performed the close-range wireless communication.

According to the foregoing configuration, when a certain NFC antenna 22 has performed close-range wireless communication, the information processing device 1 effects a display of a purchase confirmation image 32 that prompts for close-range wireless communication with an NFC antenna 22 that is different from the NFC antenna 22 that has performed the close-range wireless communication. This allows a user to easily understand the position to which to move the NFC terminal 3 nearer in order to perform the next close-range wireless communication. Therefore, the information processing device 1 allows the user to smoothly execute multiple rounds of close-range wireless communication using different NFC antennas 22.

Further, the information processing device 1 further includes a process execution unit 12 that executes a predetermined process on the basis of information acquired from the NFC terminal 3 by means of close-range wireless communication. The process execution unit 12 executes the predetermined process when, after the communication prompter image has been displayed a predetermined number of times, an NFC antenna 22 indicated by a communication prompter image most recently displayed has performed close-range wireless communication with the NFC terminal 3.

According to the foregoing configuration, the process execution unit 12 executes the predetermined process when, after the communication prompter image has been displayed a predetermined number of times, an NFC antenna 22 indicated by a communication prompter image most recently displayed has performed close-range wireless communication. In other words, the predetermined process is not executed even if, before the communication prompter image is displayed the predetermined number of times, the user unintendedly moves the NFC terminal 3 nearer to the NFC antenna 22. This prevents the process from being executed by the user unintendedly moving the NFC terminal 3 nearer to the NFC display 2. This configuration is effective especially in a case where the predetermined process is a payment process. That is, according to the foregoing configuration, even if the user unintendedly moves the NFC terminal 3 nearer to the NFC display 2, an unintended payment entailed by the purchase of a product that the user does not want can be prevented, as no payment process is performed before a communication prompter image is displayed.

Although the present embodiment has described an example in which the predetermined number of times is one, the predetermined number of times may be more than one. This example will be described in Embodiment 2 below.

Further, in the image processing device 1, the predetermined process is a payment process, in a case where a payment is possible, the display control unit 13 effects a display of the communication prompter image 32, and in a case where the payment is impossible, the display control unit 13 effects a display of an image (image 33*a*, image 33*b*, image 34) that makes a presentation to a user to that effect.

According to the foregoing configuration, in a case where the payment is impossible, the display control unit 13 effects a display of an image that makes a presentation to a user to that effect, so that the user can immediately understand that the payment is impossible. Further, when the image that makes a presentation to the user to the effect that the payment is impossible contains text or the like that indicates a reason why the payment is impossible, the user can immediately understand and solve the cause of the payment that cannot be made.

Further, in the information processing device 1, the process execution unit 12 does not execute the predetermined process when the NFC antenna 22 indicated by the purchase confirmation image 32 has performed close-range wireless communication with an NFC terminal 3*a* that is different from the NFC terminal 3 that has most recently performed close-range wireless communication, and in accordance with an instruction from the process execution unit 12, the display control unit 13 effects a display of an image (image 34) indicating that the NFC terminals are different.

According to the foregoing configuration, the predetermined process is not executed even if an NFC terminal that is different from the NFC terminal 3 that has most recently performed close-range wireless communication approaches the NFC antenna 22, so that the process can be prevented from being unintendedly executed by the approach of another NFC terminal 3. For example, the process can be prevented from being executed by another user having brought his/her own NFC terminal 3 into proximity. Further, according to the foregoing configuration, the display of the image indicating that the NFC terminals are different allows the user to immediately understand and solve the cause of the process that is not executed.

Further, in the information processing device 1, when close-range wireless communication with the NFC terminal 3 has been performed, the display control unit 13 effects a display of the purchase confirmation image 32 that prompts for close-range wireless communication with an NFC antenna 22 that is adjacent to an NFC antenna 22 that has performed the close-range wireless communication with the NFC terminal 3.

According to the foregoing configuration, when close-range wireless communication has been performed, the display control unit 13 effects a display of the purchase confirmation image 32 that prompts for close-range wireless communication with an NFC antenna 22 that is adjacent to the NFC antenna 22 that has performed the close-range wireless communication. In other words, the close-range wireless communication following the first close-range wireless communication is performed by an NFC antenna 22 that is adjacent to the NFC antenna 22 that has performed the first close-range wireless communication. This allows the user to perform multiple rounds of close-range wireless communication without greatly moving the NFC terminal 3.

Further, the information processing device 1 further includes an antenna driving unit 15 that sequentially drives the plurality of NFC antennas 22 in a predetermined order.

According to the foregoing configuration, the antenna driving unit 15 sequentially drives the plurality of NFC antennas 22 in a predetermined order, so that when a certain NFC antenna 22 is being driven, its neighboring NFC antennas 22 are not being driven. This makes it possible to prevent interference where a plurality of NFC antennas 22 contiguous to each other are simultaneously brought into a driven state and a situation where the interference makes it impossible to perform close-range wireless communication.

Further, the display unit 23 of the NFC display 2 overlaps the NFC antennas 22. This configuration allows a display of the purchase confirmation image 32 to overlap an NFC antenna 22, so that the user can intuitively understand the position to which to move the NFC terminal 3 nearer.

Embodiment 2

Another embodiment of the present disclosure is described below with reference to FIGS. 10 to 12. For convenience of explanation, members of Embodiments 2 and its subsequent embodiments having the same functions as those of Embodiment 1 are given the same signs and are not described below.

The present embodiment describes an example in which the NFC system 100 is applied to a shared computer or remove access terminal that is capable of accessing data of a plurality of users. According to the present embodiment, the NFC system 100 performs an user authentication process based on close-range wireless communication with the NFC terminal 3 and, in a case where the authentication has succeeded, permits the user to access personal data.

Figure 10:
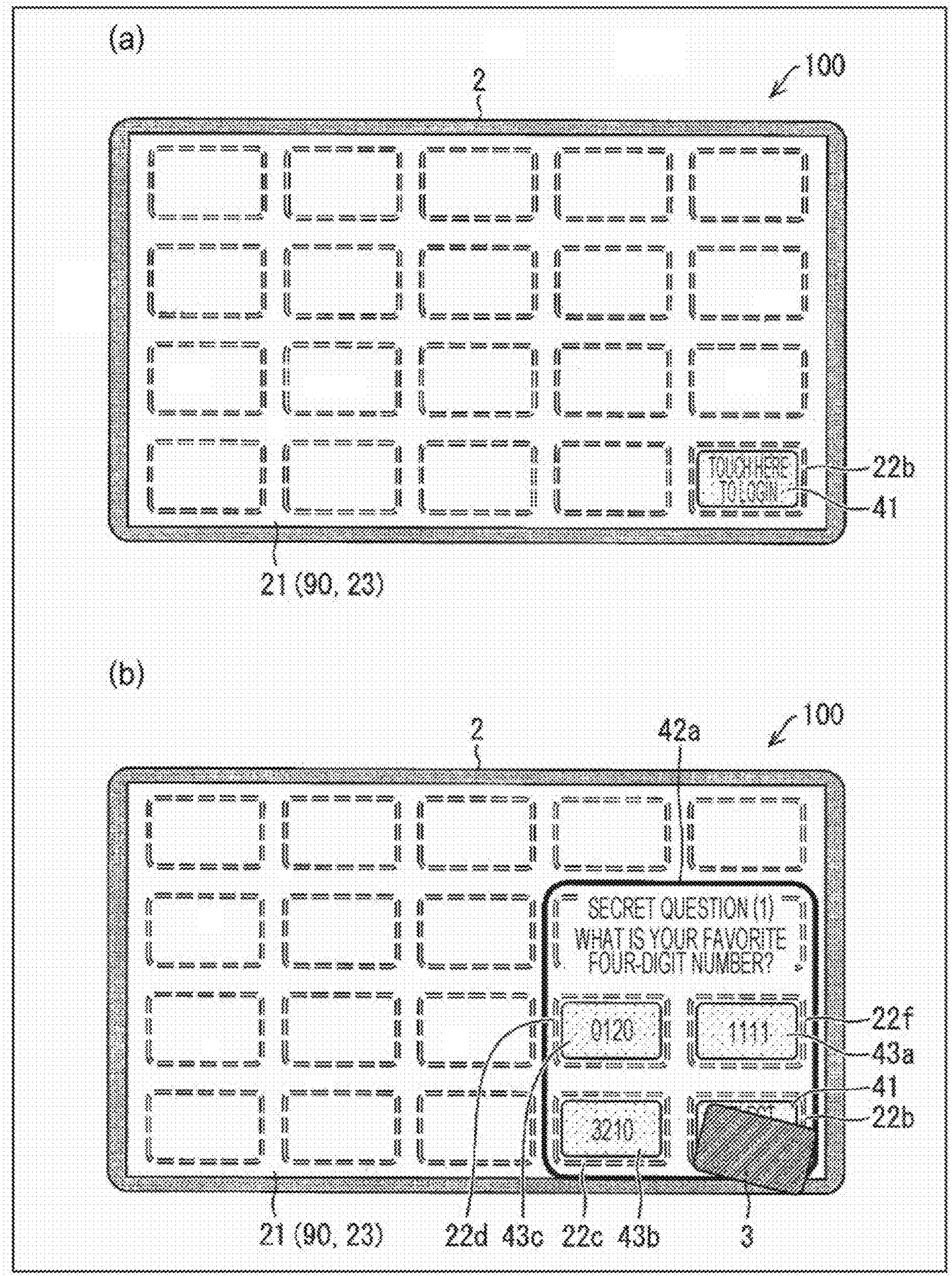
FIG. 10 is a diagram showing an example of a screen that is displayed on an NFC display according to Embodiment 2.

A brief overview of a user authentication process is provided with reference to FIGS. 10 and 11. FIGS. 10 and 11 are diagrams showing examples of screens that are displayed on the NFC displayed 2 according to the present embodiment.

Upon activation of the information processing device 1, the display control unit 13 causes the display unit 23 to display a screen containing an authentication start image 41, as shown in (a) of FIG. 10. The authentication start image 41 is an image that makes a presentation to the user to the effect that a user authentication process is started by the approach of the NFC terminal 3 and prompts the user to bring the NFC terminal 3 into proximity.

Further, the authentication start image 41 needs only indicate the position of an NFC antenna 22. For example, as illustrated, the authentication start image 41 may indicate the position of the NFC antenna 22*b* by being displayed in a region overlapping the NFC antenna 22*b*. The authentication start image 41 may be displayed in a region not overlapping an NFC antenna 22, and in this case, it is preferable that the authentication start image 41 contain text or the like indicating the position of an NFC antenna 22.

Upon activation of the information processing device 1, the NFC controller 24 receives a control signal from the antenna driving unit 15. The control signal contains an instruction to execute polling at the NFC antenna 22*b*. In accordance with the control signal, the NFC controller 24 executes polling at the NFC antenna 22*b*.

Assume here that as shown in (b) of FIG. 10, the user has moved the NFC terminal 3 nearer to the NFC antenna 22*b*. With this, close-range wireless communication is performed between the NFC terminal 3 and the NFC antenna 22*b*, so that the NFC terminal 3 is detected. The NFC controller 24 transmits, to the process execution unit 12 via the NFC communication control unit 11, notification containing a terminal ID acquired from the NFC terminal 3 and an antenna ID indicating the antenna 22*b*. Further, the NFC controller 24 acquires terminal information by performing data transmission between the NFC terminal 3 and the NFC antenna 22*b* in accordance with a control signal from the antenna driving unit 15 based on an instruction from the process execution unit 12. The NFC controller 24 transmits the terminal information thus acquired to the process execution unit 12 via the NFC communication control unit 11. A process that the information processing device 1 executes between reception of notification and transmission of a control signal is not described here, as the process is the same as that of Embodiment 1.

The terminal information contains at least information indicating the type of the NFC terminal 3 and a user ID indicating the user of the NFC terminal 3. The process execution unit 12 determines, with reference to the information indicating the type of the NFC terminal 3, whether the NFC terminal 3 is an authenticating terminal. In a case where the process execution unit 12 has determined that the NFC terminal 3 is not an authenticating terminal, the process execution unit 12 outputs, to the display control unit 13, a display instruction to display an image for notifying the user to that effect.

On the other hand, in a case where the process execution unit 12 has determined that the NFC terminal 3 is an authenticating terminal, the process execution unit 12 searches a table stored in the storage unit 14 for the user ID contained in the terminal information. Then, the process execution unit 12 identifies a secret question associated with the user ID and an answer to the question. The secret question is one chosen by the user in advance from among a plurality of questions, and the answer is one inputted (set) by the user in advance. Then, the process execution unit 12 selects a plurality of NFC antennas 22 located around the NFC antenna 22*b*. Further, in order to execute scan driving by which to bring these NFC antennas 22 into a driven state in sequence, the process execution unit 12 outputs, to the NFC communication control unit 11, the antenna IDs of the NFC antennas 22 thus selected and an execution instruction to execute scan driving. With this, the antenna driving unit 15 transmits a control signal to the NFC controller 24, and scan driving by which to bring the NFC antennas 22 indicated by the antenna IDs into a driven state is executed.

Further, the process execution unit 12 outputs, to the display control unit 13, the antenna IDs of the NFC antennas 22 thus selected, the question and answer thus identified, and a display instruction to display an image. In accordance with the instruction, the display control unit 13 generates a question image that prompts the user to choose, from among multiple options, the answer that he/she set by him/herself. An example of the question image is a question image 42*a* shown in (b) of FIG. 10. The question image 42*a* contains the question acquired from the process execution unit 12. In the illustrated example, the question is "WHAT IS YOUR FAVORITE FOUR-DIGIT NUMBER?".

Further, the question image 42*a* includes authenticating images 43 indicating the multiple options. The authenticating images 43 are images that contain information that may be possible answers to the question. One of the authenticating images 43 contains the answer acquired from the process execution unit 12. On the other hand, the other authenticating images 43 contains information that is not the answer. In the case of the illustrated example, any one of the four-digit numbers contained in the authenticating images 43*a*, 43*b*, and 43*c* (communication prompter images) is the number set by the user.

Further, the authenticating images 43 indicate the respective positions of the NFC antennas 22. For example, the authenticating images 43 may indicate the positions of the NFC antennas 22 by being displayed in regions overlapping the NFC antennas 22 as shown in (b) of FIG. 10. The authenticating images 43 may be displayed in regions not overlapping the NFC antennas 22, and in this case, it is preferable that the authenticating images 43 contain text or the like indicating the positions of the NFC antennas 22.

The display control unit 13 generates an authenticating image 43 containing the answer acquired from the process execution unit 12 and authenticating images containing 43 information that is not the answer. The information that is not the answer may be generated by the display control unit 13 or may be information stored in the storage unit 14. The present embodiment describes the former example. That is, the display control unit 13 generates two arbitrary four-digit numbers and generates authenticating images 43 containing the four-digit numbers thus generated.

Then, the display control unit 13 effects a display of the question image 42*a* so that the plurality of authenticating images 43 thus generated are displayed in the regions overlapping the NFC antennas 22 indicated by the antenna IDs thus acquired. In the illustrated example, the authenticating images 43*a*, 43*b*, and 43*c* are displayed in the regions overlapping the NFC antennas 22*f*, 22*c*, and 22*d*, respectively. Further, the display control unit 13 notifies the process execution unit 12 of the antenna ID indicating the NFC antenna 22 overlapping the region in which the authenticating image 43 containing the answer has been displayed.

Then, the user moves the NFC terminal 3 nearer to any of the NFC antennas 22 overlapping the regions in which the authenticating images 43 have been displayed. With this, close-range wireless communication is performed, so that the NFC terminal 3 is detected. The NFC controller 24 transmits, to the process execution unit 12 via the NFC communication control unit 11, notification containing the terminal ID acquired from the NFC terminal 3 and the antenna ID indicating the NFC antenna 22 that has detected the NFC terminal 3.

The process execution unit 12 determines whether the terminal ID contained in the notification thus acquired and the terminal ID stored in the storage unit 14 match. In a case where the process execution unit 12 has determined that the two terminal IDs do not match, the process execution unit 12 outputs, to the display control unit 13, a display instruction to display an image for notifying the user to that effect. In accordance with this instruction, the display control unit 13 generates an image for notifying the user that the NFC terminals 3 are different, and causes the display unit 23 to display the image.

On the other hand, in a case where the process execution unit 12 has determined that the two terminal IDs match, the process execution unit 12 compares the antenna ID notified from the display control unit 13 with the antenna ID notified from the NFC controller 24 via the NFC communication control unit 11 and determines whether the two antenna IDs match. In a case where the process execution unit 12 has determined that the two antenna IDs do not match, the process execution unit 12 deems the authentication failed and outputs, to the display control unit 13, a display instruction to display an image for notifying the user to that effect. In accordance with this instruction, the display control unit 13 generates an image for notifying the user of the failed authentication, and causes the display unit 23 to display the image. The image includes, for example, text indicating that the answer to the secret question is wrong.

On the other hand, in a case where the process execution unit 12 has determined that the two antenna IDs match, the process execution unit 12 deems the authentication successful. The process execution unit 12 instructs the display control unit 13 to effect a display of a screen indicating that the user may now access personal data. The screen is for example a screen shown in (a) of FIG. 11 and contains an access permission image 42*b*. The access permission image 42*b* contains menu images 44 indicating applications for accessing personal data, respectively.

Further, the menu images 44 (communication prompter images) indicate the respective positions of the NFC antennas 22. For example, the menu images 44 may indicate the positions of the NFC antennas 22 by being displayed in regions overlapping the NFC antennas 22 as shown in (a) of FIG. 11. The menu images 44 may be displayed in regions not overlapping the NFC antennas 22, and in this case, it is preferable that the menu images 44 contain text or the like indicating the positions of the NFC antennas 22.

For example, the menu image 44*a* is displayed in the region overlapping the NFC antenna 22*g*, and contains the text "SCHEDULE". With this, the menu image 44*a* can make a presentation to the user to the effect that an application for displaying a schedule is launched by close-range wireless communication between the NFC antenna 22*g* and the NFC terminal 3.

The authentication of the user by the answer to the secret question may be multi-staged, Specifically, in a case where the process execution unit 12 has determined that the antenna ID notified from the display control unit 13 and the antenna ID notified from the NFC controller 24 via the NFC communication control unit 11 match, the process execution unit 12 identifies, in the table stored in the storage unit 14, a different secret question associated with the user ID and an answer to the question. Then, the NFC communication control unit 11, the process execution unit 12, and the display control unit 13 perform a process of displaying the different secret question and possible answers and a process of causing the NFC controller 24 to execute scan driving. These processes are not described in detail here, as they are the same as those described with reference to (b) of FIG. 10. Through these processes, for example, as shown in (b) of FIG. 11, a question image 42*c* containing the question "WHAT YOUR FAVORITE ANIMAL?" and authenticating images 43*d*, 43*e*, and 43*f* (communication prompter images) containing possible answers to the question is displayed on the display unit 23. Further, the display control unit 13 notifies the process execution unit 12 of the antenna ID indicating the NFC antenna 22 overlapping the region in which the authenticating image 43 containing the answer has been displayed.

Then, the process execution unit 12 compares the antenna ID notified from the display control unit 13 with the antenna ID notified from the NFC controller 24 via the NFC communication control unit 11 and, in a case where the two antenna IDs match, causes the display control unit 13 to effect a display of a screen shown in (a) of FIG. 11.

In a case where the authentication of the user by the answer to the secret question is multi-staged, it is preferable that authenticating images 43 contained in a second or subsequent question image 42 not be displayed in regions overlapping NFC antennas 22 located in a direction of immediately preceding movement of the NFC terminal 3.

Specifically, as shown in (b) of FIG. 10 and (b) of FIG. 11, in a case where the user has moved the NFC terminal 3 nearer to the NFC antenna 22*d*, the NFC terminal 3 moves upward to the left of the drawing. In this case, the process execution section 12 does not select, as an NFC antenna overlapping a region on the display unit 23 in which an authenticating image 43, an NFC antenna 22*g* (see (b) of FIG. 11) located at the upper left of the drawing with respect to the NFC antenna 22*d*. That is, in accordance with an instruction from the process execution unit 12, the display control unit 13 effects a display of authenticating images 43 in regions on the display unit 23 overlapping NFC antennas 22*e*, 22*f*, and 22*i*, located around the NFC antenna 22*d*, that exclude the NFC antenna 22*g*.

This makes it possible to prevent the user from performing close-range wireless communication with an unintended NFC antenna 22 by moving the NFC terminal 3 too much. In other words, the user can be prevented from choosing a wrong authenticating image 43.

(Flow of User Authentication Process)

Next, the flow of a user authentication process that is executed by the NFC system 100 is described with reference to FIG. 12. FIG. 12 is a flow chart showing an example of the flow of the user authentication process. It should be noted that the flow chart shown in FIG. 12 is a flow chart showing an example in which authenticating images 43 are displayed once.

First, upon activation of the information processing device 1 and the NFC display 2, the display control unit 13 effects a display of an authentication start image 41 in a region on the display unit 23 overlapping a predetermined NFC antenna 22 (in the example shown in FIG. 10 or the like, the NFC antenna 22*b*) (S21). Further, the antenna driving unit 15 of the NFC communication control unit 11 transmits a control signal to the NFC controller 24 to cause the NFC controller 24 to start polling at the NFC antenna 22.

The start of the polling brings the NFC controller 24 into a state of waiting for the NFC terminal 3 to detected (S22). Upon detection of the NFC terminal 3 (YES in S22), the NFC controller 24 outputs, to the process execution unit 12 via the NFC communication control unit 11, notification containing an antenna ID indicating the NFC antenna 22 that has detected the NFC terminal 3 and a terminal ID acquired from the NFC terminal 3. The process execution unit 12 stores, in the storage unit 14, the antenna ID and terminal ID thus acquired and transmits, to the NFC controller 24 via the NFC communication control unit 11, an instruction to execute data transmission.

Then, the NFC controller 24 acquires terminal information from the NFC terminal 3 by means of close-range wireless communication (data transmission) (S23). The NFC controller 24 outputs the terminal information thus acquired to the process execution unit 12 via the NFC communication control unit 11.

Then, the process execution unit 12 determines, on the basis of the terminal information thus acquired, or specifically, information contained in the terminal information and indicating the type of the terminal, whether the NFC terminal 3 is an authenticating terminal (S24). In a case where the process execution unit 12 has determined that the NFC terminal 3 is not an authenticating terminal (NO in S24), the process execution unit 12 outputs, to the display control unit 13, a display instruction to display an image for notifying the user to that effect. In accordance with the instruction, the display control unit 13 causes the display unit 23 to display an image for notifying the user of the failed authentication (S33). Then, the user authentication process returns to step S22.

On the other hand, in a case where the process execution unit 12 has determined that the NFC terminal 3 is an authenticating terminal (YES in S24), the process execution unit 12 outputs, to the display control unit 13, a display instruction to display authenticating images 43. Further, in addition to outputting the display instruction, the process execution unit 12 outputs, to the NFC communication control unit 11, a polling instruction to perform polling at NFC antennas 22 overlapping regions in which the authenticating images 43 are displayed. In accordance with the display instruction, the display control unit 13 effects a display of the authenticating images 43 in regions overlapping a plurality of NFC antennas 22 located around a predetermined NFC antenna 22 (S25). Further, the display control unit 13 notifies the process execution unit 12 of an antenna ID indicating an NFC antenna 22 overlapping a region in which an authenticating image 43 containing an answer that renders the authentication successful has been displayed.

Further, the antenna driving unit 15 of the NFC communication control unit 11 transmits a control signal to the NFC controller 24 in accordance with the polling instruction. The control signal is a signal for causing the NFC controller 24 to perform scan driving by which the plurality of NFC antennas 22 overlapping the regions in which the authenticating images 43 have been displayed are brought into a driven state in sequence. The NFC controller 24 performs the scan driving in accordance with the control signal (S26).

Then, the NFC controller 24 is brought into a state of waiting for the NFC terminal 3 to be detected (S27). Upon detection of the NFC terminal 3 (YES in S27), the NFC controller 24 outputs, to the process execution unit 12 via the NFC communication control unit 11, notification containing an antenna ID indicating the NFC antenna 22 that has detected the NFC terminal 3 and a terminal ID acquired from the NFC terminal 3.

Then, the process execution unit 12 determines, on the basis of the notification thus acquired, whether the authentication has succeeded (S28). Specifically, the process execution unit 12 compares the antenna ID notified from the display control unit 13 with the antenna ID notified from the NFC controller 24 via the NFC communication unit 11 and determines whether the two antenna IDs match. In a case where the process execution unit 12 has determined that the two antenna IDs do not match (NO in S28), the process execution unit 12 deems the authentication failed and outputs, to the display control unit 13, a display instruction to display an image for notifying the user to that effect. In accordance with this instruction, the display control unit 13 generates an image for notifying the user of the failed authentication, and causes the display unit 23 to display the image (S33). Then, the user authentication process returns to step S22.

On the other hand, in a case where the process execution unit 12 has determined that the two antenna IDs match, the process execution unit 12 deems the authentication successful (YES in S28). The process execution unit 12 outputs, to the display control unit 13, a display instruction to display menu images 44 and outputs, to the NFC communication control unit 11, a polling instruction to perform polling at NFC antennas 22 overlapping regions in which the menu images 44 are displayed. In accordance with the display instruction, the display control unit 13 effects a display of the menu images 44 in regions overlapping a plurality of NFC antennas 22 located around the NFC antenna 22 that has detected the NFC terminal 3 (S29).

Further, the antenna driving unit 15 transmits a control signal to the NFC controller 24 in accordance with the polling instruction. The control signal is a signal for causing the NFC controller 24 to perform scan driving by which the plurality of NFC antennas 22 overlapping the regions in which the menu images 44 have been displayed are brought into a driven state in sequence. The NFC controller 24 performs the scan driving in accordance with the control signal (S30).

Then, the NFC controller 24 is brought into a state of waiting for the NFC terminal 3 to be detected (S31). Upon detection of the NFC terminal 3 (YES in S31), the NFC controller 24 outputs, to the process execution unit 12 via the NFC communication control unit 11, notification containing an antenna ID indicating the NFC antenna 22 that has detected the NFC terminal 3 and a terminal ID acquired from the NFC terminal 3.

On the basis of the notification thus acquired, the process execution unit 12 launches an application corresponding to the NFC antenna 22 that has detected the NFC terminal 3 (S32). This is the end of the user authentication process.

(Modification 1 of Embodiment 2)

According to the present embodiment, the NFC system 100 may be configured not to perform the authentication of the user by displaying authenticating images 43 and letting the user chose the correct answer. It should be noted that the phrase "letting the user choose the correct answer" means performing close-range wireless communication with the NFC antenna 22 overlapping the authenticating image 43 containing the correct answer.

Specifically, the process execution unit 12 stores, in advance in the storage unit 14, a user ID indicating a user allowed to access personal data. Then, upon acquiring terminal information by means of data transmission, the process execution unit 12 effects a display of menu images 44 in a case where a user ID contained in the terminal information is stored in the storage unit 14. Furthermore, the process execution unit 12 causes the NFC controller 24 to execute, in addition to a display of the menu images 44, scan driving for launching applications respectively indicated by the menu images 44.

This allows the user to quickly launch the applications, although security is loosened.

Further, although in the aforementioned example, the number of authentication start images 41 is one, the display control unit 13 may display a plurality of the authentication start images 41. In the case of this example, a plurality of NFC antennas 22 respectively overlapping regions in which the plurality of authentication start images 41 have been displayed are brought into a driven state. Specifically, the NFC controller 24 executes scan driving by which to bring the plurality of NFC antennas 22 into a driven state in sequence.

(Modification 2 of Embodiment 2)

According to the present embodiment, the NFC system 100 may be configured to execute a predetermined process such as an authentication process through a plurality of NFC terminals 3.

A specific example of the configuration is described below with reference to FIGS. 20 and 21. It should be noted that a description of processes which are the same as those of the embodiment described above is omitted as appropriate.

FIGS. 20 and 21 are diagrams showing examples of screens that are displayed on an NFC display according to the present modification.

Note here that (a) of FIG. 20 is a schematic diagram showing how an NFC terminal 3*a* is authenticated. It should be noted that a procedure by which the NFC system 100 performs a process of authenticating the NFC terminal 3*a* and the after-mentioned NFC terminal 3*b* is the same as the process, described above with reference to FIG. 10, for authenticating the NFC terminal 3.

As shown in (a) of FIG. 20, by the user moving the NFC terminal 3*a* nearer to an NFC antenna 22*b* corresponding to an authentication start image 80, close-range wireless communication is performed between the NFC terminal 3*a* and the NFC antenna 22*b*, Then, as is the case with the embodiment described above, the process execution unit 12 determines, with reference to information indicating the type of the NFC terminal 3*a*, whether the NFC terminal 3*a* is an authenticating terminal.

In a case where process execution unit 12 has determined, with reference to the information indicating the type of the NFC terminal 3*a*, that the NFC terminal 3*a* is an authenticating terminal, the process execution unit 12 instructs the display control unit 13 to effect a display of a screen, illustrated in (b) of FIG. 20, that contains one or more menu images 45 serving as communication prompter images.

Then, the NFC controller 24 receives a control signal from the antenna driving unit 15. The control signal contains an instruction to execute polling at an NFC antenna 22. The NFC controller 24 executes polling at the NFC antenna 22 in accordance with the control signal.

Assume here that as shown in (a) of FIG. 21, the user has moved the NFC terminal 3*b* (second information communication terminal) nearer to the antenna 22*f*. With this, the NFC terminal 3*b* is detected, and the NFC controller 24 transmits, to the process execution unit 12 via the NFC communication control unit 11, notification containing a terminal ID acquired from the NFC terminal 3*b* and an antenna ID indicating the NFC antenna 22*f*.

Then, in a case where the process execution unit 12 has determined, with reference to information indicating the type of the NFC terminal 3*b*, that the NFC terminal 3*b* is an authenticating terminal, the process execution unit 12 deems the authentication successful. Then, the process execution unit 12 executes a predetermined process corresponding to the NFC antenna 22*f*. In the example shown in (a) of FIG. 21, the predetermined process is a process of executing a "SHARING" application.

It should be noted that the order in which the two NFC terminals 3*a* and 3*b* are used for authentication may or may not be defined. In the former configuration, the authentication is deemed failed in a case where the NFC terminal 3*b* has been moved nearer to the NFC antenna 22*b* on the screen shown in (a) of FIG. 20. In the latter configuration, the authentication is deemed successful even if the order in which the NFC terminals 3*a* and 3*b* are used in the aforementioned authentication process is reversed.

Further, the type of each NFC terminal 3 is not limited to any particular type, and the two types may be identical or different. For example, as shown in (b) of FIG. 21, an NFC terminal 3*c* that is used for first authentication may be an electronic device such as a smartphone, and the NFC terminal 3*b*, which is used for second authentication, may take the form of a card.

Thus, the information processing device 1 further includes a process execution unit 12 that, when an antenna indicated by the communication prompter image displayed on the basis of close-range wireless communication with an NFC terminal 3*a* has performed close-range wireless communication with an NFC antenna 3*b* serving a second information communication terminal, executes a predetermined process such as the execution of an application corresponding to the antenna.

The foregoing configuration makes it possible to achieve an information processing device 1 that requires two terminals for a predetermined process.

Further, as mentioned above, in a case where user information recorded in the NFC terminal 3*a* and user information recorded in the NFC terminal 3*b* serving as the second information communication terminal are identical, the process execution unit 12 may perform, as the predetermined process, a process of deeming authentication of a user successful. The foregoing configuration makes it possible to tighten the security of user authentication.

Further, the process execution unit 12 may also be configured to deem authentication successful in a case where a user lined with the NFC terminal 3*a* and a user linked with the NFC terminal 3*b* are different from each other. In the case of the foregoing configuration, the process execution unit 12 may cause a screen to display only information that both of the users are authorized to access in common.

In other words, in a case where user information recorded in the NFC terminal 3*a* is information of a first user and user information recorded in the NFC terminal 3*b* serving as the second information communication terminal is information of a second user, the process execution unit 12 may perform, as the predetermined process, a process of displaying information that the first and second users are authorized to access in common.

The foregoing configuration makes it possible to, for example, in a case where more than one person operate the NFC display 2, prevent an unauthorized user to view a file or the like.

User authentication may be configured such that three or more NFC terminals 3 are used in a multi-stage manner. Further, in the foregoing configuration, when users linked with the respective NFC terminals 3 are different from one another, the process execution unit 12 may cause the screen to display only information that all of the users are authorized to access in common.

(Effects Brought About by Information Processing Device 1 According to Embodiment 2)

As described above, in the information processing device 1 according to the present embodiment, the predetermined process that is executed by the process execution unit 12 is a user's authentication process, the display control unit 13 prompts for close-range wireless communication through each of the plurality of NFC antennas 22 and effects a display of a plurality of the communication prompter images 43 that present different pieces of information to the user, and the process execution unit 12 deems authentication of the user successful when close-range wireless communication has been performed by an NFC antenna 22 indicated by a communication prompter image 43 presenting information set in advance by the user.

The foregoing configuration allows the user to perform user authentication simply by means of close-range wireless communication between the NFC terminal 3 and the NFC display 2 without entering a user ID or a password. Therefore, the information processing device 1 makes it possible to achieve user authentication without burden on the user.

Further, according to the foregoing configuration, for user authentication, the information processing device 1 displays, in addition to the authenticating image 43 that presents the information set in advance by the user, an authenticating image 43 that presents information that is different from the information. With this, the information processing device 1 can tighten security.

Further, in the information processing device 1, in a case where an authenticating images 43 is displayed twice or more, an NFC antenna 22 indicated by an authenticating image 43 that is displayed for a second time or later is an NFC antenna 22 that is not located in a direction in which the NFC terminal 3 moved for immediately preceding close-range wireless communication.

According to the foregoing configuration, an NFC antenna 22 located in the direction of movement of the NFC terminal 3 is not an NFC antenna 22 having a possibility of performing close-range wireless communication next. This prevents first authentication and second authentication from being successively performed by the user having moved the NFC terminal 3 too much. Therefore, the information processing device 1 prevents the user from performing close-range wireless communication with an unintended NFC antenna 22 by moving the NFC terminal 3 too much.

Embodiment 3

Still another embodiment of the present disclosure is described with reference to FIGS. 13 to 15.

First, a process that is executed by the NFC system 100 according to the present embodiment is described with reference to FIGS. 13 and 14. FIGS. 13 and 14 are diagrams showing examples of screens that are displayed on the NFC display 2 according to the present embodiment.

According to the present embodiment, the NFC system 100 executes an application that allows the user to proceed while sequentially choosing among options that are displayed on the NFC display 2. Examples of the application include, but are not limited to, an application for a game in which a playing piece is moved, an questionnaire application, an application for determining a route while choosing a sightseeing spot, and the like. FIGS. 13 and 14 show examples of screens in the case of execution of the application for a game in which a playing piece is moved.

Upon activation of the information processing device 1, the display control unit 13 causes the display unit 23 to display a screen containing a start image 51, as shown in (a) of FIG. 13. The start image 51 is an image that, by making a presentation to the user to the effect that the game is started by the approach of the NFC terminal 3, prompts the user to move the NFC terminal 3 into proximity.

Further, the start image 51 needs only indicate the position of an NFC antenna 22. For example, as illustrated, the start image 51 may indicate the position of the NFC antenna 22*b* by being displayed in the region overlapping the NFC antenna 22*b*. The start image 51 may be displayed in a region not overlapping an NFC antenna 22, and in this case, it is preferable that the start image 51 contain text or the like indicating the position of an NFC antennas 22.

Upon activation of the information processing device 1, the NFC controller 24 receives a control signal from the antenna driving unit 15. The control signal contains an instruction to execute polling at the NFC antenna 22*b*. In accordance with the control signal, the NFC controller 24 executes polling at the NFC antenna 22*b*.

Assume here that as shown in (b) of FIG. 13, the user has placed the NFC terminal 3 in the position of the NFC antenna 22*b*. It should be noted that according to the present embodiment, the NFC terminal 3 is an NFC terminal 3*b* obtained by attaching an NFC tag to a playing piece. With this, close-range wireless communication is performed between the NFC terminal 3*b* and the NFC antenna 22*b*, so that the NFC terminal 3*b* is detected. The NFC controller 24 transmits, to the process execution unit 12 via the NFC communication control unit 11, notification containing a terminal ID acquired from the NFC terminal 3*b* and an antenna ID indicating the antenna 22*b*. Further, the NFC controller 24 acquires terminal information by performing data transmission between the NFC terminal 3*b* and the NFC antenna 22*b* in accordance with a control signal from the antenna driving unit 15 based on an instruction from the process execution unit 12. The NFC controller 24 transmits the terminal information thus acquired to the process execution unit 12 via the NFC communication control unit 11. A process that the information processing device 1 executes between reception of notification and transmission of a control signal is not described here, as the process is the same as that of Embodiment 1.

The terminal information contains at least information indicating the type of the NFC terminal 3*b* and a playing piece ID for identifying the playing piece. The process execution unit 12 determines, with reference to the information indicating the type of the NFC terminal 3*b*, whether the NFC terminal 3*b* is a terminal for use in the game application. In a case where the process execution unit 12 has determined that the NFC terminal 3*b* is not a terminal for use in the game application, the process execution unit 12 outputs, to the display control unit 13, a display instruction to display an image for notifying the user to that effect.

On the other hand, in a case where the process execution unit 12 has determined that the NFC terminal 3*b* is a terminal for use in the game application, the process execution unit 12 outputs, to the display control unit 13, a display instruction to display option images 52 (communication prompter images). Further, the process execution unit 12 outputs, to the NFC communication control unit 11, the antenna IDs of a plurality of NFC antennas 22 overlapping regions in which the option images 52 are displayed and an instruction to execute scan driving. With this, the antenna driving unit 15 transmits a control signal to the NFC controller 24, and scan driving by which to bring the NFC antennas 22 indicated by the antenna IDs into a driven state is executed.

The display control unit 13 generates the option images 52 in accordance with the display instruction and, as shown in (b) of FIG. 13, causes the display unit 23 to display them. The option images 52 are images that indicate positions to which the playing piece, i.e. the NFC terminal 3*b*, can be moved next. Further, the option images 52 indicate the respective positions of the NFC antennas 22. For example, the option images 52 may indicate the positions of the NFC antennas 22 by being displayed in regions overlapping the NFC antennas 22 as shown in (b) of FIG. 13. The option images 52 may be displayed in regions not overlapping the NFC antennas 22, and in this case, it is preferable that the option images 52 contain text or the like indicating the positions of the NFC antennas 22.

In the illustrated example, when the NFC terminal 3*b* is placed in the position of the NFC antenna 22*b* overlapping the region in which the start image 51 has been displayed, the same image is displayed as the option images 52. However, in a case where a plurality of the option images 52 are displayed, these images may be different from one another. Further, the position in which option images 52 are displayed and the number of option images 52 that are displayed are not limited to the illustrated example. The types of option images 52, the position in which option images 52 are displayed, and the number of option images 52 that are displayed may vary according to the type of playing pieces (i.e. playing piece IDs).

Note here that as shown in (a) of FIG. 14, the user has moved the NFC terminal 3*b* to the position of the NFC antenna 22*d*. With this, the NFC system 100 performs a process which is similar to that which is performed when the NFC terminal 3*b* is placed in the position of the NFC antenna 22*b* overlapping the region in which the start image 51 is being displayed. 4 display instruction from the process execution unit 12 for the display control unit 13 to perform a display contains antenna IDs indicating NFC antennas 22 located according to the NFC antenna 22*d* (e.g. in an area around the NFC antenna 22*d*).

The display control unit 13 generates new option images 52 in accordance with the display instruction and, as shown in (a) of FIG. 14, causes the display unit 23 to display them. In the illustrated example, the new option images 52 are displayed in regions overlapping NFC antennas 22*h*, 22*i*, and 22*j*.

Furthermore, the display control unit 13 causes an option image 52 having been displayed to change its display form according to whether it has been chosen. In the illustrated example, the display form of the option image 52 thus chosen (i.e. the option image 52 having been displayed in the region overlapping the NFC antenna 22*d*) is changed. It should be noted that a chosen option image 52 whose display form has been changed is referred to as "chosen image 53". Further, the display control unit 13 changes the display form of the option images 52 that were not chosen (i.e. the option images 52 having been displayed in the regions overlapping the NFC antennas 22*c* and 22*f*). At this point of time, the display control unit 13 causes the display form of the option images 52 that were not chosen to be different from the display form of the chosen image 53. It should be noted that an unchosen option image 52 whose display form has been changed is referred to as "unchosen option image 54".

In the illustrated example, the display control unit 13 causes the chosen image 53 and the unchosen images 54 to be different in image pattern from the option images 52. Changes of display form are not limited to this example. For example, the display control unit 13 may cause the images to be different in color, side, and shape of the option images 52. Further, the display controller 13 may omit to display the unchosen images 54 and hide the option images 52 that were not chosen.

Further, in a process of displaying new option images 52, a polling instruction that the process execution unit 12 outputs to the NFC communication control 11 may contain the antenna ID of the NFC antenna 22 on which the NFC terminal 3*b* was placed last. With this, in the illustrated example, the NFC antenna 22*b*, as well as the NFC antennas 22*h*, 22*i*, and 22*j*, is brought into a driven state. That is, the user can take back a move in a case where he/she has made a wrong choice in the game. The process execution unit 12 may cause the polling instruction to contain, instead of the antenna ID of the NFC antenna 22 on which the NFC terminal 3*b* was placed last, the antenna IDs of NFC antennas 22 overlapping regions in which the unchosen images 54 are displayed.

Further, the game may be a game that can be played by more than one person. In this case, it is preferable that as shown in (b) of FIG. 14, the display forms of option images 52 vary according to the players. Specifically, as illustrated, upon detection of the NFC terminal 3*c*, which is different from the NFC terminal 3*b*, the display control unit 13 effects a display of option images 55 (communication prompter images) that are different in display form from the option images 52. Although not illustrated, the display forms of chosen images 53 and unchosen images 54 may also vary according to the players. Further, although the illustrated example displays common start images 51, the display forms of the start images 51 may vary according to the players.

(Flow of Option Display Process)

Next, the flow of an option display process that is executed by the NFC system 100 is described with reference to FIG. 15. FIG. 15 is a flow chart showing an example of the flow of the option display process. It should be noted that FIG. 15 is a flow chart showing the flow of an option display process in a case where one person plays a game.

First, upon activation of the information processing device 1 and the NFC display 2, the display control unit 13 effects a display of a start image 51 in a region on the display unit 23 overlapping a predetermined NFC antenna 22 (in the example shown in FIG. 13 or the like, the NFC antenna 22*b*) (S41). Further, the antenna driving unit 15 of the NFC communication control unit 11 transmits a control signal to the NFC controller 24 to cause the NFC controller 24 to start polling at the NFC antenna 22.

The start of the polling brings the NFC controller 24 into a state of waiting for the NFC terminal 3 to detected (S42). Upon detection of the NFC terminal 3 (YES in S42), the NFC controller 24 outputs, to the process execution unit 12 via the NFC communication control unit 11, notification containing an antenna ID indicating the NFC antenna 22 that has detected the NFC terminal 3 and a terminal ID acquired from the NFC terminal 3. The process execution unit 12 stores, in the storage unit 14, the antenna ID and terminal ID thus acquired and transmits, to the NFC controller 24 via the NFC communication control unit 11, an instruction to execute data transmission.

Then, the NFC controller 24 acquires terminal information from the NFC terminal 3 by means of close-range wireless communication (data transmission) (S43). The NFC controller 24 outputs the terminal information thus acquired to the process execution unit 12 via the NFC communication control unit 11.

Then, the process execution unit 12 determines, on the basis of the terminal information thus acquired, or specifically, information contained in the terminal information and indicating the type of the terminal, whether the NFC terminal 3 is a game-compatible terminal (NFC terminal 3*b*, 3*c*) (S44). In a case where the process execution unit 12 has determined that the NFC terminal 3 is not a game-compatible terminal (NO in S44), the process execution unit 12 outputs, to the display control unit 13, a display instruction to display an image for notifying the user to that effect. In accordance with the instruction, the display control unit 13 causes the display unit 23 to display an image indicating that the NFC terminal is not compatible (S50). Then, the option display process returns to step S42.

On the other hand, in a case where the process execution unit 12 has determined that the NFC terminal 3 is a game-compatible terminal (YES in S44), the process execution unit 12 outputs, to the display control unit 13, a display instruction to display option images 52. Furthermore, in addition to outputting the display instruction, the process execution unit 12 outputs, to the NFC communication control unit 11, a polling instruction to perform polling at NFC antennas 22 overlapping regions in which the option images 52 are displayed. In accordance with the display instruction, the display control unit 13 effects a display of the option images 52 in regions overlapping a plurality of NFC antennas 22 located around a predetermined NFC antenna 22 (S45).

Further, the antenna driving unit 15 of the NFC communication control unit 11 transmits a control signal to the NFC controller 24 in accordance with the polling instruction. The control signal is a signal for causing the NFC controller 24 to perform scan driving by which the plurality of NFC antennas 22 overlapping the regions in which the option images 52 have been displayed are brought into a driven state in sequence. The NFC controller 24 performs the scan driving in accordance with the control signal (S46).

Then, the NFC controller 24 is brought into a state of waiting for the NFC terminal 3 to be detected (S47). Upon detection of the NFC terminal 3 (YES in S47), the NFC controller 24 outputs, to the process execution unit 12 via the NFC communication control unit 11, notification containing an antenna ID indicating the NFC antenna 22 that has detected the NFC terminal 3 and a terminal ID acquired from the NFC terminal 3.

Then, the process execution unit 12 determines, on the basis of the notification thus acquired, whether the same NFC terminal 3 as last time is detected (S48). Specifically, the process execution unit 12 determines whether a playing piece ID contained in the notification thus acquired and a playing piece ID stored in the storage unit 14 match. In a case where the process execution unit 12 has determined that the two playing piece IDs do not match (NO in S48), the process execution unit 12 outputs, to the display control unit 13, a display instruction to display an image for notifying the user that the NFC terminals 3 are different. The display control unit 13 generates an image in accordance with the instruction and causes the display unit 23 to display it (S51). Then, the option display process returns to step S22.

On the other hand, in a case where the process execution unit 12 has determined that the two playing piece IDs match, the process execution unit 12 determines whether conditions for the end of the game are satisfied (S49). In a case where the process execution unit 12 has determined that the conditions are not satisfied (NO in S49), the option display process returns to step S45. On the other hand, in a case where the process execution unit 12 has determined that the conditions for the end of the game are satisfied, the option display ends.

(Modification of Embodiment 3)

According to the present embodiment, the NFC system 100 may be configured such that a plurality of playing pieces, i.e. NFC terminals 3, can be placed on the NFC display 2.

A specific example of the configuration is described below with reference to FIGS. 22 and 25. It should be noted that a description of processes which are the same as those of the embodiment described above is omitted as appropriate.

FIGS. 22 to 25 are diagrams showing examples of screens that are displayed on an NFC display according to the present modification.

Note here that (a) of FIG. 22 is a diagram showing the NFC terminal 3*a* placed in the position of the NFC antenna 22*b* by the user after the execution of the process described with reference to (a) of FIG. 13. In a case where the process execution unit 12 has determined, with reference to information indicating the type of the NFC terminal 3*a*, that the NFC terminal 3*a* is a terminal for use in a game application, the process execution unit 12 outputs, to the display control unit 13, a display instruction to display option images 52.

The option images 52 are images that indicate positions to which the playing piece, i.e. the NFC terminal 3*a*, can be moved next or positions in which another NFC terminal 3 can be placed. In a case where these two types of position are different from each other, the display control unit 13 may effect a display of the corresponding option images in a discriminable manner.

(a) of FIG. 23 is a diagram showing the NFC terminal NFC 3*b* placed in the position of the NFC antenna 22*c* by the user. As shown in (a) of FIG. 23, in a case where the user has placed a plurality of NFC terminals 3 on the NFC display 2, the process execution unit 12 may link the NFC terminals 3 to each other as those which are handled by the same user.

In other words, the process execution unit 12 may perform, as a predetermined process to be performed in a case where an antenna indicated by an option image 52 displayed on the basis of close-range wireless communication between the NFC terminal 3*a* and an NFC antenna 22 has performed close-range wireless communication with the NFC terminal 3*b* serving as the second information communication terminal, a process of associating the NFC terminals 3*a* and 3*b* with each other as information communication terminals that belong to an identical group. According to the foregoing configuration, the process execution unit 12 can set a plurality of NFC terminals 3 as those which are handled by the same user.

The number and type of NFC terminals 3 that are placed on the NFC display 2 and associated with the same user are not limited. For example, as shown in (b) of FIG. 23, an NFC terminal 3*c* that is different in type from the figures may be further placed.

Thus, when an antenna indicated by a communication prompter image displayed on the basis of close-range wireless communication with any information communication terminal (NFC terminal 3) belonging to a group has performed close-range wireless communication with a different information communication terminal that does not belong to the group, the process execution unit 12 may perform a process of associating the different information communication terminal as an information communication terminal that belongs to the group.

According to the foregoing configuration, for example, in an application for a game in which a playing piece serving as an NFC terminal 3 is moved or the like, another playing piece can be added onto the NFC display 2 serving as a board.

Further, more than one person may place and move one or more NFC terminals 3 on the NFC display 2 in an arbitrary or predetermined order. Further, for example, the application of the game may be started from a state where one or more NFC terminals 3 are placed in predetermined positions. Examples of the game include shogi, chess, and the like. For example, (a) of FIG. 24 shows the initial placement of NFC terminals 3 serving as playing pieces in a game involving the use of the NFC system 100. Further, (b) of FIG. 24 and (a) of FIG. 25 show how players of the game have alternately moved the playing pieces. Further, in the game involving the use of the NFC system 100, a player may eliminate a playing piece during the game and, as shown in (b) of FIG. 25, may add a new playing piece during the game. In a case where a user has added a new playing piece during the game, the process execution unit 12 associates the playing piece with a group corresponding to the user.

Further, normally, even in a case where any of a plurality of playing pieces associated with each other as the same group has moved in the course of the game, the process execution unit 12 continues to treat the plurality of playing pieces as playing pieces that belong to the same group.

That is, in a case where the information communication terminal (NFC terminal 3) and the second information communication terminal are already associated with each other as information communication terminals that belong to an identical group, the process execution unit 12 performs, as the predetermined process, a process of directly treating the information communication terminal and the second information communication terminal as information communication terminals that belong to an identical group, even in a case where the information communication terminal and the second information communication terminal have changed their positions.

According to the foregoing configuration, a game or the like that involves the movement of a playing piece can be executed even if the NFC display 2 does not have a function as a touch panel.

(Effects Brought About by Information Processing Device 1 According to Embodiment 3)

As shown in (b) of FIG. 14 in the information processing device 1 according to the present embodiment, in a case where close-range wireless communication with an NFC terminal 3*c* that is separate from the NFC terminal 3*b* has been performed while the option image 52 is being displayed on the basis of close-range wireless communication with the NFC terminal 3*b*, the display control unit 13 effects, in a position different from that of the option image 52 being displayed, an option image 55 differing in display form from the option image 52 being displayed.

According to the foregoing configuration, in a case where close-range wireless communication with an NFC terminal 3*c* that is separated from the NFC terminal 3*b* has been performed, an option image 55 differing in display form and display position from the option image 52 currently displayed. This allows each user to easily identify an option image based on close-range wireless communication with his/her own NFC terminal 3.

Embodiment 4

Figure 16:
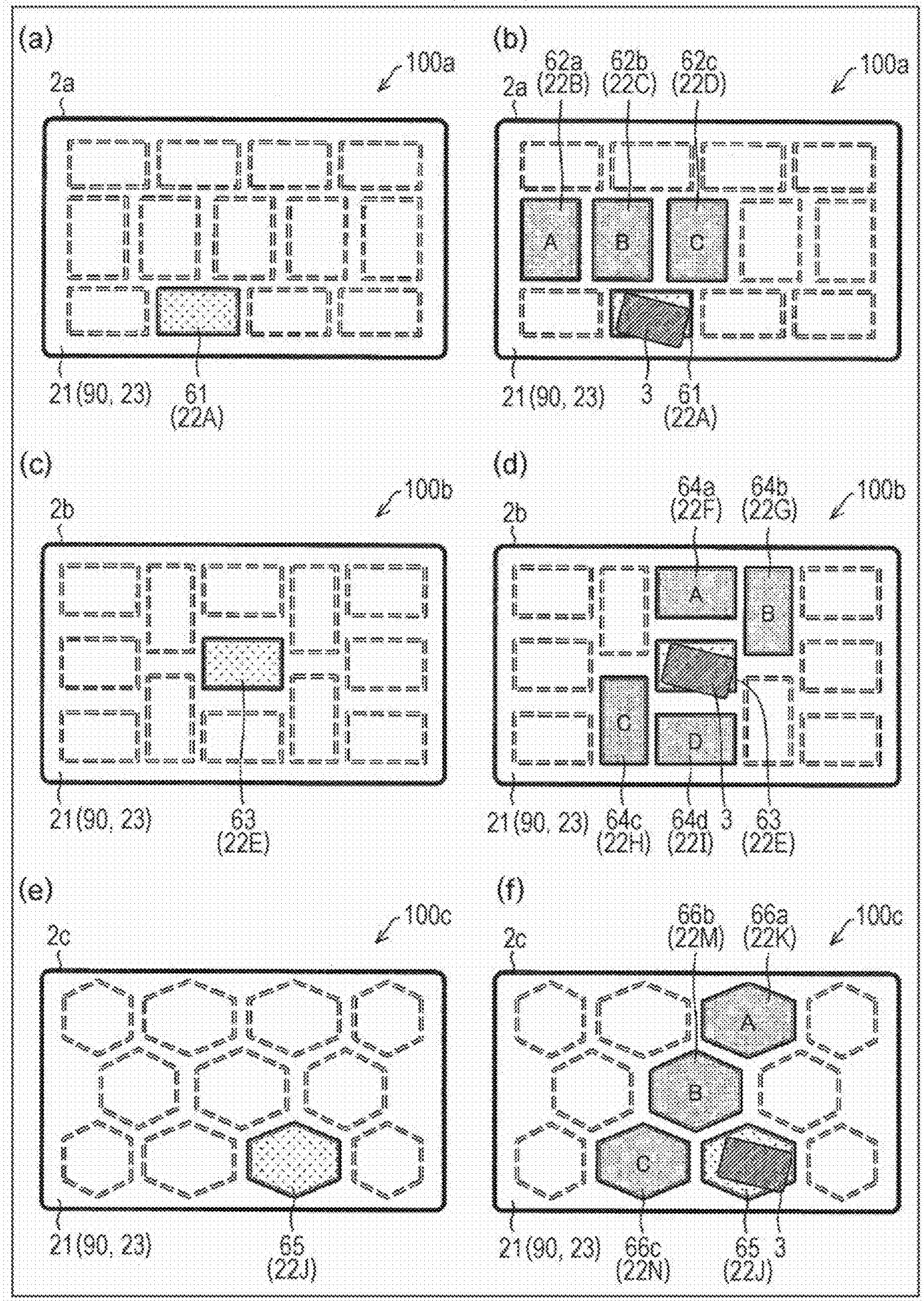
FIG. 16 is a diagram showing an example arrangement of NFC antennas according to Embodiment 4.
Figure 17:
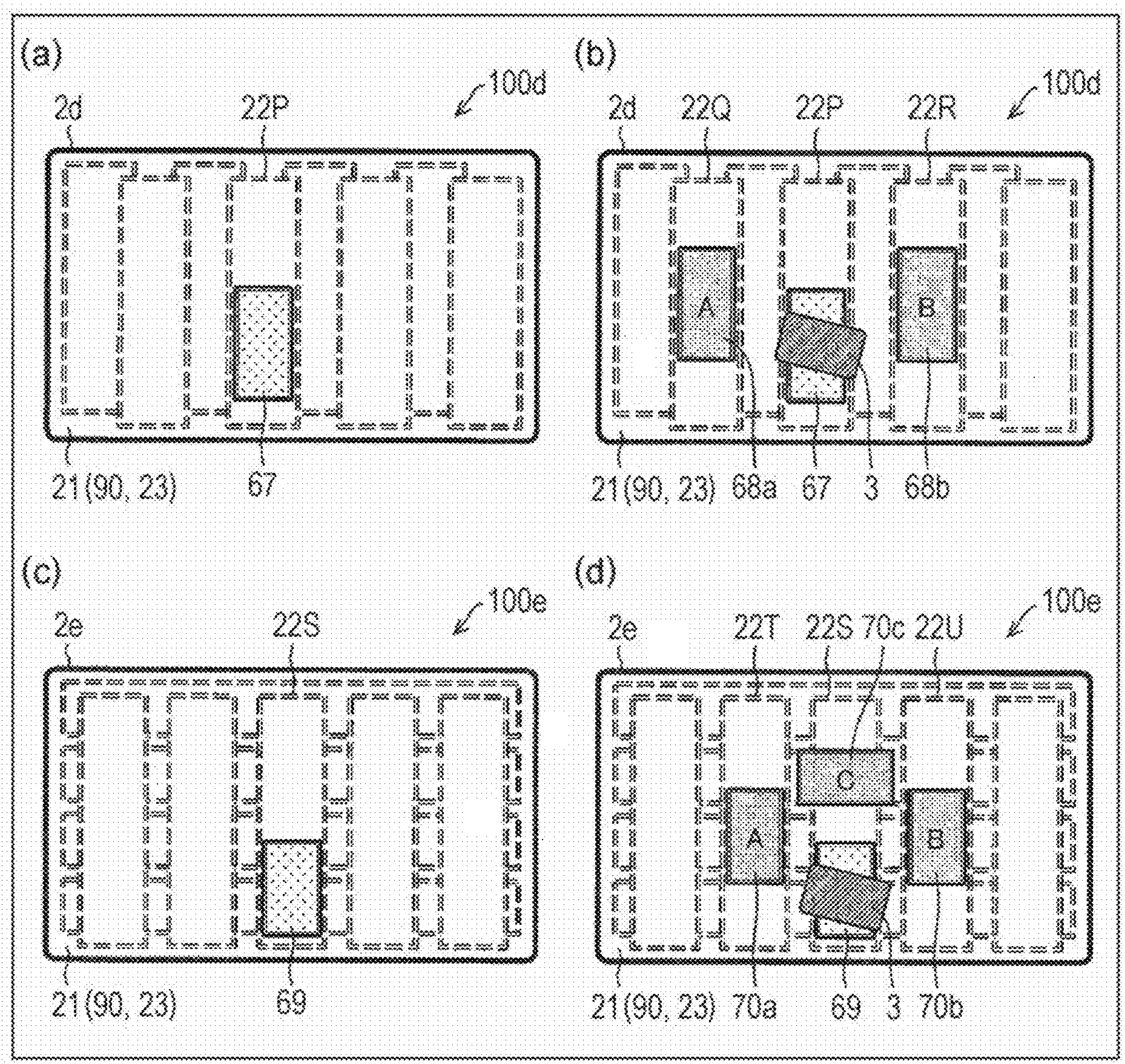
FIG. 17 is a diagram showing another example arrangement of NFC antennas according to Embodiment 4.

Still another embodiment of the present disclosure is described with reference to FIGS. 16 and 17. The present embodiment describes variations in the shape, orientation, number, and arrangement of NFC antennas 22. FIGS. 16 and 17 are diagrams showing different example arrangements of NFC antennas 22.

An NFC system 100*a* shown in (a) of FIG. 16 includes an NFC display 2*a*. The NFC display 2*a* has an NFC communication unit 21 having thirteen rectangular NFC antennas 22. Further, the NFC communication unit 21 has four NFC antennas 22 arranged in landscape orientation at each of the upper and lower ends in the orientation of (a) of FIG. 16 and five NFC antennas 22 arranged in portrait orientation between the NFC antennas 22.

In this example, at the time of activation of the information processing device 1 and the NFC display 2*a*, polling is executed at an NFC antenna 22A illustrated. Further, at the time of activation, an image 61 that prompts for close-range wireless communication with the NFC antenna 22A is displayed in a region overlapping the NFC antenna 22A.

A case is described here where close-range wireless communication between the NFC antenna 22A and the NFC terminal 3 has been executed. In this case, for example, as shown in (b) of FIG. 16, in regions overlapping NFC antennas 22B, 22C, and 22D, images 62*a*, 62*b*, and 62*c*

(communication prompter images) that prompt for close-range wireless communication with these NFC antennas 22 are displayed, respectively.

Further, an NFC system 100*b* shown in (c) of FIG. 16 includes an NFC display 2*b*. The NFC display 2*b* has an NFC communication unit 21 having thirteen rectangular NFC antennas 22. Further, the NFC communication unit 21 has three NFC antennas 22 arranged in landscape orientation in each of the first, third, and fifth columns from the left end in the orientation of (c) of FIG. 16 and two NFC antennas 22 arranged in portrait orientation in each of the second and fourth columns from the left end in the orientation of (c) of FIG. 16.

In this example, at the time of activation of the information processing device 1 and the NFC display 2*a*, polling is executed at an NFC antenna 22E illustrated. Further, at the time of activation, an image 63 that prompts for close-range wireless communication with the NFC antenna 22E is displayed in a region overlapping the NFC antenna 22E.

A case is described here where close-range wireless communication between the NFC antenna 22E and the NFC terminal 3 has been executed. In this case, for example, as shown in (d) of FIG. 16, in regions overlapping NFC antennas 22F, 22G, 22H, and 22I, images 64*a*, 64*b*, 64*c*, and 64*d* (communication prompter images) that prompt for close-range wireless communication with these NFC antennas 22 are displayed, respectively.

Further, an NFC system 100*c* shown in (e) of FIG. 16 includes an NFC display 2*c*. The NFC display 2*c* has an NFC communication unit 21 having eleven hexagonal NFC antennas 22. Further, the NFC antennas 22 includes those which are regular hexagonal and those which are not regular hexagonal.

In this example, at the time of activation of the information processing device 1 and the NFC display 2*a*, polling is executed at an NFC antenna 22J illustrated. Further, at the time of activation, an image 65 that prompts for close-range wireless communication with the NFC antenna 22J is displayed in a region overlapping the NFC antenna 22J.

A case is described here where close-range wireless communication between the NFC antenna 22J and the NFC terminal 3 has been executed. In this case, for example, as shown in (f) of FIG. 16, in regions overlapping NFC antennas 22K, 22M, and 22N, images 66*a*, 66*b*, and 66*c* (communication prompter images) that prompt for close-range wireless communication with these NFC antennas 22 are displayed, respectively.

Thus, there are various possible variations in the shape, orientation, number, and arrangement of NFC antennas 22 without particular limitations. Further, as shown in (e) and (f) of FIG. 16, the NFC communication unit 21 may have a mixture of NFC antennas 22 of different shapes.

Further, an image that is displayed when any of the NFC antennas 22 and the NFC terminal 3 has performed close-range wireless communication is not limited to being configured to be displayed in a region overlapping an NFC antenna 22 that is not adjacent to the NFC antenna 22. For example, as in the case of the image 62*a* of (b) of FIG. 16 or the image 66*a* of (f) of FIG. 16, the image may be displayed in a region overlapping an NFC antenna 22 that is not adjacent to the NFC antenna 22 that has performed the close-range wireless communication.

Further, an NFC system 100*d* shown in (a) of FIG. 17 includes an NFC display 2*d*. As illustrated, the NFC display 2*d* has an NFC communication unit 21 having eight rectangular NFC antennas 22 that longitudinally transverse the NFC communication unit 21. Further, as illustrated, the eight NFC antennas 22 are laid out such that adjacent NFC antennas 22 partially overlap each other. This makes it possible to perform close-range wireless communication no matter which position on the NFC display 2*d* the NFC terminal 3 is moved nearer to.

In this example, at the time of activation of the information processing device 1 and the NFC display 2*d*, polling is executed at an NFC antenna 22P illustrated. Further, at the time of activation, an image 67 that prompts for close-range wireless communication with the NFC antenna 22P is displayed in a region overlapping the NFC antenna 22P. As illustrated, the image 67 overlaps not the whole surface but only a part of the NFC antenna 22P.

A case is described here where close-range wireless communication between the NFC antenna 22P and the NFC terminal 3 has been executed. In this case, for example, as shown in (b) of FIG. 17, in regions overlapping NFC antennas 22Q and 22R, images 68*a* and 68*b* (communication prompter images) that prompt for close-range wireless communication with these NFC antennas 22 are displayed, respectively. That is, the images 68*a* and 68*b* are displayed in positions laterally shifted from the image 67. Then, the NFC controller 24 performs scan driving by which to alternately bring the NFC antennas 22Q and 22R into a driven state.

It is not preferable that the images 68 be displayed in positions longitudinally shifted from the image 67. This is because in this case, the NFC antenna 22 overlapping the regions in which the images 68 have been displayed is the NFC antenna 22P, which is the same as the NFC antenna 22 that has performed close-range wireless communication prompted for by the image 67. Therefore, even if there are variations in display position between the image 67 and the images 68, the NFC system 100*d* cannot recognize a difference in position of close-range wireless communication.

Further, as illustrated, it is preferable that the NFC antenna 22 that performs close-range wireless communication prompted for by an image 68 be an NFC antenna 22 that is not adjacent to the NFC antenna 22 that performs close-range wireless communication prompted for by the image 67. In other words, the NFC antenna 22 that performs the first close-range wireless communication and the NFC antenna 22 that performs the second close-range wireless communication do not overlap each other.

Furthermore, in other words, when close-range wireless communication with the information communication terminal has been performed, the display control unit effects a display of the communication prompter image that prompts for close-range wireless communication with an antenna that is not adjacent to an antenna that has performed the close-range wireless communication with the information communication terminal. This allows the NFC system 100*d* to surely determine which of the two NFC antennas 22 the NFC terminal 3 has been held above. In a case where the NFC antenna 22Q and the NFC antenna 22R are so separately placed as not to interfere with each other, the two NFC antennas 22 may be simultaneously brought into a driven state.

Further, an NFC system 100*e* shown in (c) of FIG. 17 includes an NFC display 2*e*. As illustrated, the NFC display 2*e* has an NFC communication unit 21 having five rectangular NFC antennas 22 that longitudinally transverse the NFC communication unit 21. Further, as illustrated, the NFC communication unit 21 has four rectangular NFC antennas 22 that transverse the NFC communication unit 21. That is, as illustrated, the NFC communication unit 21 is laid out such that the longitudinal NFC antennas 22 and the transverse NFC antennas 22 cross each other.

In this example, at the time of activation of the information processing device 1 and the NFC display 2*e*, polling is executed at an NFC antenna 22S illustrated. Further, at the time of activation, an image 69 that prompts for close-range wireless communication with the NFC antenna 22S is displayed in a region overlapping the NFC antenna 22S. As illustrated, the image 69 overlaps not the whole surface but only a part of the NFC antenna 22S.

A case is described here where close-range wireless communication between the NFC antenna 22S and the NFC terminal 3 has been executed. In this case, for example, as shown in (d) of FIG. 17, in regions overlapping NFC antennas 22T, 22U, and 22V, images 70*a*, 70*b*, and 70*c* (communication prompter images) that prompt for close-range wireless communication with these NFC antennas 22 are displayed, respectively. The images 70*a* and 70*b* are portrait rectangular images, as they are displayed in regions overlapping the longitudinal NFC antennas 22T and 22U. On the other hand, the image 70*c* is a landscape rectangular image, as it is displayed in a region overlapping the transverse NFC antenna 22V.

Then, the NFC controller 24 performs scan driving by which to sequentially bring the NFC antennas 22T, 22U, and 22V into a driven state.

Further, although, in the illustrated example, the NFC system 100*e* has one NFC antenna 22 that performs the first round of close-range wireless communication, there may be more than one NFC antennas 22 that may execute each of the first and second rounds of close-range wireless communication. For example, the five longitudinal NFC antennas 22 may be NFC antennas 22 that may execute the first round of close-range wireless communication. In this case, when any of the first NFC antennas 22 has performed close-range wireless communication, the four transverse NFC antennas 22 may be NFC antennas 22 that may execute the second round of close-range wireless communication. In the case of this example, at the time of activation of the information processing device 1 and the NFC display 2*e*, the NFC system 100*e* performs scan driving by which to sequentially bring the five longitudinal NFC antennas 22 into a driven state. Further, in a case where any of the five NFC antennas 22 has performed close-range wireless communication, the NFC system 100*e* performs scan driving by which to sequentially bring the four transverse NFC antennas 22 into a driven state.

[Modifications that are Common to all of Embodiments]

Figure 18:
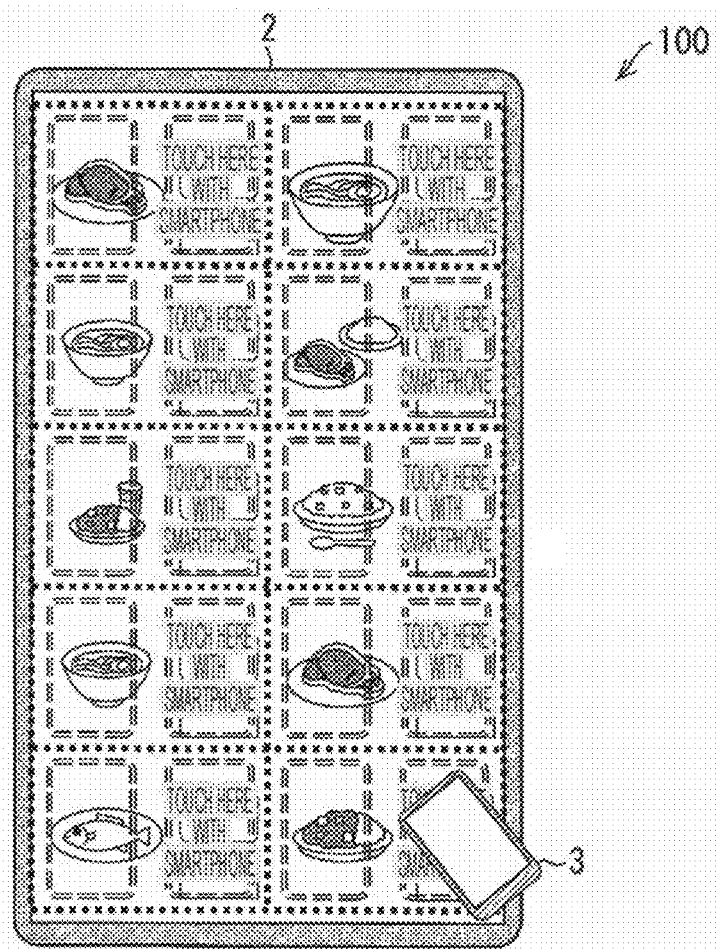
FIG. 18 is a diagram showing an example of a screen that is displayed on an NFC display according to a modification that is common to Embodiments 1 to 4.
Figure 19:
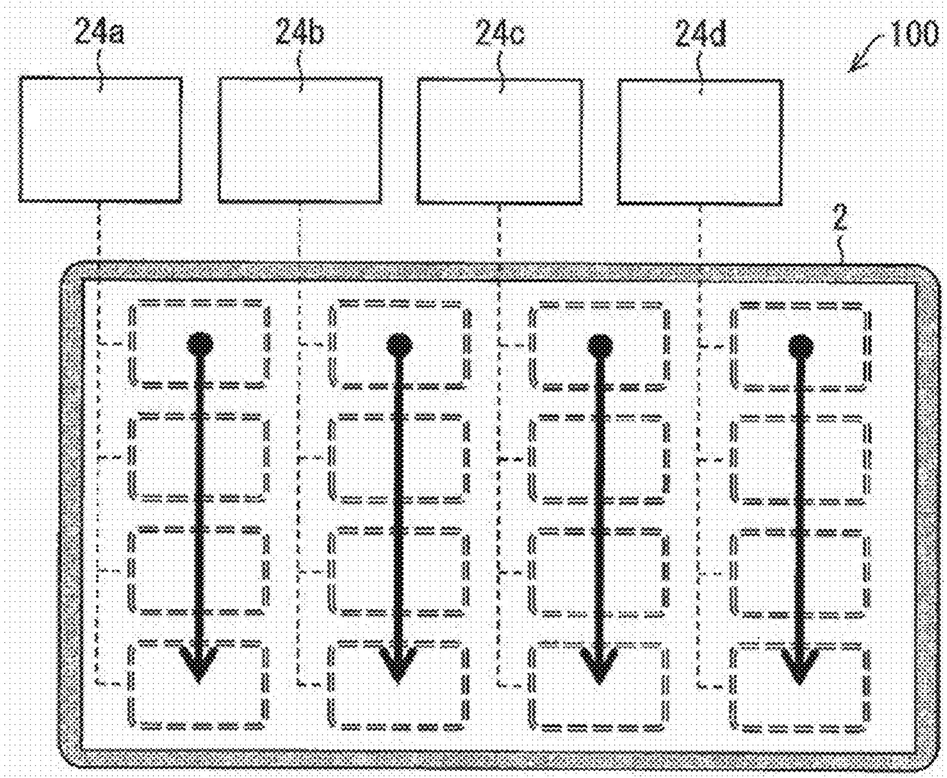
FIG. 19 is a diagram showing an example of wiring in an NFC display according to another modification that is common to Embodiments 1 to 4.

Next, modifications that are common to all of the embodiments are described below with reference to FIGS. 18 and 19. FIG. 18 is a diagram showing another example of a screen that is displayed on the NFC display 2. FIG. 19 is a diagram showing an example of wiring in the NFC display 2.

Processes that are executed by the NFC system 100 are not limited to those described in Embodiments 1 to 3. For example, as shown in FIG. 18, the NFC system 100 may be a coupon supplier.

As shown in FIG. 18, at the time of activation of the information processing device 1 and the NFC display 2, the display control unit 13 causes the display unit 23 to display images indicating the contents of coupons and, in positions in which images of desired coupons have been displayed, images that prompt for close-range wireless communication (images saying "TOUCH HERE WITH SMARTPHONE"). Further, the NFC controller 24 performs scan driving in accordance with a control signal acquired from the antenna driving unit 15.

After that, the NFC controller 24 uses an NFC antenna 22 having detected the NFC terminal 3 to perform data transmission based on an instruction from the process execution unit 12, acquires terminal information of the NFC terminal 3, and transmits it to the process execution unit 12 via the NFC communication control unit 11. The terminal information contains at least information indicating the type of the NFC terminal 3 and a user ID in a coupon management application. Upon determining, from the information indicating the type of the NFC terminal 3, that the NFC terminal 3 is a coupon acquiring terminal, the process execution unit 12 outputs, to the display control unit 13, a display instruction to display an image (hereinafter referred to as "acquisition confirmation image") that prompts for confirmation of coupon acquisition. Furthermore, in addition to outputting the display instruction, the process execution unit 12 outputs, to the NFC communication control unit 11, a polling instruction to perform polling at an NFC antenna 22 overlapping a region in which the acquisition confirmation image is displayed. The instruction contains an antenna ID indicating the NFC antenna 22 overlapping the region in which the acquisition confirmation image is displayed. This causes the NFC controller 24 to perform polling only at the NFC antenna 22 overlapping the region in which the acquisition confirmation image is displayed.

When the NFC controller 24 detects the NFC terminal 3 with the NFC antenna 22 overlapping the region in which the acquisition confirmation image is displayed, notification is transmitted to the process execution unit 12 via the NFC communication control unit 11. In a case where the process execution unit 12 has determined that a terminal ID contained in the notification thus acquired and a terminal ID stored in the storage unit 14 match, the process execution unit 12 controls a communication unit (not illustrated) to access a server that manages the application. Then, the process execution unit 12 stores the user ID thus acquired and a coupon ID for identifying a coupon in association with each other. Further, the process execution unit 12 instructs the NFC controller 24 to transmit, to the NFC terminal 3, the URL of the web page of the coupon that the user would like. The NFC controller 24 transmits the URL to the NFC terminal 3 through the NFC antenna 22 that has performed the previous data transmission. The NFC system 100 may be configured to acquire coupon data (e.g. image data) from the server and transmit the coupon data thus acquired to the NFC terminal 3 by means of data transmission.

Further, in each of Embodiments 1 to 4 described above, one NFC controller 24 is communicably connected to all of the NFC antennas 22. With this configuration, only one NFC antenna 22 is brought into a driven state during scan driving in the NFC system 100 according to any one of Embodiments 1 to 4.

However, an increase in the number of NFC antennas 22 presents such a problem that it takes time to bring all of the NFC antennas 22 into a driven state once. It should be noted that "to bring all of the NFC antennas 22 into a driven state once" is hereinafter referred to as "full-scale scanning".

Accordingly, in the NFC system 100 according to the present modification, as shown in FIG. 19, one NFC controller 24 is connected every one or more NFC antennas 22 in the NFC display 2. For example, one NFC controller 24 may be connected to a column of NFC antennas 22. That is, as illustrated, an NFC controller 24*a*, an NFC controller 24*b*, an NFC controller 24*c*, and an NFC controller 24*d* may be connected for each separate column of NFC antennas 22. Further, one NFC controller 24 may be connected to a row of NFC antennas 22, or one NFC controller 24 may be connected to one NFC antenna 22.

The NFC controller 24*a* to 24*d* execute scan driving on the NFC antennas 22 to which they are connected. For this reason, in the illustrated example, a maximum of four NFC antennas 22 are simultaneously brought into a driven state. This allows the NFC system 100 according to the present modification to shorten the time it takes to perform full-scale scanning. This makes it possible to shorten the time it takes to detect the NFC terminal 3.

Note, however, that the NFC system 100 according to the present modification has the following problem. That is, in a case where adjacent NFC antennas 22 are simultaneously brought into a driven state, interference occurs, with the result that communication with the NFC terminal 3 may not be performed in a normal way.

In order to solve this problem, it is desirable that the NFC system 100 according to the present modification perform scan driving so that adjacent NFC antennas 22 are not simultaneously brought into a driven state. For example, the control unit 10 of the information processing device 1 may instruct each of the NFC controllers 24*a* to 24*d* to start scan driving at a different timing.

Further, for example, the control unit 10 of the information processing device 1 may supply each of the NFC controllers 24*a* to 24*d* with a different piece of driving order information. In the case of the illustrated example, the control unit 10 generates four types of driving order information in accordance with which NFC antennas 22 arranged in different rows are driven first, and outputs each piece of driving order information to any of the NFC controllers 24*a* to 24*d*. With this, even if the NFC controllers 24*a* to 24*d* start scan driving at the same timing, NFC antennas 22 lateral to each other are not simultaneously brought into a driving state.

Further, for example, by synchronizing each NFC controller 24 with the other by configuring the NFC controllers 24*a* to 24*d* to be communicable with one another, control may be exercised so that NFC antennas 22 lateral to each other are not simultaneously brought into a driving state.

Further, in each of Embodiments 1 to 4 described above, the display control unit 13 is configured to, at the time of activation of the information processing device 1 and the NFC display 2, effect a display of an image that prompts for close-range wireless communication (e.g. a product choice image 31). However, the display control unit 13 does not need to effect a display of such an image at the time of activation of the information processing device 1 and the NFC display 2.

[Example of Implementation by Software]

The control blocks (particularly the control unit 10) of the information processing device 1 may be achieved by a logic circuit (hardware) formed on an integrated circuit (IC chip) or the like or may be achieved by software through the use of a CPU (central processing unit).

In the latter case, the information processing device 1 includes a CPU that executes a command of an information processing program that is software by which each function is achieved, a ROM (read-only memory) or storage device (which is referred to as "recording medium") on which the program and various types of data are computer-readably (or CPU-readably) recorded, and a RAM (random-access memory) onto which the program is unwound. Moreover, the object of the present disclosure is attained by a computer (or a CPU) reading the program from the recording medium and executing the program. A usable example of the recording medium is a "non-transient tangible medium" such as a tape, a disk, a card, a semiconductor memory, or a programmable logic circuit. Further, the program may be supplied to the computer via a given transmission medium (such as a communication network or a broadcast wave) via which the program can be transmitted. It should be noted that an aspect of the present disclosure may be achieved in the form of a data signal, embedded in carrier waves, by which the program is embodied by electric transmission.

An information processing device 1 according to any one of the embodiments of the present disclosure may be achieved by a computer. In this case, an information processing device 1 control program that achieves the information processing device 1 by means of a computer by causing the computer to operate as the components (software elements) of the information processing device 1 and a computer-readable recording medium having recorded thereon the control program are encompassed in the scope of the present disclosure.

The present disclosure is not limited to any of the embodiments described above but may be altered in various ways within the scope of the claims, and an embodiment based on a proper combination of technical means disclosed in different embodiments is encompassed in the technical scope of the present disclosure. Furthermore, a new technical feature can be formed by a combination of technical means respectively disclosed in embodiments.

CROSS-REFERENCE TO RELATED APPLICATIONS

The present disclosure contains subject matter related to that disclosed in Japanese Priority Patent Application JP 2017-86483 filed in the Japan Patent Office on Apr. 25, 2017, the entire contents of which are hereby incorporated by reference.

REFERENCE SIGNS LIST

1 Information processing device (control device)
2, 2*a* to 2*e* NFC display (communication device)
3 NFC terminal (information communication terminal)
12 Process execution unit
13 Display control unit
15 Antenna driving unit
21 NFC communication unit (antenna unit)
22 NFC antenna (antenna)
23 Display unit
32, 32*b* to 32*d* Purchase confirmation image (communication prompter image)
43*a* to 43*f* Authenticating image (communication prompter image)
44*a* to 44*c* Menu image (communication prompter image)
45*a* to 45*c* Menu image (communication prompter image)
52, 55 Option image (communication prompter image)
62*a* to 62*c* Image (communication prompter image)
64*a* to 64*d* Image (communication prompter image)
66*a* to 66*c* Image (communication prompter image)
68*a*, 68*b* Image (communication prompter image)
70*a* to 70*c* Image (communication prompter image)
S4, S23, S43 Communication control step
S6, S25, S45 Display control step

The invention claimed is:

1. A control device for controlling a communication device including a display unit and an antenna unit including a plurality of antennas that perform close-range wireless communication with an information communication terminal, the control device comprising:

display controlling circuitry that, when at least one antenna of the antenna unit has performed close-range wireless communication with the information communication terminal, effect a display of a communication prompter image that prompts for close-range wireless communication with an antenna that is different from the antenna that has performed the close-range wireless communication; and process executing circuitry that execute a predetermined process on the basis of information acquired from the information communication terminal by means of close-range wireless communication, wherein the process executing circuitry execute the predetermined process when, after the communication prompter image has been displayed a predetermined number of times, an antenna indicated by a communication prompter image most recently displayed has performed close-range wireless communication with the information communication terminal, and wherein in a case where the predetermined number of times is two or more, an antenna indicated by a communication prompter image that is displayed for a second time or later is an antenna that is not located in a direction in which the information communication terminal moved for immediately preceding close-range wireless communication.

2. The control device according to claim 1, wherein the predetermined process is a payment process, and in a case where a payment is possible, the display controlling circuitry effect a display of the communication prompter image, and in a case where the payment is impossible, the display controlling circuitry effect a display of an image that makes a presentation to a user to that effect.

3. The control device according to claim 1, wherein the predetermined process is a user's authentication process, the display controlling circuitry prompt for close-range wireless communication through each of the plurality of antennas and effect a display of a plurality of the communication prompter images that present different pieces of information to the user, and the process executing circuitry deem authentication of the user successful when close-range wireless communication has been performed by an antenna indicated by a communication prompter image presenting information set in advance by the user.

4. The control device according to claim 1, wherein the process executing circuitry do not execute the predetermined process when the antenna indicated by the communication prompter image has performed close-range wireless communication with an information communication terminal that is different from the information communication terminal that has most recently performed close-range wireless communication, and in accordance with an instruction from the process executing circuitry, the display controlling circuitry effect a display of an image indicating that the information communication terminals are different.

5. The control device according to claim 1, wherein the process executing circuitry execute the predetermined process when an antenna indicated by the communication prompter image displayed on the basis of close-range wireless communication with the information communication terminal has performed close-range wireless communication with a second information communication terminal.

6. The control device according to claim 5, wherein in a case where user information recorded in the information communication terminal and user information recorded in the second information communication terminal are identical, the process executing circuitry perform, as the predetermined process, a process of deeming authentication of a user successful.

7. The control device according to claim 5, wherein in a case where user information recorded in the information communication terminal is information of a first user and user information recorded in the second information communication terminal is information of a second user, the process executing circuitry perform, as the predetermined process, a process of displaying information that the first and second users are authorized to access in common.

8. The control device according to claim 5, wherein the process executing circuitry perform, as the predetermined process, a process of associating the information communication terminal and the second information communication terminal with each other as information communication terminals that belong to an identical group.

9. The control device according to claim 8, wherein in a case where the information communication terminal and the second information communication terminal are already associated with each other as information communication terminals that belong to an identical group, the process executing circuitry perform, as the predetermined process, a process of directly treating the information communication terminal and the second information communication terminal as information communication terminals that belong to an identical group, even in a case where the information communication terminal and the second information communication terminal have changed their positions.

10. The control device according to claim 1, wherein when close-range wireless communication with the information communication terminal has been performed, the display controlling circuitry effect a display of the communication prompter image that prompts for close-range wireless communication with an antenna that is adjacent to an antenna that has performed the close-range wireless communication with the information communication terminal.

11. The control device according to claim 1, wherein when close-range wireless communication with the information communication terminal has been performed, the display controlling circuitry effect a display of the communication prompter image that prompts for close-range wireless communication with an antenna that is not adjacent to the antenna that has performed the close-range wireless communication with the information communication terminal.

12. The control device according to claim 1, further comprising antenna driving circuitry that sequentially drive the plurality of antennas in a predetermined order.

13. A communication device that is controlled by the control device according to claim 1, wherein the display unit overlaps the antenna unit.

14. A control device for controlling a communication device including a display unit and an antenna unit including a plurality of antennas that perform close-range wireless communication with an information communication terminal, the control device comprising display controlling circuitry that, when at least one antenna of the antenna unit has performed close-range wireless communication with the information communication terminal, effect a display of a communication prompter image that prompts for close-range wireless communication with an antenna that is different from the antenna that has performed the close-range wireless communication, wherein in a case where close-range wireless communication with an information communication terminal that is separate from the information communication terminal has been performed while the communication prompter image is being displayed on the basis of close-range wireless communication with the information communication terminal, the display controlling circuitry cause a communication prompter image differing in display form from the communication prompter image being displayed to be displayed in a position different from that of the communication prompter image being displayed.

15. A control device for controlling a communication device including a display unit and an antenna unit including a plurality of antennas that perform close-range wireless communication with an information communication terminal, the control device comprising:

display controlling circuitry that, when at least one antenna of the antenna unit has performed close-range wireless communication with the information communication terminal, effect a display of a communication prompter image that prompts for close-range wireless communication with an antenna that is different from the antenna that has performed the close-range wireless communication; and process executing circuitry that execute a predetermined process when an antenna indicated by the communication prompter image displayed on the basis of close-range wireless communication with the information communication terminal has performed close-range wireless communication with a second information communication terminal, wherein the process executing circuitry perform, as the predetermined process, a process of associating the information communication terminal and the second information communication terminal with each other as information communication terminals that belong to an identical group, and wherein when an antenna indicated by the communication prompter image displayed on the basis of close-range wireless communication with any information communication terminal that belongs to the group has performed close-range wireless communication with a different information communication terminal that does not belong to the group, the process executing circuitry perform a process of associating the different information communication terminal as an information communication terminal that belongs to the group.

* * * * *